US012606339B1

(12) United States Patent
Crum et al.

(10) Patent No.: US 12,606,339 B1
(45) **Date of Patent: *Apr. 21, 2026**

(54) LABELING SYSTEMS AND METHODS OF MAKING AND USING SAME

(71) Applicant: Ward-Kraft, Inc., Fort Scott, KS (US)

(72) Inventors: Jesse D. Crum, Fort Scott, KS (US); Young Min Yoo, Fort Scott, KS (US); Randy Zimmerman, Fort Scott, KS (US); Doug Defebaugh, Fort Scott, KS (US); Roger Kraft, Fort Scott, KS (US)

(73) Assignee: Ward-Kraft, Inc., Pittsburg, KS (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/068,264

(22) Filed: Dec. 19, 2022

Related U.S. Application Data

(63) Continuation-in-part of application No. 17/068,706, filed on Oct. 12, 2020, now Pat. No. 11,559,975, and (Continued)

(51) Int. Cl.

| | |
|---|---|
| ***B65C 9/26*** | (2006.01) |
| ***B65C 9/00*** | (2006.01) |
| ***B65C 9/08*** | (2006.01) |
| ***B65C 9/18*** | (2006.01) |
| ***B65C 9/22*** | (2006.01) |

(52) U.S. Cl.
CPC .............. *B65C 9/26* (2013.01); *B65C 9/0015* (2013.01); *B65C 9/08* (2013.01); *B65C 9/2234* (2013.01); *B65C 2009/0018* (2013.01); *B65C 2009/0084* (2013.01); *B65C 2009/1888* (2013.01)

(58) Field of Classification Search
CPC ........... B29C 9/46; B29C 9/0015; B29C 9/02; B29C 9/26; B29C 2009/0018; B29C 9/40; B29C 9/2204; B29C 9/2208; B29C 9/22; B29C 9/2213; B29C 9/2226; B29C 9/223; B29C 9/2234
See application file for complete search history.

(56) References Cited

U.S. PATENT DOCUMENTS

| | | | |
|---|---|---|---|
| 2,178,979 | A | 11/1939 | Von et al. |
| 3,574,153 | A | 4/1971 | Julius |

(Continued)

FOREIGN PATENT DOCUMENTS

| | | | |
|---|---|---|---|
| WO | 2011085790 | A2 | 7/2011 |
| WO | 2018081922 | A1 | 5/2018 |

OTHER PUBLICATIONS

Final Office Action, dated Mar. 22, 2022, 26 pages, issued in U.S. Appl. No. 16/593,358.

(Continued)

*Primary Examiner* — George R Koch
(74) *Attorney, Agent, or Firm* — AVEK IP, LLC

(57) ABSTRACT

A method for printing and applying labels is provided. The method comprises printing indicia on a first label using a printer to form a first printed label and holding said the label in a holding tray. An arm is rotated in a first direction from an original to collect the label from the holding tray. The arm is rotated in a second direction opposing the first direction to clear the holding tray. The printer has printed a second label before the arm returns to the original position to collect the second label from the holding tray.

19 Claims, 45 Drawing Sheets

Related U.S. Application Data a continuation-in-part of application No. 16/239,258, filed on Jan. 3, 2019, now Pat. No. 10,836,936, which is a continuation-in-part of application No. 16/144,583, filed on Sep. 27, 2018, now Pat. No. 10,726,746, application No. 18/068,264 is a continuation-in-part of application No. 16/593,358, filed on Oct. 4, 2019, now Pat. No. 11,530,067, and a continuation-in-part of application No. 16/144,583, filed on Sep. 27, 2018, now Pat. No. 10,726,746.

(60) Provisional application No. 63/267,792, filed on Feb. 10, 2022, provisional application No. 62/913,550, filed on Oct. 10, 2019, provisional application No. 62/741,511, filed on Oct. 4, 2018.

(56) References Cited

U.S. PATENT DOCUMENTS

| | | | | |
|---|---|---|---|---|
| 4,575,525 | A | 3/1986 | Wacome et al. | |
| 4,623,688 | A | 11/1986 | Flanagan | |
| 5,024,718 | A * | 6/1991 | Hannen | B65C 1/02 156/570 |
| 5,296,535 | A | 3/1994 | Nesiewicz et al. | |
| 5,879,508 | A * | 3/1999 | Makinen | B65C 1/023 156/571 |
| 5,931,098 | A | 8/1999 | Bates | |
| 5,977,021 | A | 11/1999 | Aoyama et al. | |
| 6,080,250 | A | 6/2000 | Urban et al. | |
| 6,080,261 | A | 6/2000 | Popat et al. | |
| 6,124,417 | A | 9/2000 | Su | |
| 6,277,229 | B1 | 8/2001 | Popat et al. | |
| 6,540,865 | B1 | 4/2003 | Miekka et al. | |
| 6,589,623 | B2 | 7/2003 | Roth | |
| 6,616,189 | B2 | 9/2003 | Raming | |
| 6,787,208 | B2 | 9/2004 | Galovic | |
| 8,109,537 | B2 | 2/2012 | Raming | |
| 8,129,010 | B2 | 3/2012 | Kobayashi et al. | |
| 8,287,961 | B2 | 10/2012 | Hill et al. | |
| 8,802,591 | B2 | 8/2014 | Hill et al. | |
| 9,418,576 | B2 | 8/2016 | Franklin | |
| 9,767,714 | B2 | 9/2017 | Franklin | |
| 10,726,746 | B1 * | 7/2020 | Crum | G09F 3/02 |
| 11,530,067 | B1 * | 12/2022 | Crum | B65C 9/02 |
| 11,559,975 | B1 | 1/2023 | Crum | |
| 2001/0035265 | A1 * | 11/2001 | Dronzek | C09J 7/20 156/332 |
| 2003/0012910 | A1 | 1/2003 | Galovic | |
| 2003/0198773 | A1 | 10/2003 | Miekka et al. | |
| 2004/0129378 | A1 | 7/2004 | Galovic | |
| 2006/0216537 | A1 | 9/2006 | Natsui et al. | |
| 2008/0030019 | A1 | 2/2008 | Hofer et al. | |
| 2009/0252905 | A1 | 10/2009 | Hill et al. | |
| 2010/0156087 | A1 | 6/2010 | Raming | |
| 2010/0259037 | A1 | 10/2010 | Hanrahan et al. | |
| 2011/0033698 | A1 | 2/2011 | Woods et al. | |
| 2011/0061802 | A1 | 3/2011 | Raming | |
| 2013/0004686 | A1 | 1/2013 | Hill et al. | |
| 2016/0052659 | A1 * | 2/2016 | Bowers | B65C 1/021 156/64 |
| 2016/0351084 | A1 | 12/2016 | Franklin | |
| 2019/0047738 | A1 * | 2/2019 | Nishimura | B65C 9/46 |
| 2020/0071015 | A1 | 3/2020 | Fan et al. | |

OTHER PUBLICATIONS

Non-Final Office Action, dated Apr. 1, 2022, 6 pages, issued in U.S. Appl. No. 17/068,706.
Non-Final Office Action, dated Aug. 17, 2021, 24 pages, issued in U.S. Appl. No. 16/593,358.
Non-Final Office Action, dated May 19, 2023, 8 pages, received in U.S. Appl. No. 17/228,434.
Notice of Allowance, dated Apr. 1, 2020, 14 pages, issued in U.S. Appl. No. 16/144,583.
Notice of Allowance, dated Aug. 12, 2022, 9 pages, issued in U.S. Appl. No. 16/593,358.
Notice of Allowance, dated Aug. 23, 2023, 8 pages, received in U.S. Appl. No. 17/228,434.
Notice of Allowance, dated Sep. 15, 2022, 8 pages, issued in U.S. Appl. No. 17/068,706.

* cited by examiner

LABELING SYSTEMS AND METHODS OF MAKING AND USING SAME

RELATED APPLICATIONS

This application claims priority to U.S. Provisional Application No. 63/267,792, filed Feb. 10, 2022. This application is also a continuation-in-part of U.S. application Ser. No. 17/068,706, filed on Oct. 12, 2020, now U.S. Pat. No. 11,559,975 B1, which claims priority to U.S. Provisional Application No. 62/913,550, filed on Oct. 10, 2019. The '706 application was also a continuation-in-part of U.S. application Ser. No. 16/239,258, filed on Jan. 3, 2019, now U.S. Pat. No. 10,836,936 B1, which was a continuation-in-part of U.S. application Ser. No. 16/144,583, filed Sep. 27, 2018 now U.S. Pat. No. 10,726,746 B1. This application is also a continuation-in-part of U.S. application Ser. No. 16/593,358, filed on Oct. 4, 2019, now U.S. Pat. No. 11,530,067 B1, which claimed priority to U.S. Provisional Application No. 62/741,511, filed Oct. 4, 2018. The '358 application was also a continuation-in-part of the '583 application. The disclosure of each of these applications is incorporated herein by reference in their entireties.

FIELD OF THE DISCLOSURE

The disclosure relates generally to the field of printing and applying labels. More specifically, the disclosure relates to the field of automated and semi-automated labeling systems.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an embodiment, a method for printing and applying labels is provided. The method comprises printing indicia on a first label using a printer to form a first printed label and holding said first printed label in a holding tray. An arm is rotated in a first direction from an original position to a first position to collect the first printed label from the holding tray. The arm is rotated in a second direction opposing the first direction to clear the holding tray. The arm is moved in a third direction to move the first printed label towards a substrate. The arm is used to apply the first printed label to the substrate. The arm is then moved in a fourth direction opposing the third direction while rotating in the second direction. The printer has printed a second label before the arm returns to the original position to collect the second label from the holding tray.

In another embodiment, a method for printing and applying labels is provided. The method comprises printing indicia on a first label using a printer to form a first printed label and holding said first printed label in an angled holding tray. An arm is rotated in a first direction from an original position to a first position to collect the first printed label from the holding tray. The arm is rotated in a second direction opposing the first direction to clear the angled holding tray. The arm is moved in a third direction to move the first printed label towards a substrate. The label is moistened before reaching the substrate. The arm is used to apply the first printed label to the substrate. The arm is then moved in a fourth direction opposing the third direction while rotating in the second direction.

In yet another embodiment, a method for printing and applying labels is provided. The method comprises printing indicia on a first label using a printer to form a first printed label and holding said first printed label in an angled holding tray. An arm is rotated in a first rotational direction from an original position to a first position to collect the first printed label from the holding tray. The arm is rotated in a second rotational direction opposing the first rotational direction. The arm is moved in a first vertical direction to move the first printed label towards a substrate. The arm is used to apply the first printed label to the substrate. The arm is then moved in a second vertical direction opposing the first vertical direction while rotating in the second rotational direction.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

The disclosure relates generally to a dissolvable adhesive liner usable in a plethora of applications requiring the attachment of one substrate to another, such as labels, tape, et cetera. These applications and the use of the novel dissolvable adhesive liner therewith are discussed in-turn. The artisan will understand from the disclosure herein that the dissolvable adhesive liner is usable in other applications that can benefit from selectively adhering one or more surfaces together (e.g., envelopes, building materials, signage, et cetera).

As is known, a shipping label is adhered to a package and identifies the sender and recipient of the package. Conventional shipping labels have a front face for the printing of indicia and a back face that is adhered to the package. Traditionally, the back face is covered with adhesive, and a liner is removably secured to the back face via this adhesive. Prior to use, the liner is removed, either by hand or otherwise, to expose the adhesive, and the label (specifically, the face ply thereof) is adhered to the package being delivered using the exposed adhesive. As is known, during transportation or otherwise before the label is adhered to a substrate (e.g., a package or other similar surface), the liner covers the adhesive to ensure that the label does not undesirably stick to objects (e.g., other labels, print heads, and/or other components of apparatus used to make and/or print the label) other than the substrate to which the label is to be adhered.

The label liner is traditionally a single-use, disposable object. Considering that there are many millions of shipping labels in use each day, disposal of these liners represents significant waste. It may be desirable to reduce this waste to lower the cost and the carbon footprint of labels in the world; particularly when this waste is reduced without adversely affecting the quality or capabilities of the label, or their ease of use.

Figure 1:
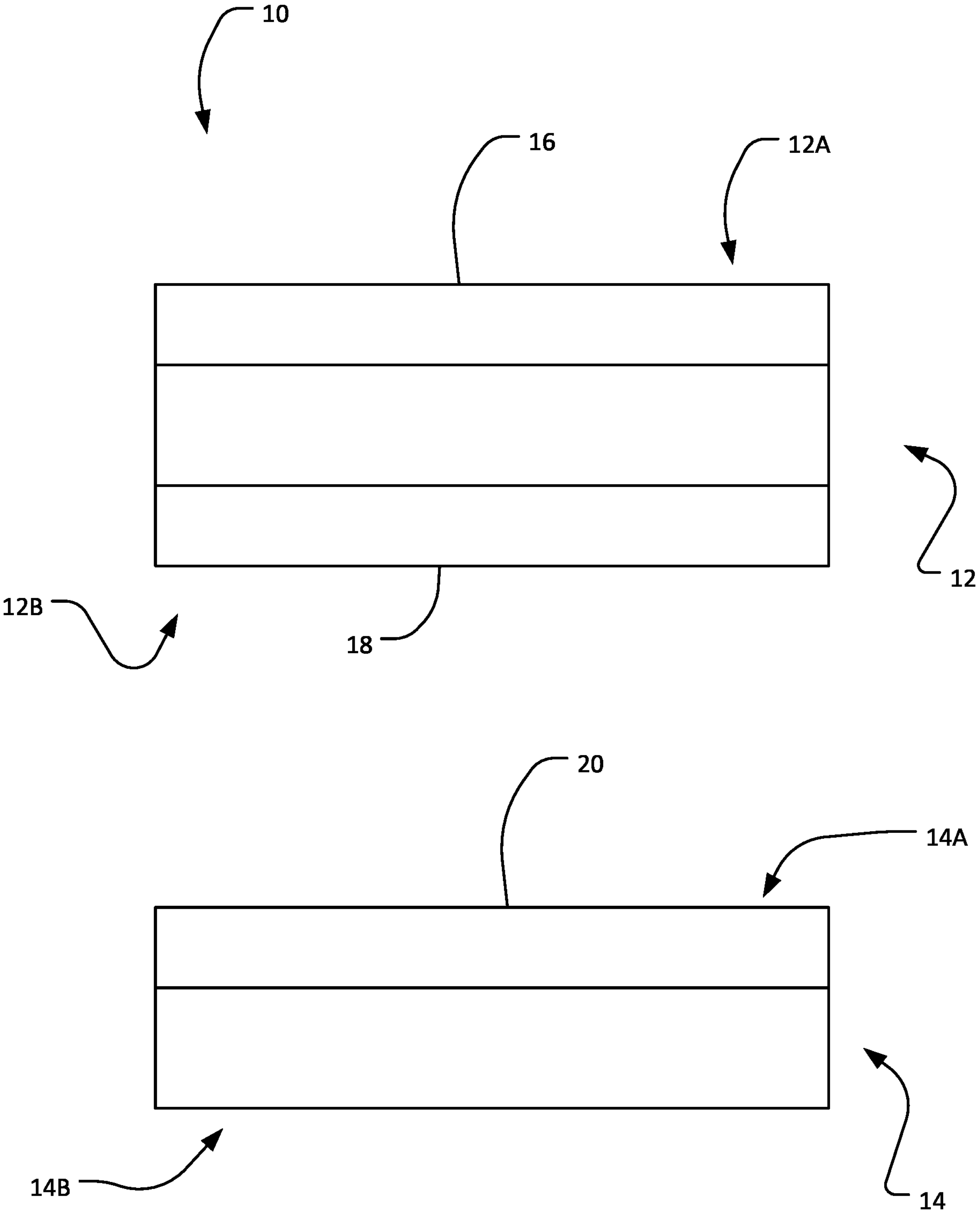
FIG. 1 (PRIOR ART)
FIG. 1 is schematic representation of a PRIOR ART label.

FIG. 1 shows a conventional label 10, as is known in the art. The label 10 has a face ply (or face stock) 12 and a liner 14. The face ply 12 is typically made of paper. The face ply 12 has an upper side 12A and a lower side 12B. At least the top side 12A of the face ply 12 may contain a topcoat 16. The topcoat 16 is a coating configured for the reception of printed indicia and/or which otherwise improves the appearance or functionality of the face ply 12. A layer of adhesive 18 is disposed on the lower side 12B of the face ply 12 to allow the liner 14 to be coupled to the face ply 12.

The liner 14 is most commonly made of paper or polyester (PET). The prior art liner 14 may also be referred to herein as a liner ply because the prior art liner 14 comprises a ply (or multiple plies) of paper, polyester (e.g., film), et cetera. The liner ply 14 has a top side 14A and a bottom side 14B. The top side 14A of the liner ply 14 contains a release agent 20 (e.g., silicone), and the bottom side 14B may comprise paper or PET. The liner ply 14 is adhered to the face ply 12 such that the release agent 20 on the top side 14A of the liner ply 14 is adjacent and in contact with the adhesive 18 disposed on the lower side 12B of the face ply 12. The release agent 20 may ensure that the adhesion between the top ply 12 and the bottom ply 14 is releasable; that is, the liner ply 14 may be selectively disassociated from the face ply 12 to expose the adhesive 18 on the lower side 12B of the face ply.

In use, the liner ply 14 is releasably adhered to the face ply 12. The label 10 is then passed through the printer to print indicia on the topcoat 16. During the printing process, the liner ply 14 covers the adhesive 18 and ensures that the adhesive 18 does not interact with the printer. Once the printing is complete, the liner ply 14 is disassociated from the face ply 12 to expose the adhesive 18. The face ply 12 is then adhered to a substrate (e.g., a package, a box, an envelope, or other object or surface to which the label is adhered) via the adhesive 18, and the liner ply 14 is disposed in a trash can or elsewhere.

As noted, disposable liner plies represent significant waste and cost. The prior art indicates that efforts have been made to configure a label without a disposable liner. U.S. Pat. No. 8,109,537 illustrates one example of a label devoid of a disposable liner. The '537 Patent label includes a single ply that comprises adhesive on one side and a release material on the other. This "linerless" configuration allows for multiple labels to be removably overlaid to one another, e.g., on a roll. Specifically, the release material of the underlying label ensures that this label does not permanently adhere to the overlaid label because of the adhesive thereof.

As the '537 Patent's linerless labels are devoid of a conventional liner, they address at least some of the deficiencies associated with conventional liners. However, the '537 Patent's (and other such) linerless labels present other issues that must be addressed. Because a liner is absent from the label, the adhesive on the labels is exposed to the printer during the printing process. This exposed adhesive may cause the label to undesirably stick to the printer roller and necessitate expensive repairs. To alleviate this concern, the linerless labels are typically printed with specialty printing equipment having coated rollers (e.g., direct thermal printers having rollers comprising silicone embedded rubber) specifically adapted to ensure that the labels do not adhere thereto. Much if not all of the cost savings associated with the liner are lost in purchasing and configuring the specialty printing equipment, which is undesirable.

Furthermore, conventional linerless labels typically preclude easy customization of the label shape. For instance, applying a die-cut to a conventional linerless label may be difficult because the face ply lacks the structural support of a liner ply. Another issue with some conventional linerless labels lies in the adhesive used therein. Water based adhesives (e.g., remoistenable adhesives) typically used in conventional linerless labels require a relatively long time to dry, for instance. Conversely, thermal adhesives (e.g., hot melt adhesives) have a relatively quick drying time, though they are generally incompatible with certain printing methods. Importantly, an issue with conventional linerless labels is that the exposed nature of the adhesive prevents printing on the linerless label using most typical printing methods (e.g., laser printers, thermal transfer printers, or any printer other than direct thermal printers). It is to be understood that, when taking these many considerations into account, conventional linerless labels may have limited applicability.

Further concerns may stem from the adhesive used in conventional labels. The conventional adhesive layers used in both conventional labels and conventional linerless labels not only represents a significant portion of the label cost, but also a significant portion of the label size. Accordingly, the adhesive layer in conventional labels contributes significantly to the size of the shipping label rolls, the amount of space required to ship and/or store the shipping labels rolls, et cetera. The relatively large size of the adhesive layer adds cost to the shipping, storing, and production of the conventional shipping labels. Moreover, conventional adhesives may have other undesirable traits. For instance, conventional adhesives may be difficult to handle due to their tackiness, which may foul up equipment, among other things. Further, manually handling a label with exposed conventional adhesive may cause the adhesive to get on the hands of the handler, which may be undesirable.

It may be advantageous to have a label that does not suffer from the disadvantages associated with conventional liners and conventional adhesives. It may further be desirable to have a label that does not suffer from the drawbacks of linerless labels, and which, like traditional labels having liners, can be printed using one of a variety of printing methods. The present disclosure may provide for such a label.

Disclosed herein are various labels and methods of constructing same that utilize what is referred to herein as a "dissolvable liner." This dissolvable liner, as described below, is a mixture that may be applied to a label and is selectively activatable. When unactivated, the dissolvable liner is generally inert (i.e., the dissolvable liner may preclude adhesion of the label to a surface when unactivated). Once activated (e.g., by a fluid), the dissolvable liner may dispel and may no longer preclude adhesion of the label to a surface. Various concepts using the dissolvable liner are described herein. For instance, the dissolvable adhesive liner concept described herein may be a label which uses the dissolvable liner and does not use a traditional adhesive layer or a traditional liner layer. Once activated, the dissolvable liner of the dissolvable adhesive liner may gain adhesive properties, which may be used to adhere the label to a surface. A variation of the dissolvable liner concept disclosed herein is a displaceable liner concept, also disclosed here. The displaceable liner concept may involve a label which uses the dissolvable liner in conjunction with a specifically arranged layer of traditional hot-melt adhesive. Once activated, the dissolvable liner of the displaceable liner may dispel and expose the adhesive layer below, allowing the label to be adhered to a surface. Various embodiments of making, applying, and operating the dissolvable liner and its concepts are described below.

Figure 5A:
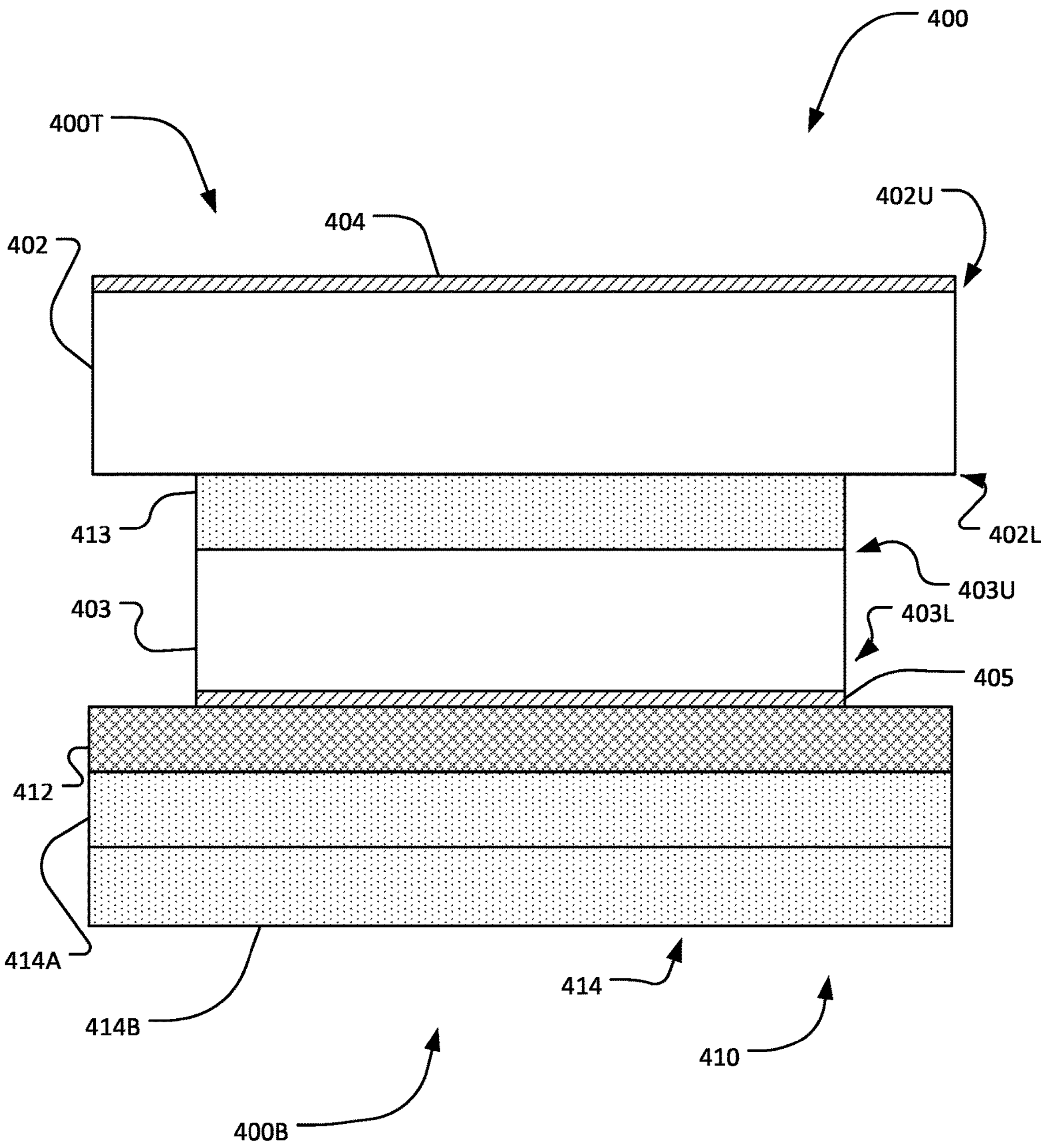
FIG. 5A is a schematic representation of a label employing a dissolvable adhesive liner for adhering to a substrate, according to yet another embodiment of the present disclosure.
Figure 5B:
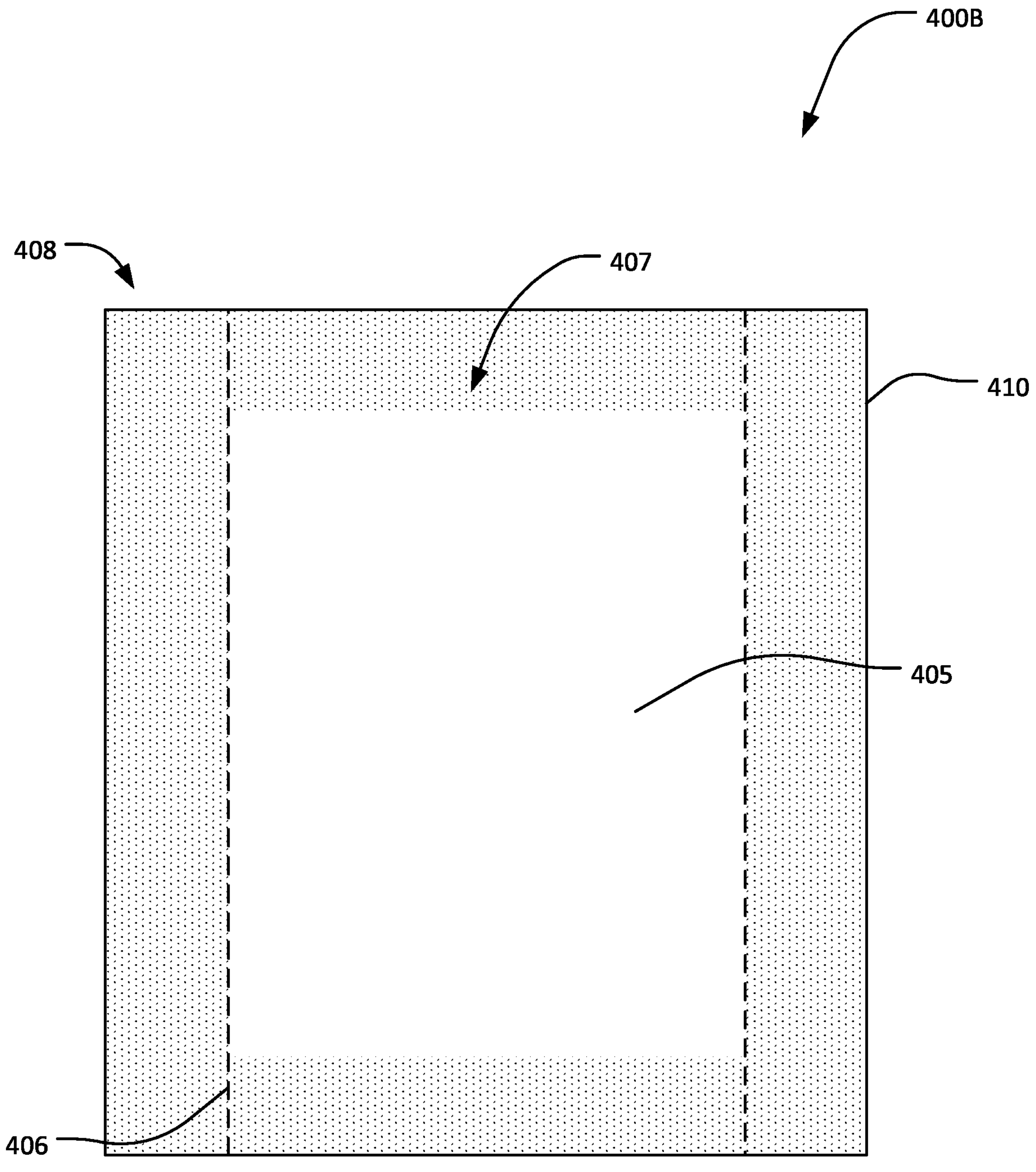
FIG. 5B is a bottom view of the label employing the dissolvable adhesive liner of FIG. 5A.
Figure 5C:
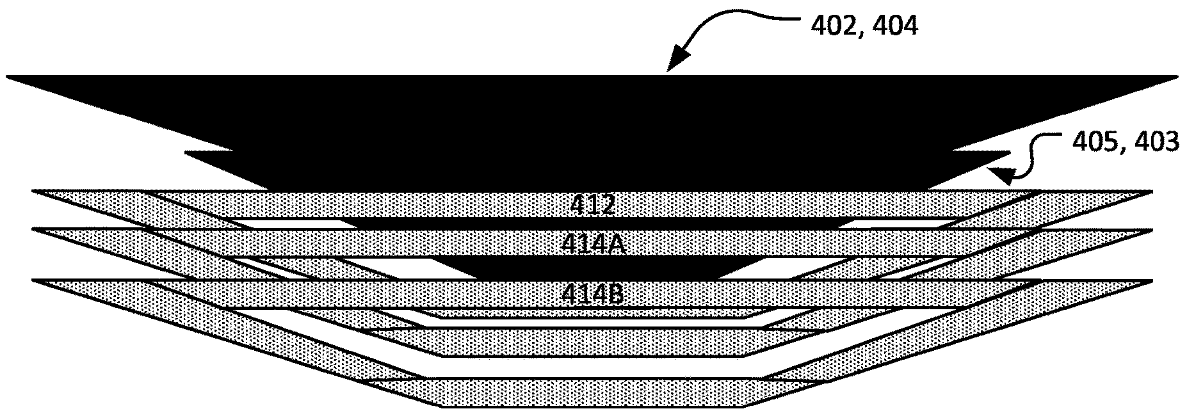
FIG. 5C is an exploded view of the label of FIG. 5A.
Figure 6:
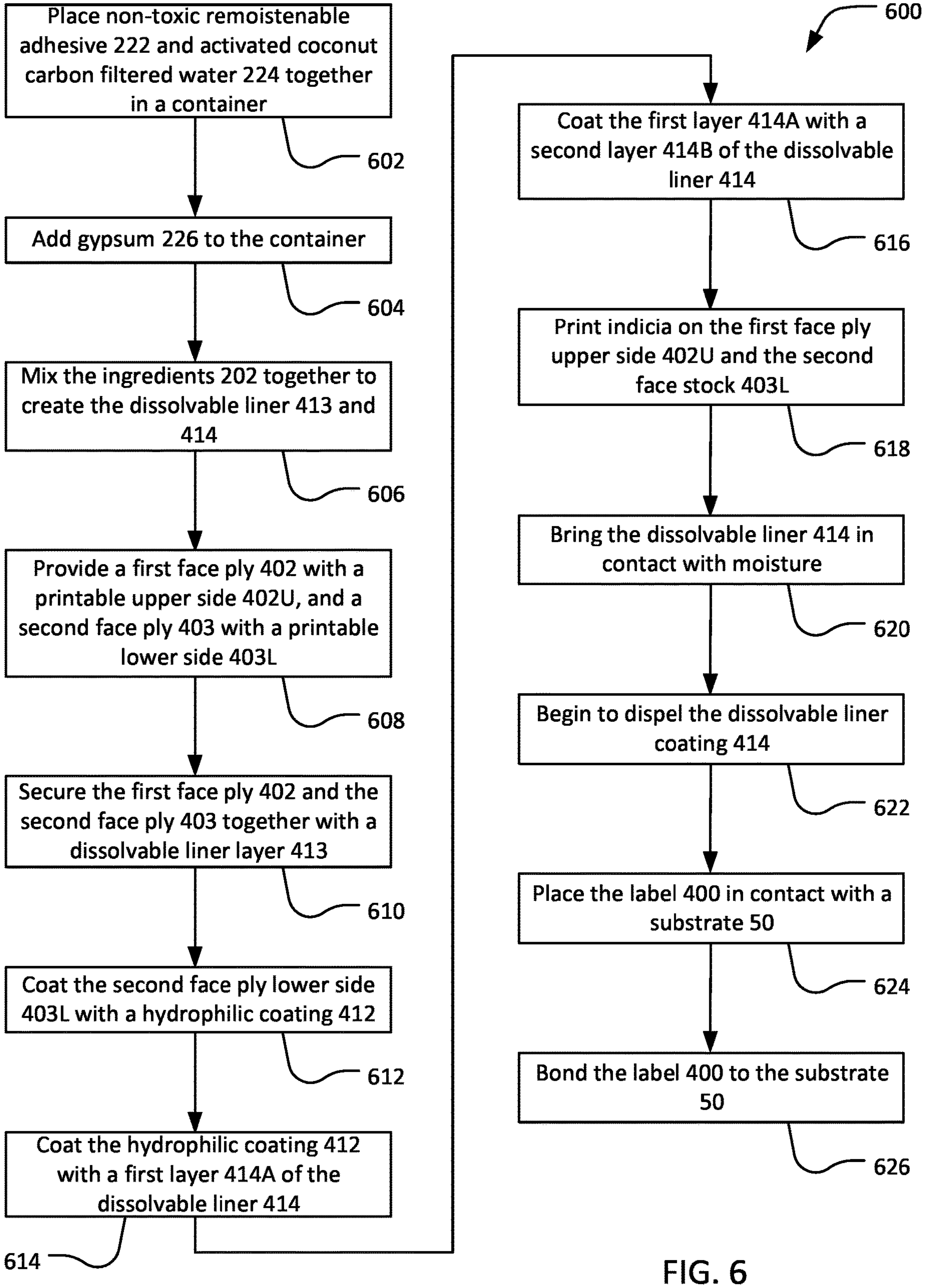
FIG. 6 is a flowchart illustrating a method of making and using the label employing the dissolvable adhesive liner of FIG. 5A.
Figure 7:
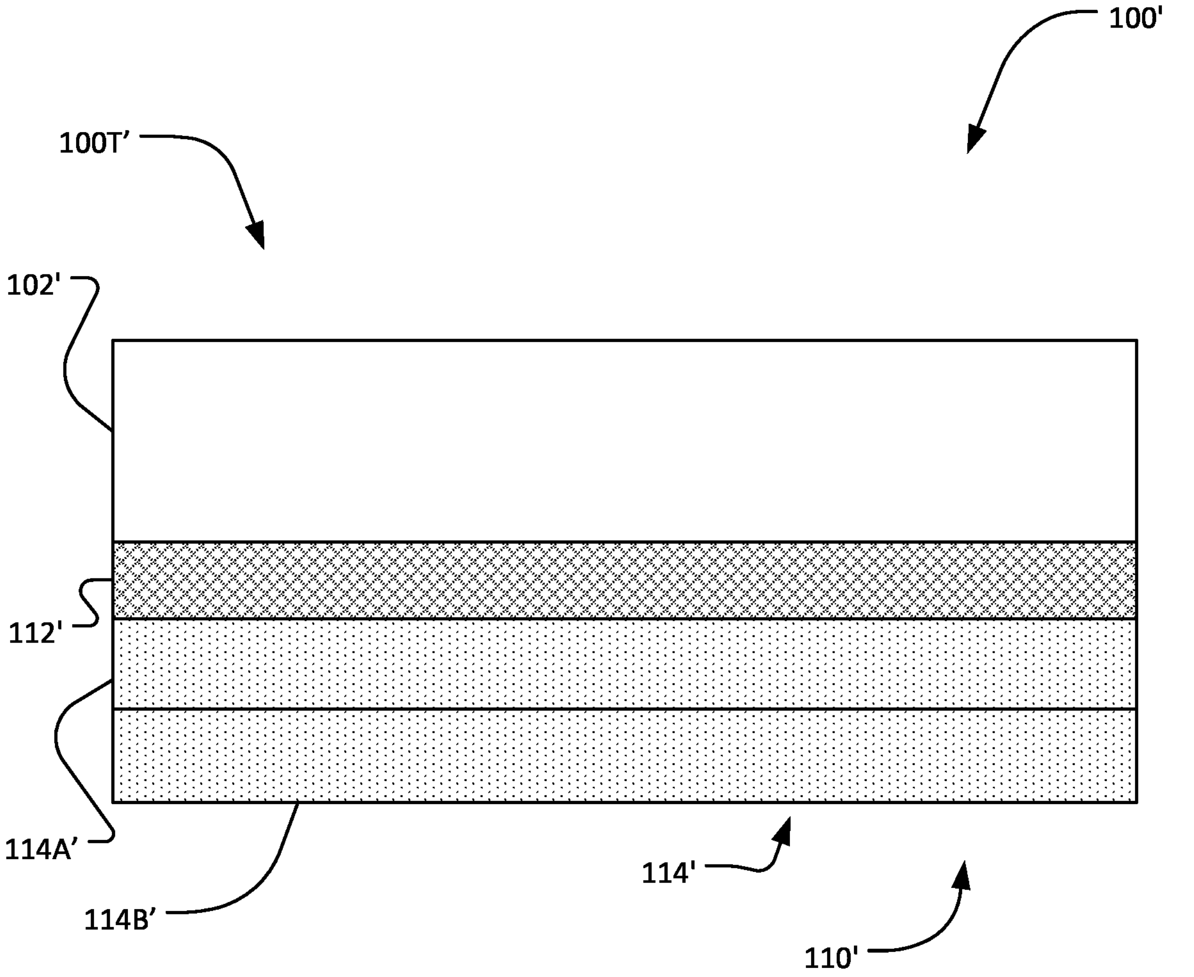
FIG. 7 is a schematic representation of tape employing a dissolvable adhesive liner for adhering to a substrate, according to still another embodiment of the present disclosure.
Figure 8:
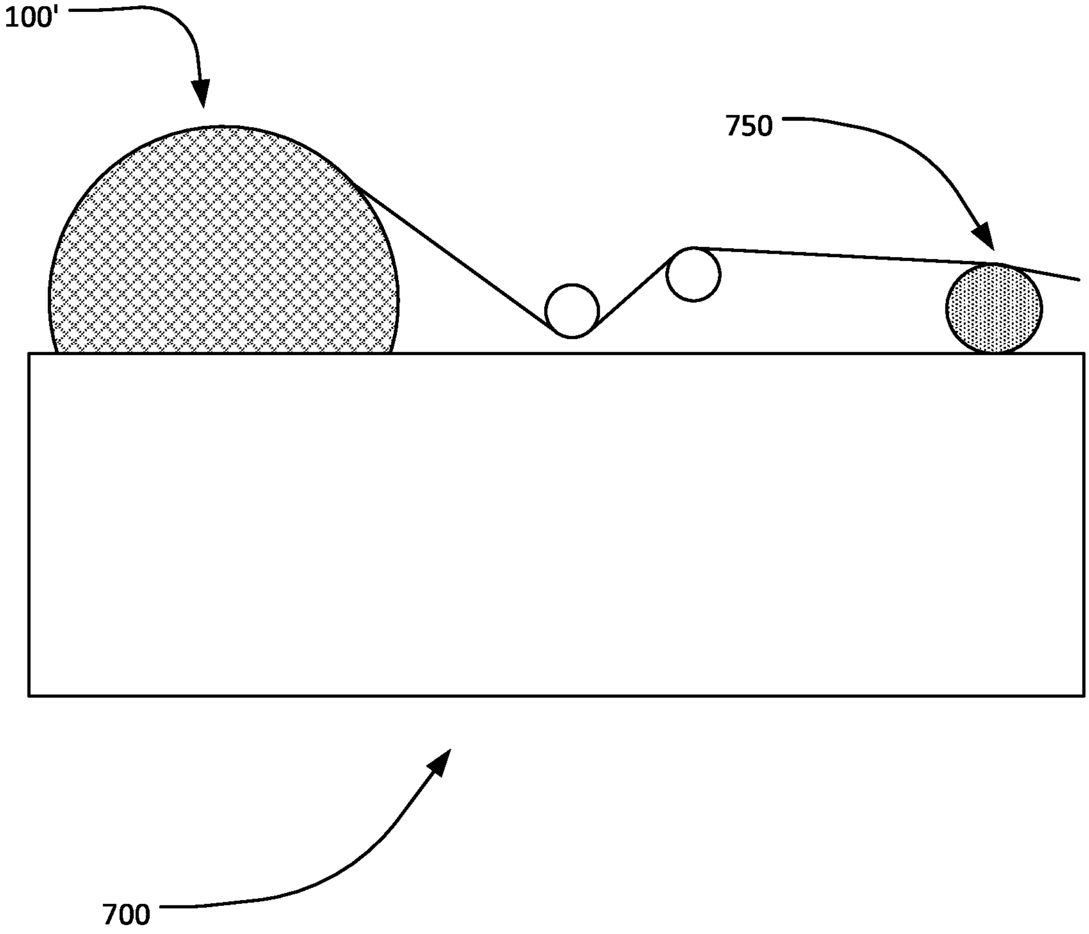
FIG. 8 is a side view of a tape dispenser employing the tape with the dissolvable adhesive liner of FIG. 7
Figure 9:
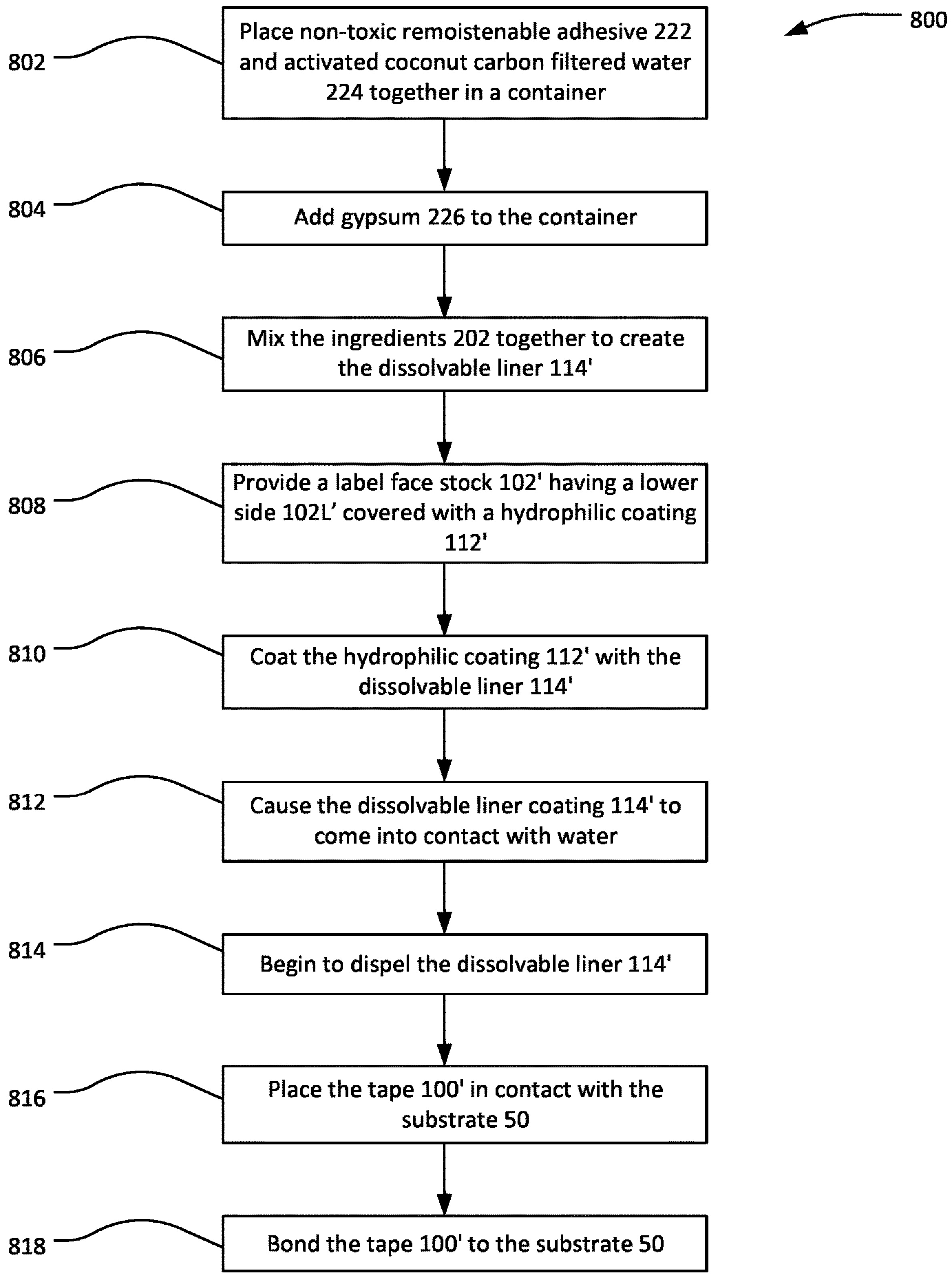
FIG. 9 is a flow chart illustrating a method of making and using the tape employing the dissolvable adhesive liner of FIG. 7.

The dissolvable liner of the present disclosure is first illustrated herein with a simplex (i.e., single ply) label 100 (FIGS. 2A-2E, and 4A-4B). Methods of making and using this simplex label 100 is then discussed (FIG. 3A-3B). Workings of the dissolvable liner are then detailed in connection with a duplex label 400 (FIGS. 5A-5C) along with a corresponding method of making and using the duplex label 400 (FIG. 6). Next, use of the dissolvable liner with a tape product 100', along with a method of making and using same, is illustrated (FIGS. 7-9). Next, duplex label embodiments 900 and 900" using the dissolvable adhesive liner and the displaceable liner concepts, respectively, are discussed (FIGS. 10A-10D). An associated method of making and using the labels 900 and 900" is illustrated (FIG. 11). Thereafter, systems (e.g., system 1000) and methods of fully or partially automating the process of using labels having the dissolvable liner of the present disclosure are discussed (FIGS. 12-18, 18A, 19-21). The artisan will understand that the label products, tape products, labeling systems and methods, et cetera, disclosed herein are exemplary and are not intended to be independently limiting.

Figure 2A:
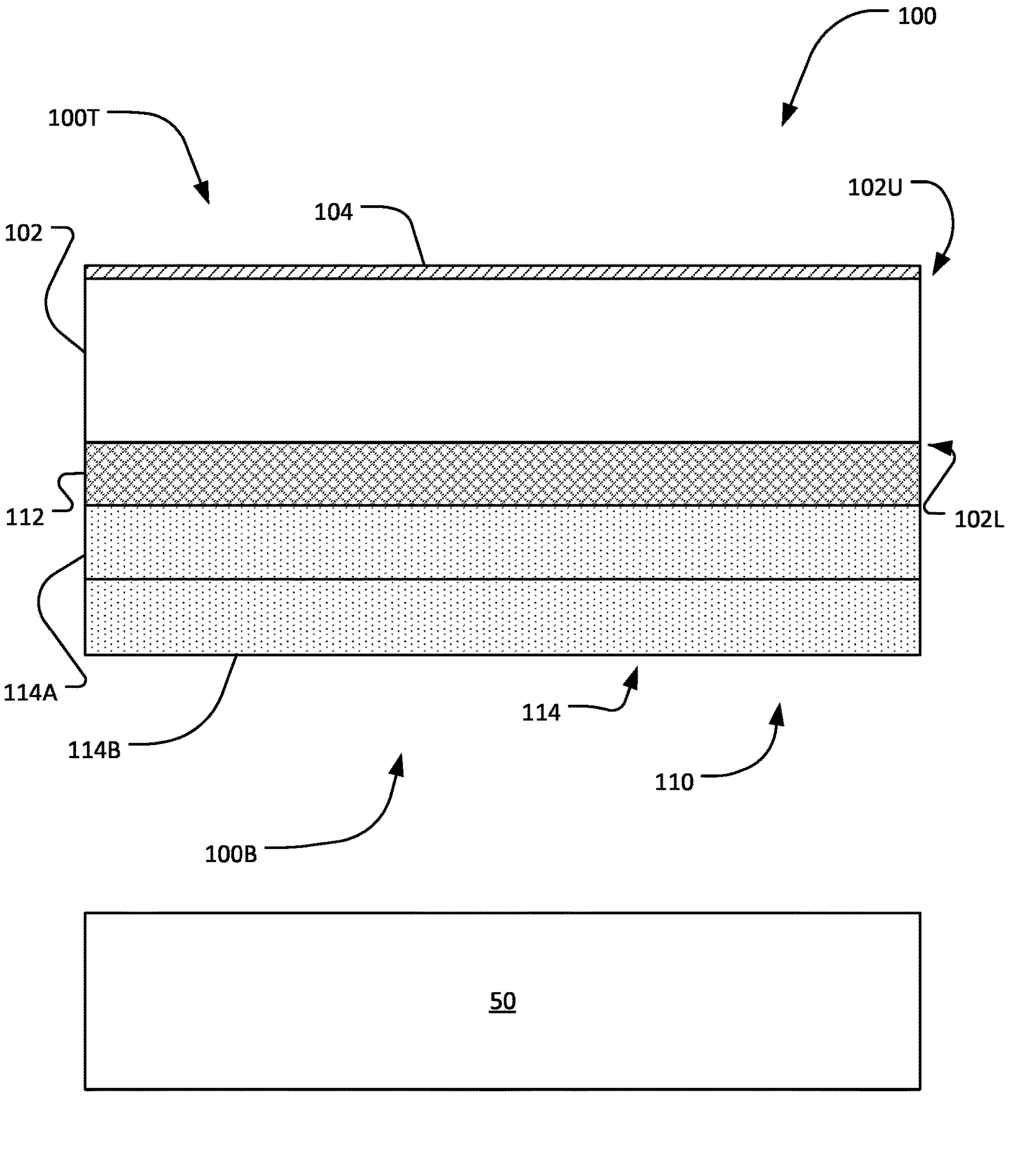
FIG. 2A is a schematic representation of a label employing a dissolvable adhesive liner for adhering to a substrate, according to an embodiment of the present disclosure.
Figure 3A:
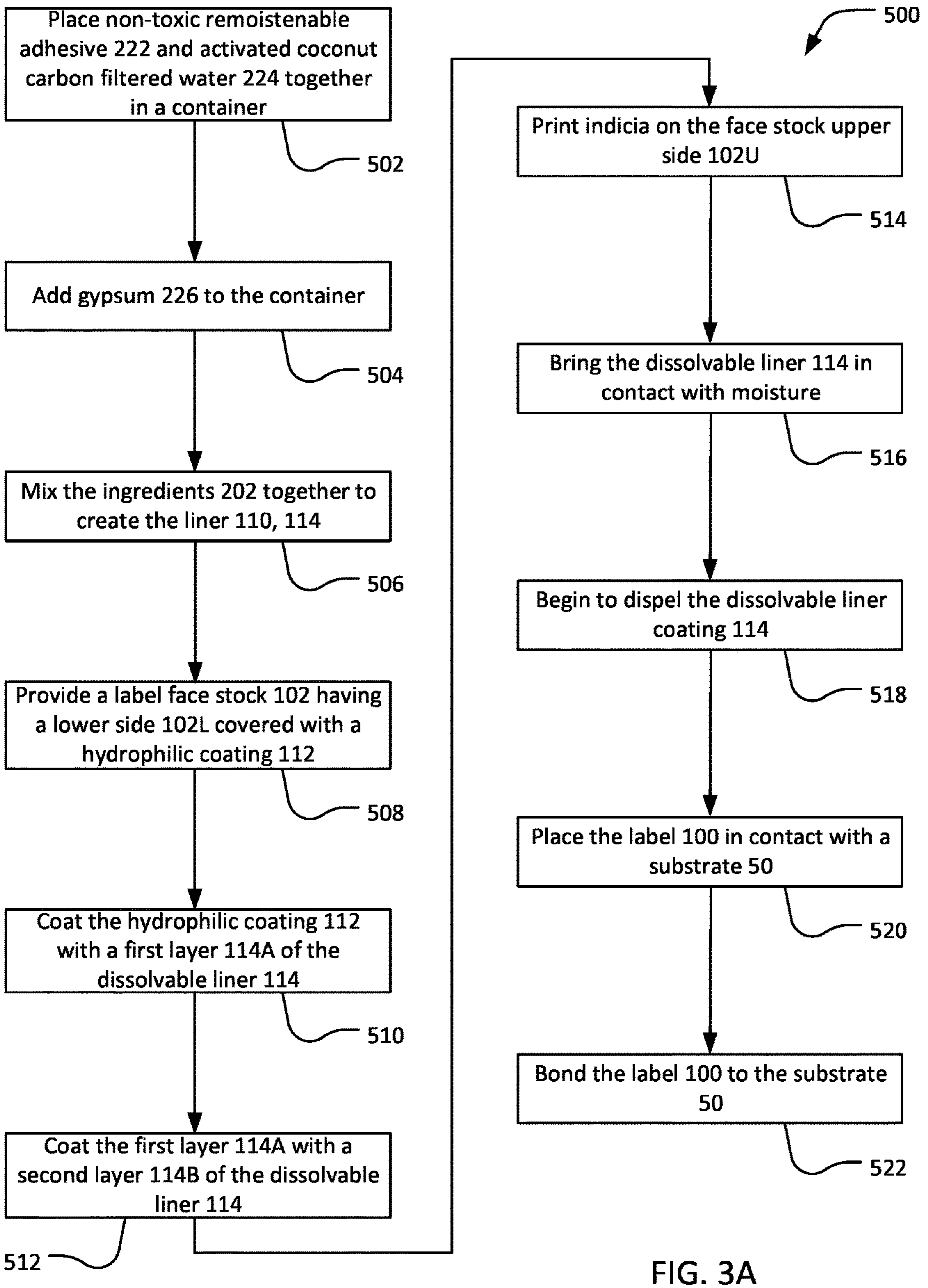
FIG. 3A is a flowchart illustrating a method of making and using the label employing the dissolvable adhesive liner of FIG. 2A.
Figure 3B:
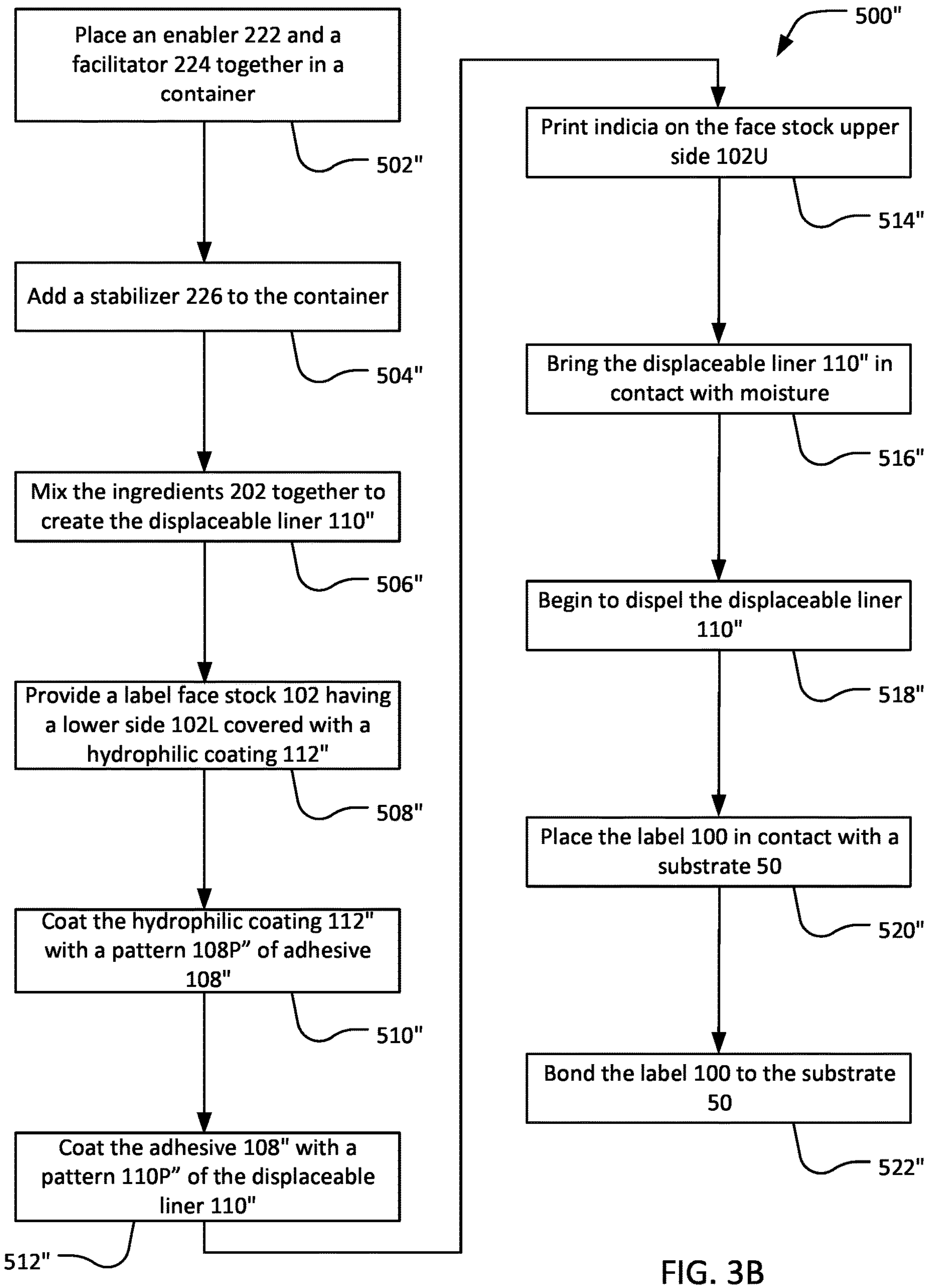
FIG. 3B is a flowchart illustrating a method of making and using the label employing the displaceable liner of FIG. 2B.

Focus is directed now to FIG. 2A, which shows an example embodiment 100 of a simplex (e.g., single ply) label having a dissolvable adhesive liner (or dissolvable adhesive liner system) 110, according to the teachings of the present disclosure. The illustrated label 100 has a top side 100T and a bottom side 100B. As discussed herein, indicia may be printed on the top side 100T and the label 100 may be adhered to a substrate 50 (e.g., a cardboard box, a piece of paper, an envelope, a porous surface, and/or any other suitable surface) at the bottom side 100B.

In more detail, the label 100 may have a face stock 102, which may have an upper side 102U and a lower side 102L. The face stock 102 may comprise a solitary ply 102, made, for example, of paper. This face stock 102 may also be referred to herein as a face ply to indicate that the face ply comprises a solitary ply. Alternately, in other embodiments, the face stock 102 may contain more than one ply. In other embodiments still, the face stock 102 may comprise a film (e.g., a clear plastic film) or other printable substrate.

The face ply 102, at its upper side 102U, may be provided with a topcoat 104. The topcoat 104, akin to the topcoat 16 of the prior art label 10, may be configured for the reception of printed (e.g., black and/or colored) indicia (e.g., content configured to be consumed by consumers). The dissolvable adhesive liner 110 may be located on the face ply lower side 102L.

In embodiments, the dissolvable adhesive liner (or liner system) 110 may include a hydrophilic layer 112 and a dissolvable liner 114. The dissolvable adhesive liner 110 may be selectively activatable between a first state and a second state. The first state may be a generally inert state where the dissolvable adhesive liner 110 acts in a similar manner to the conventional liner, and precludes the adhesion of the label 100 to surfaces (e.g., undesirable surfaces) until the label 100 is ready to be adhered to the substrate 50. The second state may be an "activated" state. The dissolvable adhesive liner 110 may be activated by bringing the dissolvable liner 114 thereof in contact with a fluid (e.g., water), which fluid may, e.g., be provided on the substrate 50. When the dissolvable liner 114 of the dissolvable adhesive liner 110 is brought into contact with the fluid on the substrate 50, the dissolvable adhesive liner 110 may activate and develop adhesive properties that allow the label 100 to be adhered to the substrate 50.

Broadly, the phrase "dissolvable liner", as used herein, refers to a cover or coating for covering or partially covering a first composition, which cover is specifically adapted to begin to dissolve or otherwise dispel when the cover is brought into contact with a second composition. When the cover is brought into contact with a third composition (either after the cover is brought into contact with the second composition or generally simultaneously therewith), the cover is configured to be absorbed into both the first composition and the third composition. In embodiments, the first composition may be the face ply 102 (by itself or together with the hydrophilic layer 112 disposed thereon), the second composition may be water (e.g., water vapor, liquid water, et cetera), and the third composition may be the substrate 50. That is, in embodiments, the dissolvable liner 114 may be a composition that: (a) covers the face ply 102 so as to preclude the face ply lower side 102L from undesirably sticking to another object or surface (the inert state); and (b) is configured to dissolve and/or dispel when the dissolvable adhesive liner is brought into contact with a fluid, and upon drying, exhibits adhesive properties (the activated state). The term "dissolvable adhesive liner," as used herein, specifically excludes a traditional liner ply or plies, such as paper coated at least in part with silicone or other release material, a film, et cetera. The term "dissolve" and/or "displace," as used herein, connotes that the dissolvable or displaceable adhesive liner coating, once wetted, is dispelled or otherwise displaced. The dissolvable adhesive liner and the displaceable adhesive liner may be absorbed (e.g., partially, wholly) by the substrate 50.

The dissolvable adhesive liner 110 may not have any (or any appreciable) adhesion when in the inert state. For example, while the dissolvable adhesive liner 110 is covering the face ply lower side 102L and before the dissolvable adhesive liner 110 is brought into contact with water, the dissolvable adhesive liner 110 may not cause the face ply lower side 102L to undesirably stick to objects that it touches. Conversely, the dissolvable adhesive liner 110 may be configured to exhibit adhesive properties once activated by a fluid. That is, the dissolvable adhesive liner 110 transitions to the activated state once there is sufficient contact between a fluid and the dissolvable adhesive liner 110.

The hydrophilic layer 112 may be located between the dissolvable liner 114 and the face ply lower side 102L. The hydrophilic layer 112 may have hydrophilic or semi-hydrophilic properties (e.g., an affinity for liquid absorption), and may assist with dispelling the dissolvable liner 114. The hydrophilic layer 112 may additionally provide structural support to the label 100, such as by preventing deformation and/or disintegration of the label 100 when the face ply 102 or the dissolvable adhesive liner 110 absorbs moisture (e.g., when they become saturated with a liquid). The hydrophilic layer 112 may be, for example, an inkjet coating. In another embodiment, soft feel coating or other such coating may be employed. In some embodiments, the hydrophilic layer 112 may be a combination of two or more hydrophilic coatings; alternately, the hydrophilic coating 112 may be a combination of substances that, when mixed together, have a tendency to absorb water.

While the hydrophilic coating 112 may cover the entire face ply lower side 102L, embodiments of the hydrophilic coating 112 may instead be arranged in a pattern. The pattern may be any pattern (e.g., a checkerboard pattern, a dot pattern, lines, stripes, random, etc.), and may but need not be symmetrical. The pattern may include openings (i.e., areas that are devoid of the hydrophilic coating 112).

As illustrated in Table 1 below, in embodiments the dissolvable liner 114 may include a remoistenable adhesive 222 (e.g., a non-toxic remoistenable adhesive), activated coconut carbon filtered water 224, and powdered gypsum 226. The activated coconut carbon filtered water 224—which, as is known, may be devoid of many of the impurities typically found in tap water—may desirably affect the viscosity of the remoistenable adhesive 222 for the instant application. Further, it is believed that the activated coconut carbon filtered water 224 may allow the final dissolvable liner 114 composition to disintegrate and dissolve readily upon the application of tap or other water (as discussed below). The powdered gypsum 226 may serve, among other things, to increase the stability and the temperature resistance of the remoistenable adhesive 222. The gypsum 226 may also serve as a blocking agent, such as by precluding the remoistenable adhesive 222 from being undesirably activated in humid ambient conditions. In embodiments, the dissolvable liner 114 may include different (e.g., additional) ingredients. For example, where it is desired to give the dissolvable liner 114 a hue (e.g., an off-white (or any other) hue such that the dissolvable liner 114 resembles the traditional paper liners), a colored pigment may be included to impart such a hue to the dissolvable liner 114.

Table 1 below shows the constituents of the dissolvable liner 114 (also referred to herein as a "dissolvable liner coating"), according to one illustrative embodiment of the present disclosure, with which the label 100 (specifically the bottom side 100B thereof) may be coated to preclude the face ply 102 from undesirably adhering to objects and to allow the label to be adhered to the substrate 50 when desired. The dissolvable liner 114 may temporarily cover the face ply lower side 102L and the hydrophilic coating 112 while the topcoat 104 is exposed for printing. Because the label 100 does not use a conventional adhesive layer, the label 100 may be printed using any technology now known or subsequently developed (such as a direct thermal printer, a thermal transfer printer, a laser printer, an inkjet printer, et cetera). The dissolvable adhesive liner 110 in its inert state may preclude adhesion between the label 100 and objects with which the label 100 comes into contact with (e.g., a printer roller, another label, small debris, a table or other surface) before it is time to adhere the label 100 to the substrate 50. The dissolvable adhesive liner 110 may be heat-resistant and may be able to readily withstand the relatively high temperatures encountered by labels in printers (e.g., laser printers). Further, the dissolvable liner 114—which may comprise a non-toxic remoistenable adhesive as a constituent thereof—may as a whole be a non-sticky substance when dry (i.e., when in the inert state). Thus, the dissolvable adhesive liner 110 itself may not undesirably stick to a surface before the label 100 is ready to be applied to the substrate 50.

TABLE 1

DISSOLVABLE LINER 114

| No. | Ingredient 202 | Quantity range 204 | Preferred quantity 206 |
|---|---|---|---|
| 1 | Non-toxic remoistenable adhesive 222 | 2 lbs. to 6 lbs. | 4 lbs. |
| 2 | ACC water 224 | 0.125 lbs. to 0.375 lbs. | .25 lbs. |
| 3 | Gypsum 226 | 1-50 heaping teaspoons (about 0.05 lbs. to 2.8 lbs.) | 21 heaping teaspoons (about 1.2 lbs) |

The quantity ranges 204 and the preferred quantities 206 of the various ingredients 202 listed above are merely exemplary and are not intended to be independently limiting. For example, in embodiments, more activated coconut carbon filtered water 224 ("ACC water") may be added to reduce the viscosity of the dissolvable liner coating 114, more gypsum 226 may be added to further enhance the stability of the adhesive 222, et cetera. Further, in embodiments, the preferred quantities 206 of the various ingredients 202 listed above may be proportionally reduced or increased for smaller or larger applications, respectively. The preferred quantities 206 listed above will yield a volume of about 5.45 lbs. of the dissolvable liner coating 114, which may be used to coat many thousands of labels 100 to cover the face ply lower sides 102L thereof.

In an embodiment, the remoistenable adhesive 222 may have a vapor pressure at 20° C. of about 23.4 hPa, a density at 20° C. of about 1.08 g/cm$^3$, a pH value at 20° C. of 4.0-6.0, a flash point of over 232° C., and a VOC content of 1.6 g/l/0.01 lb/gl. For example, in an embodiment, the remoistenable adhesive 222 may be the PriscoBond 121-H remoistenable adhesive commercially available by Prisco®. Alternately or additionally, in other embodiments, the remoistenable adhesive may be one or more of the remoistenable adhesives disclosed in U.S. Pat. No. 3,574,153 to Sirota, U.S. Pat. No. 4,575,525 to Wancome et al., U.S. Pat. No. 4,623,688 to Flanagan, U.S. Pat. No. 5,296,535 to Fazioli et al., each of which are incorporated by reference herein. Other remoistenable adhesives known to the artisan and/or subsequently developed may likewise be employed. Applicant's experimentation confirms that off-the-shelf remoistenable adhesives 222 disclosed herein, such as the PriscoBond 121-H product, cannot suitably be used as adhesive covers for labels until the other ingredients 202 (i.e., the ACC water 224 and Gypsum 226) are added thereto.

In embodiments, the gypsum 226 in the dissolvable liner 114 may be replaced with corn starch. For example, about 0.3 lbs. of cornstarch may be mixed with about 0.4 lbs. of ACC water and about 6 lbs. of PriscoBond 121-H to create a dissolvable liner 114 mixture that, in certain applications, provides for a stronger bond as compared to dissolvable liner comprising gypsum 226.

The dissolvable liner 114 may cover an entirety of the hydrophilic coating 112 (e.g., the boundaries of the hydrophilic layer 112 may define the layer of dissolvable liner 114). However, in embodiments, a pattern of dissolvable liner 114 may be applied to the label 100. The pattern may be any pattern (e.g., a checkerboard pattern, a dot pattern, lines, stripes, random, etc.), and may but need not be symmetrical. The pattern may include openings (i.e., areas that are devoid of the dissolvable liner 114).

As discussed above, in linerless labels, the adhesive at the bottom sides of the labels is uncovered, and the top sides of the labels contain silicone (or other release coating), which precludes one label from undesirably sticking to another label in contact therewith (e.g., when the linerless labels are stacked together). While such a configuration precludes undesirable attachment between one label to another (e.g., precludes securement of stacked linerless labels), the exposed adhesive of the linerless labels may nevertheless cause the linerless labels to undesirably adhere to other objects with which the linerless labels come into contact with. In the dissolvable adhesive liner label 100, conversely, there is no equivalent to a conventional adhesive layer. Instead, the dissolvable adhesive liner 110, in its inert state, may prevent the label 100 from undesirably attaching to a surface. When the user desires to adhere the face stock 102 to the substrate 50, the user may then activate the dissolvable adhesive liner 110 (e.g., via an applied fluid). As discussed herein, unlike labels having traditional liner plies, the user may ready the label 100 for adhesion to the substrate 50 without the need to discard any liner in a waste basket or elsewhere.

In some embodiments, a displaceable liner 110" (FIGS. 2B-2E) may be used in place of or in combination with the dissolvable adhesive liner 110. The displaceable liner 110" may function similarly to the dissolvable adhesive liner 110 in that the displaceable liner 110" may be entirely or mostly inert (i.e., nonreactive, unable to substantially adhere to a surface) in a first state, and may exhibit adhesive properties in a second state. The displaceable liner 110" may transition between the first state and the second state through the application of a fluid (e.g., water) to the displaceable liner 110". Once activated, the displaceable liner 110" may be brought into contact with the substrate 50 for adhesion therebetween. Unlike the dissolvable adhesive liner system 110 (which includes a hydrophilic layer 112 and one or more layers of dissolvable liner 114, and which is not used with a traditional layer of adhesive (e.g., hot-melt adhesive)), the displaceable liner 110" may be used with a layer of traditional adhesive (e.g., hot melt adhesive, as is commonly used in the label industry). When the displaceable liner 110" is brought into contact with a fluid, the displaceable liner 110" dispels or displaces, revealing the adhesive layer used therewith for adhesion to the substrate 50. Those of skill in the art would appreciate that the displaceable liner 110" may be used alternately or additionally to the dissolvable adhesive liner 110 and its variants in any of the dissolvable adhesive liner label embodiments described herein.

Figure 2B:
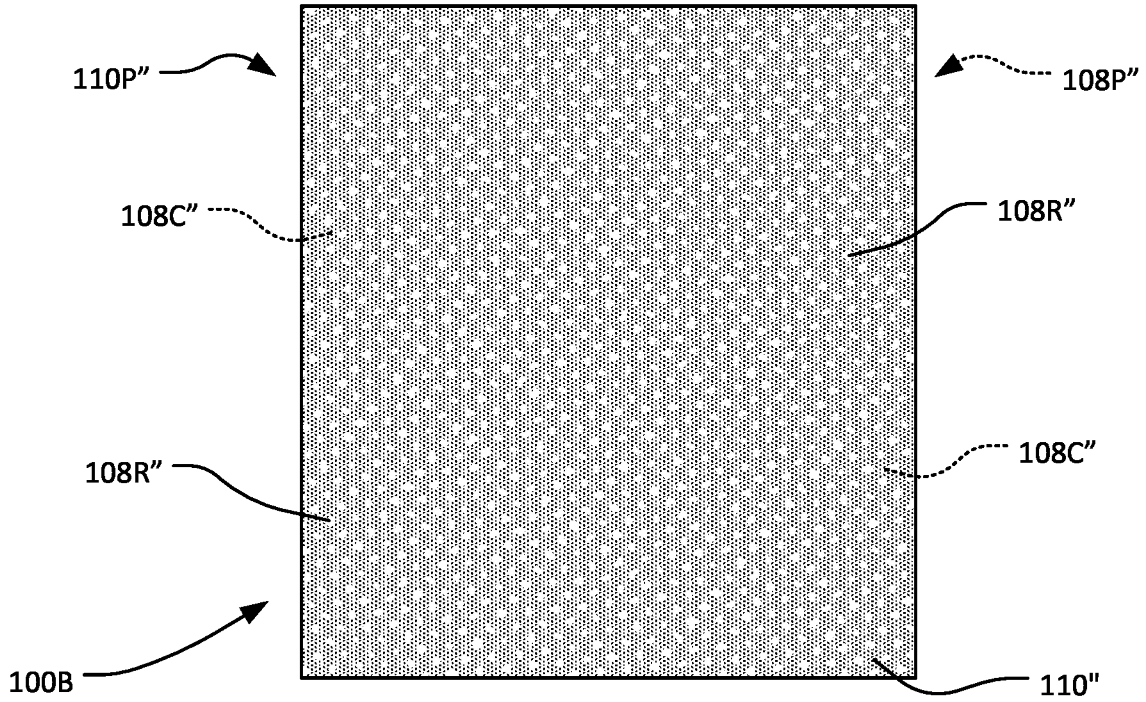
FIG. 2B is a bottom view of a label employing a displaceable liner for adhering to a substrate in a first state, according to another embodiment of the present disclosure.
Figure 2C:
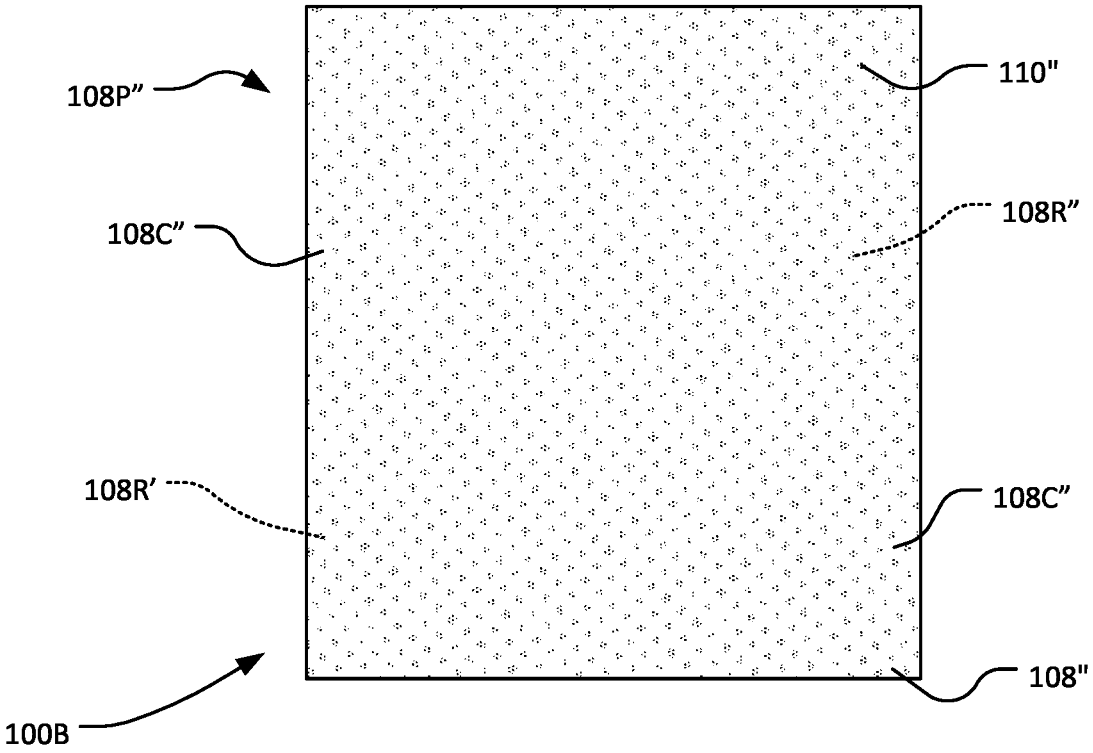
FIG. 2C is a bottom view of the label employing a displaceable liner of FIG. 2B, in a second state.
Figure 2D:
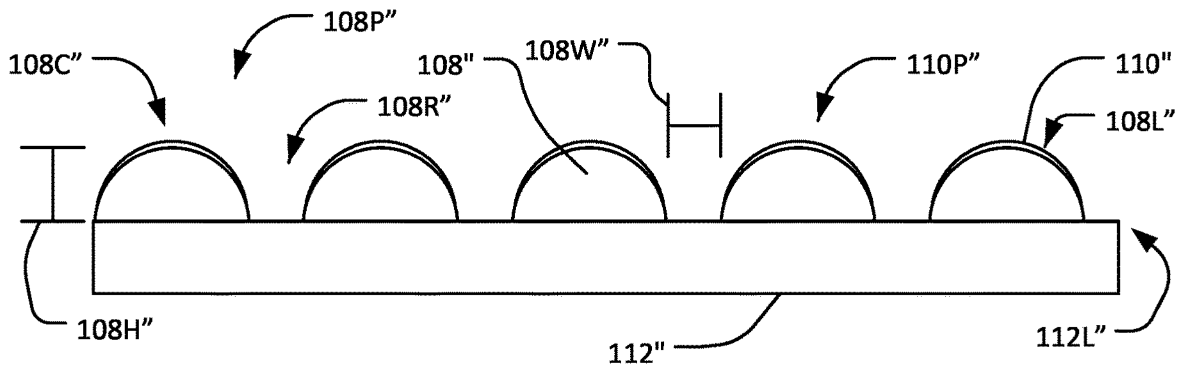
FIG. 2D is a schematic representation of the displaceable liner of the label employing the displaceable liner of FIG. 2B, in the first state.

To illustrate the workings of the displaceable liner 110", focus is directed to FIG. 2D. Just as when the dissolvable adhesive liner system 110 is employed, the label 100 may have a hydrophilic layer 112" located on a face ply lower side 102L (FIG. 2D) when the displaceable liner 110" is used with the label 100. The hydrophilic layer 112" may have hydrophilic or semi-hydrophilic properties (e.g., a substantial affinity for liquid absorption). The hydrophilic layer 112" may additionally provide structural support to the label 100, such as by preventing deformation and/or disintegration of the label 100 when the face ply 102 or the displaceable liner 110" absorbs moisture (e.g., when they become saturated with a liquid). The hydrophilic layer 112" may be, for example, an inkjet coating. In another embodiment, soft feel coating or other such coating may be employed. In some embodiments, the hydrophilic layer 112" may be a combination of two or more hydrophilic coatings; alternately, the hydrophilic coating 112" may be a combination of substances that, when mixed together, have a tendency to absorb water. While the hydrophilic coating 112" may cover the entire face ply lower side 102L, in embodiments the hydrophilic coating 112" may instead be arranged in a pattern. The pattern may be any pattern (e.g., a checkerboard pattern, a dot pattern, lines, stripes, random, et cetera), and may but need not be symmetrical. The pattern may include openings (i.e., areas that are devoid of the hydrophilic coating 112"). In certain applications, the face ply 102 may inherently include the desirable properties of a hydrophilic layer 112" (e.g., the face ply 102 may have the ability to draw in water, may have sufficient structural integrity, et cetera) such that use of a separate hydrophilic coating 112" may be unnecessary. For instance, where the face ply 102 is relatively thick, it may by itself emulate a relatively thin face ply 102 that is layered with a hydrophilic coating 112".

A primary difference between the dissolvable adhesive liner system 110 and the displaceable liner 110" may be that the displaceable liner 110" may be used with a layer 108" of traditional (e.g., hot-melt adhesive), whereas this layer of traditional adhesive may not be required when employing the dissolvable adhesive liner system 110. The adhesive layer 108" may be located on a hydrophilic layer lower side 112L", and may be covered (e.g., wholly, partially) by the displaceable liner 110" (i.e., the displaceable liner 110" may initially be located on an adhesive layer lower side 108L"). The adhesive layer 108" may be any suitable adhesive now known or subsequently developed, such as a pressure sensitive adhesive, a hot melt adhesive, et cetera. In a currently preferred embodiment, the adhesive 108" may be a hot-melt adhesive. In use, when the displaceable liner 110" is displaced from the adhesive 108" to expose the adhesive 108" as discussed herein, the adhesive layer 108" may be used to secure the face ply 102 to the substrate 50. Upon displacement of the displaceable liner 110", the exposed adhesive 108" may contact and bond with the substrate 50 to cause the face ply 102 to become secured to the substrate 50; the displaceable liner 110", conversely, may not contact the substrate 50 and therefore may not interfere with the bond between the substrate 50 and the label 100.

In embodiments employing the displaceable liner 110", it may be important to arrange the adhesive layer 108" in a pattern 108P" (FIG. 2D) having areas comprising adhesive and areas devoid of adhesive (or at least having areas having a substantially lower concentration of adhesive as compared to other areas of the adhesive pattern 108P"). In these embodiments, the adhesive layer 108" may cover only portions of the hydrophilic layer 112" (i.e., the hydrophilic layer 112" may be uncovered by adhesive 108" in portions of the adhesive pattern 108P" devoid of the adhesive). The adhesive pattern 108P" may be any pattern (e.g., a checkerboard pattern, a dot pattern, lines, stripes, random, etc.), and may but need not be symmetrical. As discussed herein, the adhesive layer pattern 108P" may facilitate the workings of the displaceable liner 110" and may, in some embodiments, be a requirement therefor to ensure a secure bond between the label 100 and the substrate 50. While not required, the displaceable liner 110" may be arranged coextensively with the adhesive pattern 108P", although the displaceable liner 110" may be arranged in a different pattern or may be arranged in solid layers underneath the adhesive pattern 108P". The displaceable liner 110" may initially cover the adhesive 108" and ensure the adhesive 108" does not undesirably contact a surface (e.g., the printer, the conveyer belt, et cetera) or debris to cause the label 100 to inadvertently bond to such surfaces or debris; upon activation, the displaceable liner 110" may get displaced as discussed herein and consequently expose the adhesive 108" to allow for securement of the label 100 to a substrate 50. Thus, the displaceable liner 110" may selectively shield the adhesive 108", in effect functioning like a traditional liner, until such time that exposing the adhesive 108" to bond the label 100 with the substrate 50 is desired.

A benefit of using the adhesive layer 108" in the pattern 108P" is that the pattern may include openings (i.e., areas that are completely or at least partially devoid of the adhesive layer 108"). For example, in embodiments, the adhesive layer pattern 108P" may have a one or more of each of recesses 108R" and crests 108C", as shown in FIGS. 2B-2E, which are used to illustrate example operation of displaceable liner 110" in view of the adhesive 108". The adhesive pattern crests 108C" may be areas of the adhesive pattern 108P" on the label 100 (e.g., at the lower side 112L" of the hydrophilic layer) where the adhesive 108" is present, and the adhesive pattern recesses 108R" may be areas of the adhesive pattern 108P" at least partially devoid of the adhesive 108". Each adhesive crest 108C" may have a height 108H" (see FIG. 2E), which may (though need not be) substantially the same as the height of adjacent adhesive crests 108C". This height 108C" may correspond to the thickness of the adhesive layer 108". Further, each adhesive crest 108C" may be spaced apart (e.g., laterally spaced apart) from an adjoining adhesive crest 108C" by a distance 108W", which distance may be equal to a width of an adhesive pattern recess 108R". Each adhesive recess 108R", encapsulated on one or more sides by adjoining crests 108C", may form a "pocket" (or a "liner receiving region") for receiving the displaceable liner 110" once the displaceable liner 110" is activated by a fluid. Reception of the displaceable liner 110" within the pockets 108R" may be facilitated by the hydrophilic coating 112" underneath the adhesive layer recesses 108R", which coating 112" may facilitate the displacement of the displaceable liner 110" by drawing in the displaceable liner 110" into the pockets 108R" upon activation. The adhesive pattern 108P" may be arranged in any suitable manner such that the pockets 108R" thereof are configured to receive the displaceable liner 110" upon activation. In some embodiments, the recesses 108R" may contain some adhesive 108" but a height of the adhesive therein may be less than the height 108H" of the adhesive crests 108C", thereby allowing for the displaceable liner 110" to be received within the recesses 108R".

In more detail, the adhesive crests 108C" may define the boundaries of the adhesive recesses 108R". For example, the adhesive crests 108C" may be arranged along the label 100 in a plurality of lines or crisscrossed lines (i.e., a grid pattern), and a plurality of adhesive recesses 108R" may be located in the spaces between these lines of adhesive. The adhesive crests 108C" may each have any suitable width, height, and spacing, so long as the displaceable liner 110" situated thereon can cleanly transition from the adhesive crests 108C" to the pockets 108R" upon activation.

FIG. 2B shows a bottom view of an example label 100. Prior to activation, the displaceable liner 110" may be disposed on the crests 108C" of the adhesive pattern 108P". The crests 108C" in FIG. 2B are thus labeled with a dashed line to indicate that this portion of the adhesive pattern 108P" lies beneath the displaceable liner 110". Once the displaceable liner 110" is activated (e.g., by water), the displaceable liner 110" may be displaced from above the crests 108P" to within the recesses 108R" or pockets, as shown in FIG. 2C. The crests 108C" in FIG. 2C are demarcated with a solid line to indicate the displaceable liner 110" has moved from the crests 108C" into the pockets 108R", thereby exposing the adhesive crests 108C".

Figure 2E:
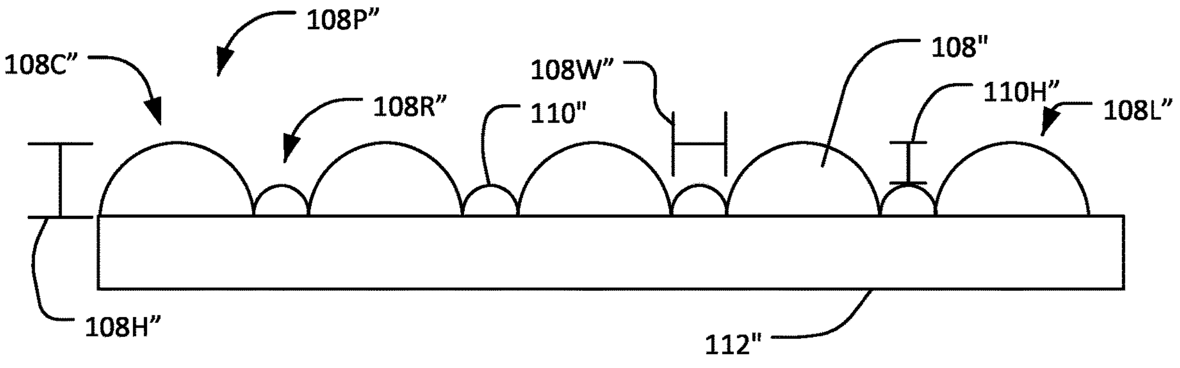
FIG. 2E is a schematic representation of the displaceable liner of the label employing the displaceable liner of FIG. 2B, in the second state.

To illustrate further, FIG. 2D shows that the displace liner 110" may overlie the adhesive crests 108C" before the liner 110" is activated. Prior to activation, the adhesive recesses 108R", which are devoid of adhesive 108", may also be devoid of the displaceable liner 110". Once activated with water or another fluid, the displaceable liner 110" may transition to within the recesses 108R" and expose the crests 108C" of the adhesive layer 108", as shown in FIG. 2E. The exposed adhesive crests 108C" may now be usable to secure the label 100 to the substrate 50. In embodiments, the adhesive crests 108C" may form a bond with the substrate 50 whereas the displaceable liner 110" within the pockets 108R" may not contact the substrate 50 because of the appreciably greater height 108H" of the crests 108C" relative to a height 110H" of the displaceable liner 110" within the pockets 108R". To this end, a thickness of the adhesive 108" layer may be substantially greater than a thickness of the displaceable liner 110". If an undesirably thick layer of the displaceable liner 110" is disposed on the crests 108C", upon activation the displaceable liner 110" may not fit within the pockets 108R" and thus lead to insufficient exposure of the adhesive 108".

While FIGS. 2B and 2C show a lined grid pattern of adhesive crests 108C" and recesses 108R", other suitable adhesive patterns 108P" are contemplated and are within the scope of the disclosure (e.g., concentric shapes, checkered, random, et cetera). Further, while FIGS. 2D and 2E show adhesive crests 108C" that are generally rounded, other suitable adhesive layer 108" shapes are contemplated and are within the scope of this disclosure (e.g., rectangular, triangular, random, et cetera). In embodiments, an important consideration may include ensuring that the pattern 108P" has suitably sized pockets 108R" or regions to receive the specific type and amount of displaceable liner 110" being used upon activation.

As noted, the displaceable liner 110", before it is activated, may shield the adhesive 108" and preclude the adhesive layer 108" from coming into contact with—and thus adhering to—undesirable surfaces or debris. The displaceable liner 110" may be displaced, i.e., may be made to travel from its original location vertically adjacent the crests 108C" into the recesses 108R" to expose the adhesive crests 108C" (i.e., transition from being vertically adjacent the crests 108C" be being laterally adjacent the crests 108C") by applying a fluid to the displaceable liner 110". In some embodiments, at least a part of the activated displaceable liner 110" may be dissolved into the label 100 (e.g., into the hydrophilic layer 112" thereof). While not required, depending on the configuration of the displaceable liner 110" and the substrate, in some embodiments a part of the displaceable liner 110" may contact the substrate 50 and be dissolved into the substrate 50. Such contact between the displaceable liner 110" and the substrate 50, however, is not needed, when bonding the label 100 to the substrate 50.

In effect, the displaceable liner 110" may be a liner that acts in a similar manner to the conventional liner, and precludes the adhesion of the label 100 to surfaces (e.g., undesirable surfaces) until the label 100 is ready to be adhered to the substrate 50. When the displaceable liner 110" is brought into contact with the fluid on the substrate 50, the displaceable liner 110" may actuate and dispel or otherwise be displaced from its original location to expose the adhesive 108".

Broadly, the phrase "displaceable liner", as used herein, refers to a cover or coating for covering a first composition, which cover is specifically adapted to begin to displace or otherwise dispel when the cover is brought into contact with a second composition. Upon such contact, the cover may be displaced such that the first composition is usable for contacting a third composition. In embodiments, the first composition may be the adhesive layer 108", the second composition may be water (e.g., water vapor, liquid water, et cetera), and the third composition may be the substrate 50. That is, in embodiments, the displaceable liner 110" may be a composition that: (a) covers the adhesive layer 108" so as to preclude the adhesive layer lower side 108L" from undesirably sticking to another object or surface (the inert state); and (b) is configured to displace and/or dispel when the displaceable liner is brought into contact with a fluid, thereby exposing the traditional adhesive layer 108" for securement to a substrate 50 (the actuated or activated state). The term "displaceable liner", as used herein, specifically excludes a traditional liner ply or plies, such as paper coated at least in part with silicone or other release material, a film, et cetera. The term "displace", as used herein, connotes that the displaceable liner coating, once wetted, is dispelled, dissolved, or otherwise moves from its original location to another location.

In embodiments, the inactivated displaceable liner 110" may not have any (or any appreciable) adhesion. For example, while the displaceable liner 110" is covering the adhesive layer lower side 108L" prior to displacement, the displaceable liner 110" may not undesirably stick to objects that it touches. The displaceable liner 110" itself, even upon activation, may not form a bond with substrate in contact therewith where that substrate is nonporous. The activated displaceable liner 110" itself may in embodiments be capable of forming a bond with certain porous substrates upon contact; however, this bond may be unsuitably weak and the strength thereof may pale in comparison relative to the bond formed by the adhesive 108" (e.g., the hotmelt). Further, if the objective were to cause the displaceable liner 110" to contact the substrate 50, the amount of displaceable liner 110" on the label 100 may need to be increased, which may then detract from the transition thereof into the pockets 108R" and unduly interfere with the bond to be formed by the adhesive layer 108". In view of these considerations, in embodiments, only the adhesive 108" may be used to bond the label 100 to the substrate 50 and the dissolvable liner 110" may be used not for any bonding capabilities but to move out of the way of the adhesive 108" when desired to allow the adhesive 108" to create the bond.

In embodiments, the constituents of each of the dissolvable liner 114 and the displaceable liner 110" may include an enabler 222, a facilitator 224, and a stabilizer 226. In some embodiments, the displaceable liner 110" may also include a slip agent 228.

The enabler 222 may be the base or main ingredient of the displaceable liner 110". In embodiments, the enabler 222 may comprise a remoistenable adhesive or other similar material. The artisan will understand from the discussion herein that the displaceable liner 110", once composed, behaves disparately from the enabler 222 and from any of its other ingredients separately.

The facilitator 224 may be an ingredient that, upon contact with a fluid (e.g., water), facilitates dissolving of the dissolvable liner 114 and/or the displacement of the displaceable liner 110" into the pockets 108R". The facilitator 224 may do so by desirably impacting the properties (e.g., the viscosity) of the enabler 222. In an embodiment, the facilitator 224 may be activated coconut carbon water 224A, which, as is known, may be devoid of many of the impurities typically found in tap water. Applicant's experimentation has shown that use of activated coconut carbon water as the facilitator 224 as opposed to tap water allows the dissolvable liner 114 and/or displaceable liner 110" to be activated by a larger group of fluids.

In embodiments, the stabilizer 226 may serve, among other things, to increase the stability and the temperature resistance of the enabler 222. The stabilizer 226 may also serve as a blocking agent, such as by precluding the enabler 222 from being undesirably activated in humid ambient conditions. In some embodiments, the stabilizer 226 may influence other properties of the dissolvable liner 114 and/or the displaceable liner 110", such as the surface tension thereof.

The slip agent 228 may be, for example, a release material (e.g., safflower oil 228A, silicone 228B, etc.) that increases the temperature resistance properties and/or the non-adhesion properties of the displaceable liner 110". The slip agent 228, which may make up about 0.25% by weight the displaceable liner 110" mixture, may facilitate the use of certain printing methods with the label 100, such as laser printing or direct thermal printing. For example, the slip agent 228 may ensure that the adhesive crests 108C" do not ooze out into the recesses 108R" because of the high temperatures to which the label 100 is subjected in laser printers. In embodiments, the slip agent 228 may be omitted.

In embodiments, the dissolvable liner 114 and/or the displaceable liner 110" may include different (e.g., alternate, additional) ingredients that may influence the properties and/or the applicability of the dissolvable liner 114 and displaceable liner 110", respectively. For example, where it is desired to give the dissolvable liner 114 and/or displaceable liner 110" a hue (e.g., an off-white—or any other—hue such that the liner resembles a traditional paper liner), a colored pigment may be included to impart such a hue to the liner ". As another example, embodiments of the dissolvable liner 114 and/or the displaceable liner 110" may incorporate various ingredients whose properties are more compatible with certain types of substrates 50. Tables 2, 3, and 4 illustrate various example constituents of the displaceable liner 110".

Table 2 below shows the constituents 202A of a displaceable liner 110" in an embodiment 110A. This embodiment 110A may include a mixture of non-toxic remoistenable adhesive 222A, activated carbon coconut water 224A ("ACC water"), precipitated calcium carbonate (PCC) 226A, and safflower oil 228A. The label 100 (specifically the bottom side 100B thereof, or in embodiments, the hydrophilic coating disposed at the bottom side 100B) may then be coated with this mixture to preclude the face ply 102 from undesirably adhering to objects and to allow the label to be adhered to the substrate 50 when desired.

TABLE 2

| DISPLACEABLE LINER 110A | | | |
|---|---|---|---|
| No. | Ingredient 202A | Quantity range 204A | Preferred quantity 206A |
| 1 | Enabler 222: Non-toxic remoistenable adhesive 222A | 1 lbs. to 5 lbs. | 3 lbs. |
| 2 | Facilitator 224: ACC water 224A | 0.5 lbs. to 1.5 lbs. | 1 lbs. |
| 3 | Stabilizer 226: Precipitated calcium carbonate 226A | 0.09 lbs. to 0.27 lbs. | 0.18 lbs. |
| 4 | Slip Agent 228: Safflower oil 228A | 0.004 lbs. to 0.017 lbs. | 0.0105 lbs. |

Applicant's experiments have shown that this combination of ingredients 202A may enable the displaceable liner 110A to readily be displaced from the adhesive crests 108C" to the adhesive recesses 108R" once activated by a fluid (e.g., water) to expose the adhesive crests 108C". By retreating within the label 100 (e.g., the recesses 108R" therein), the activated displaceable liner 110A may be precluded from interfering with the bond between the adhesive 108" and the substrate 50. If a substantial part of the displaceable liner 110" does not get displaced from the adhesive crests 108C" to the pockets 108R", this liner 110" would continue to block the adhesive crests 108C" at least in part and thus preclude the crests 108C" from serving their intended purpose—to securely adhere the label 100 to the substrate 50. By being displaced, the displaceable liner 110" may allow the label 100 to be adhered to any object that bonds with the adhesive 108C" (e.g., with a hot-melt adhesive). In embodiments, the transition of the displaceable liner 110" from the adhesive crests 108C" to the pockets 108R" may generally be in toto such that the entire adhesive layer 108" (as opposed to only portions thereof) may be exposed. This may allow the label 100 to be secured to substrates 50 that require substantial amounts of adhesive for bonding the label thereto (e.g., plastics, high-density polyethylene, et cetera). Of course, the label 100 may also be secured to conventional substrates 50 (e.g., cardboard, paper, et cetera).

As noted, the displaceable liner 110", once composed, behaves disparately from the enabler 222 and from any of its other ingredients separately. For instance, the enabler 222 by itself could not be used in place of the displaceable liner 110" because the enabler 222 would cause the label 100 to undesirably curl, and would cause the label 100 to unduly adhere to surfaces (e.g., hands, printing equipment, et cetera). Further, Applicant's experiments have shown the enabler 222 by itself does not adequately traverse to the pockets 108R" upon the application of a fluid (e.g., water) to expose the adhesive 108". And further yet, the amount of water required to cause the enabler 222 (e.g., remoistenable adhesive) to be used to adhere the label 100 to the substrate 50 is orders of magnitude (specifically, 10-20 times) the amount of water it takes for the displaceable liner 110" to be displaced to give way to the underlying adhesive 108". In the same vein, the displaceable liner 110" does not behave as one would expect the facilitator 224, the stabilizer 226, or the slip agent 228 to behave, either individually or combined together (with or without the enabler 222). In this regard, the properties of the displaceable liner 110" are unexpected and surprisingly beneficial.

The quantity ranges 204A and the preferred quantities 206A of the various ingredients 202A listed above are merely exemplary and are not intended to be independently limiting. For example, in embodiments, more activated coconut carbon filtered water 224A may be added to reduce the viscosity of the displaceable liner coating 110', more PCC 226A may be added to further enhance the stability of the enabler 222, et cetera. Further, in embodiments, the preferred quantities 206A of the various ingredients 202A listed above may be proportionally reduced or increased for smaller or larger applications, respectively. The preferred quantities 206A listed above will yield a volume of about 4.1905 lbs. of the displaceable liner coating 110A, which may be used to coat many thousands of labels 100 to cover the face ply lower sides 102L thereof.

Table 3 below shows the constituents 202B of another displaceable liner 110" in an embodiment 110B. This embodiment 110B may include a mixture of non-toxic remoistenable adhesive 222A, activated carbon coconut water 224A ("ACC water"), gypsum 226B, and silicone 228B. The label 100 (specifically the bottom side 100B thereof) may then be coated with this mixture to preclude the face ply 102 from undesirably adhering to objects and to allow the label to be adhered to the substrate 50 when desired.

TABLE 3

| DISPLACEABLE LINER 110B | | | |
|---|---|---|---|
| No. | Ingredient 202B | Quantity range 204B | Preferred quantity 206B |
| 1 | Enabler 222: Non-toxic remoistenable adhesive 222A | 2 lbs. to 6 lbs. | 4 lbs. |
| 2 | Facilitator 224: ACC water 224A | 0.125 lbs. to 0.375 lbs. | .25 lbs. |
| 3 | Stabilizer 226: Gypsum 226B | 1-50 heaping teaspoons (about 0.05 lbs. to 2.8 lbs.) | 21 heaping teaspoons (about 1.2 lbs.) |
| 4 | Slip Agent 228: Silicone 228B | 0.0055 lbs. to 0.023 lbs. | 0.014 lbs. |

The displaceable liner 110B may operate similarly to the displaceable liner 110A (e.g., by precluding undue contact between the adhesive 108 and substrates until activated). A key difference between the displaceable liner 110B and the displaceable liner 110A may be that the displaceable liner 110B may require a porous substrate 50, such as a cardboard box or other conventional substrate, which serves to absorb at least a portion of the displaceable liner 110". Thus, with the displaceable liner 110B, the transition of the displaceable liner 110B into the pockets 108R" together with the dissolving of the displaceable liner 110B by the porous substrate 50 may collectively allow for the adhesive 108" to be exposed and work to securely adhere the label 100 to the substrate 50. Unlike the displaceable liner 110A, the displaceable liner 110B may not function effectively with nonporous substrates (such as plastic sheets, milk jugs, pill bottles, et cetera). In embodiments, the label 100 may have its components modified to compensate for such a displaceable liner 110B, such as by including a thicker hydrophilic layer 112" that more readily absorbs the activated displaceable liner 110B.

The displaceable liner 110B, like the displaceable liner 110A, may comprise an enabler 222, a facilitator 224, a stabilizer 226, and a slip agent 228. In embodiments, the enabler 222 may be the non-toxic remoistenable adhesive 222A, i.e., the same enabler 222 that is used in the displaceable liner 110A. In an embodiment, the facilitator 224 of the displaceable liner 110B may be the same as the facilitator 224 of the displaceable liner 110A, e.g., ACC water. In other embodiments, a different enabler 222 and/or facilitator 224 may be used in the different displaceable liners.

The stabilizer 226 used in the displaceable liner 110A and 110B may be different. For example, in an embodiment, instead of precipitated calcium carbonate, the displaceable liner 110B may employ gypsum 226B as the stabilizer 226. In other embodiments, the stabilizer 226 used may be cornstarch, which may serve to thicken the displaceable liner composition and cause it to become more absorbent. Where a slip agent 228 is used, the displaceable liner 110B may use the same slip agent or a different slip agent relative to the displaceable liner 110A (e.g., silicone).

Like the displaceable liner 110A, the quantity ranges 204B and the preferred quantities 206B of the various ingredients 202B listed above are merely exemplary and are not intended to be independently limiting. For example, in embodiments, more activated coconut carbon filtered water 224A may be added to reduce the viscosity of the displaceable liner coating 110, more gypsum 226B may be added to further enhance the stability of the enabler 222, et cetera. Further, in embodiments, the preferred quantities 206B of the various ingredients 202B listed above may be proportionally reduced or increased for smaller or larger applications, respectively.

The artisan would understand from the examples above that there may be a variety of enablers 222, facilitators 224, stabilizers 226, and slip agents 228 that may be used in embodiments of the displaceable liner 110", and that the composition of the displaceable liner 110" may be varied in line with a particular application. For instance, precipitated calcium carbonate may be used as the stabilizer 226 for applications involving any type of substrate (including non-porous substrates) as the dissolvable liner 110A comprising precipitated calcium carbonate 226A may not need to be dissolved into a substrate 50 to allow the label 100 to adhere to the substrate 50 via the exposed adhesive 108". Alternately, gypsum 226B may be used as the stabilizer 226 in applications where the substrate 50 is porous and capable of absorbing the dissolvable liner 110". As noted, precipitated calcium carbonate 226A may also be used as the stabilizer 226 when the substrate 50 is porous; however, dissolving of this dissolvable liner 110A by the substrate 50 may not be a prerequisite, and indeed, may deter from the secure adhesion of the label 100 to the porous substrate 50.

The dissolvable liner 110A and 110B may have other differences that may make them uniquely suitable for particular applications. For example, the hot melt 108", once exposed by the activated dissolvable liner 110A, may be usable to secure the label 100 to the substrate 50 after an extended wait period (e.g., a day). The hot melt 108" exposed by the activated dissolvable liner 110B, conversely, may be repositionable but may need to be applied to a substrate within minutes upon wetting.

In some embodiments, one or more of the ingredients may be omitted. For example, the slip agent 228 may be omitted in certain (e.g., low temperature) applications. Thus, in embodiments, one or more of a suitable enabler 222, facilitator 224, stabilizer 226, and/or slip agent 228 may be used in the displaceable liner 110" to impart a desired property.

In an embodiment, the enabler 222 may have a vapor pressure at 20° C. of about 23.4 hPa, a density at 20° C. of about 1.08 g/cm$^3$, a pH value at 20° C. of 4.0-6.0, a flash point of over 232° C., and a VOC content of 1.6 g/l/0.01 lb/gl. For example, in an embodiment, the remoistenable adhesive 222A may be the PriscoBond 121-H remoistenable adhesive commercially available by Prisco®. Alternately or additionally, in other embodiments, the remoistenable adhesive may be one or more of the remoistenable adhesives disclosed in U.S. Pat. No. 3,574,153 to Sirota, U.S. Pat. No. 4,575,525 to Wancome et al., U.S. Pat. No. 4,623,688 to Flanagan, U.S. Pat. No. 5,296,535 to Fazioli et al., each of which are incorporated by reference herein. Other remoistenable adhesives known to the artisan and/or subsequently developed may likewise be employed. Applicant's experimentation confirms that off-the-shelf remoistenable adhesives 222 disclosed herein, such as the PriscoBond 121-H product, cannot suitably be used as adhesive covers for labels until other ingredients are combined therewith.

The displaceable liner 110" may temporarily cover the adhesive layer 108" while the topcoat 104 is exposed for printing. As such, the label 100 may be printed using any suitable technology now known or subsequently developed (such as a direct thermal printer, a thermal transfer printer, a laser printer, an inkjet printer, et cetera). The displaceable liner 110" in its inert state may preclude adhesion between the label 100 and objects with which the label 100 comes into contact with (e.g., a printer roller, another label, small debris, a table or other surface) before it is time to adhere the label 100 to the substrate 50. The displaceable liner 110 may be heat-resistant and may be able to readily withstand the relatively high temperatures encountered by labels in printers (e.g., laser printers). Further, the displaceable liner 110—which may comprise a non-toxic remoistenable adhesive as a constituent thereof—may as a whole be a non-sticky substance when dry (i.e., when in the inert state). Thus, the displaceable liner 110 itself may not undesirably stick to a surface before the label 100 is ready to be applied to the substrate 50.

In embodiments, the displaceable liner 110" and the adhesive layer 108" on the label, prior to activation, may be in registry. For example, where the adhesive layer 108" is disposed in the pattern 108P", the displaceable liner 110" may be disposed on the pattern 108P" such that the two patterns are in registry. Such may be effectuated, e.g., by using a roller having cells corresponding to the adhesive pattern 108P" to dispose the dissolvable liner 110" on the label 100. In some embodiments, the adhesive pattern and the displaceable liner pattern may not be in registry. Alternately, in embodiments, one or both of the adhesive and the displaceable liner may not be disposed in a true pattern.

One advantage of the displaceable liner 110" over conventional liners may be that unlike labels having traditional liner plies, the user may ready the label 100 for adhesion to the substrate 50 without the need to discard any liner in a waste basket or elsewhere.

Another advantage of the label 100 (and the other displaceable liner label embodiments disclosed herein) may be the low cost of the label 100. As discussed herein, the label 100 may be made inexpensively at least in part because the label 100, including the dissolvable liner layer(s) disposed thereon, may be relatively thin as compared to other labels. The artisan will understand the thin layers may require fewer raw materials which may translate into cost savings. In an embodiment, for example, the face ply 102 (together with top coat 104 such as the direct thermal coating) may be about 0.003" thick, the hydrophilic layer 112" may be about 0.00001" thick (+0.000005"), the hot melt adhesive grid 108" may be about 0.0008" thick (±0.00004"), and the corresponding displaceable liner 110" grid may be about 0.0002" thick (±0.0001"). In some embodiments, two (or a different number of individual) layers of the dissolvable liner 110" may be applied, and each layer may be about 0.0001" thick. The thickness of the hydrophilic layer 112", the adhesive layer 108", and the dissolvable liner 110", even collectively, may be insignificant compared to the thickness of the face ply 102, whereas conventional linerless compositions may double the size of the face ply (i.e., by adding 0.003" of thickness to the face ply). In addition to cost benefits, the thinness of the labels 100 may allow for storage and transportation benefits to be reaped.

In embodiments, the thickness of the hot melt adhesive layer 108" and the other constituents (e.g., the dissolvable liner 110") may be increased or decreased in line with a particular application. Care may be taken though to ensure that the recesses 108R" have sufficient volume to retain the dissolvable liner 110" upon activation. For instance, where the thickness of the adhesive layer 108" is reduced, care may be taken prior to increasing the thickness of the dissolvable liner 110" to ensure that the increased amount of dissolvable liner 110" would be properly received within the pockets 108R" of reduced size.

The artisan will thus understand that the dimensions and arrangement of the adhesive pattern 108P" may influence the quantity and arrangement of a pattern 110P" of the dissolvable liner. For example, where the adhesive pattern 108P" comprises relatively thick and wide lines of adhesive (e.g., relatively high and wide crests 108C"), a greater amount and relatively wide lines of displaceable liner coating 110" may be required to adequately cover the crests 108C", and this amount of displaceable liner 110" may in turn require larger recesses 108R" so that the displaceable liner 110" can be accommodated therein. In embodiments, and as discussed herein, the displacement of the displaceable liner 110" into the pockets 108P" may be facilitated by physically moving the label 100 on the substrate 50 (in addition to use of the fluid).

FIG. 3A is a flow chart illustrating an example method 500 of making and using the dissolvable liner 114, whereas FIG. 3B is a flowchart illustrating a method 500" of making and using the displaceable liner 110", in an embodiment.

With reference to FIG. 3A, at step 502, a non-toxic remoistenable adhesive 222 may be placed in a container together with activated coconut carbon filtered water 224. For example, 4 lbs. of PB121-H-Prisco® may be weighed and placed in a container together with 0.25 lbs. of activated coconut carbon filtered water. Thereafter, at step 504, about 1.2 lbs. (i.e., about 21 heaping teaspoons) of gypsum 226 may be placed in the container. The quantities of the various ingredients may be proportionally different or different. At step 506, the ingredients 202 may be mixed together. For example, in an embodiment, a cutting blade spinning at about 2,000 rpm may be used to mix all the ingredients 202 until the resulting mixture becomes relatively smooth and homogenous. At step 508, a label face stock 102 with the lower side 102L thereof covered with a hydrophilic coating 112 (e.g., an inkjet or other suitable coating) may be provided. The hydrophilic coating 112 may be dried (e.g., by any suitable dryer now known or subsequently developed) after being applied to the face stock lower side 102L. At step 510, the dried hydrophilic coating 112 may be coated with a first layer 114A of the dissolvable liner 114 (i.e., the first layer 114A may be applied to the lower side 102L such that the hydrophilic coating 112 is between the lower side 102L and the first dissolvable liner layer 114A). Once the dissolvable liner first layer 114A is dried (e.g., by a dryer), then, at step 512, a second layer 114B of dissolvable liner 114 may be applied and dried. Additional layers of the dissolvable liner 114 may also be provided.

In embodiments, only a solitary layer of the dissolvable liner 114 may be employed to cover the hydrophilic coating 112. In other embodiments, two (or more) layers of the dissolvable liner 114 may be successively dried and applied. Applicant's experiments have shown that the combined dissolvable liner layers 114A and 114B may be more suitable for the application than a solitary thicker layer of the dissolvable liner 114 that is applied to the face stock lower side 102L at the same time. Specifically, Applicant's experiments have shown that applying and drying the dissolvable liner 114 in two or more stages may assist in improving the dispelling process of the dissolvable liner 114 upon activation. That is, multiple layers of the dissolvable liner 114 may bias the dissolvable liner 114 to permeate both the hydrophilic layer 112 and the substrate 50 more effectively. Conversely, where a solitary layer of the dissolvable liner 114 is applied, or where the hydrophilic layer 112 is omitted, the dissolvable layer 114 may have a tendency to become absorbed primarily or only by the substrate 50, thus yielding an undesirably weak bond between the face ply 102 and the substrate 50.

While the method 500 illustrates an embodiment of the label 100 using two layers of dissolvable liner 114, it is to be understood that more layers of dissolvable liner 114 may be used. For example, a preferable range of dissolvable liner 114 layers may be two to four layers, though the label 100 can be configured to include more layers of dissolvable liner 114. Including more than four layers of dissolvable liner 114 may require a greater amount of hydrophilic coating 112, which may increase the cost of the label 100. Each layer of the dissolvable liner 114 may be relatively thin (e.g., 0.1 to 0.2 mm thick). Conversely, if traditional remoistenable adhesive were to be used, one would have to use 10-15 times more adhesive for the same application, which may, in addition to having other drawbacks, may be cost prohibitive.

At step 514, indicia may be printed on the upper side 102U of the face stock 102 (e.g., on the topcoat 104 thereof). The label 100 may be printed using any printer (including any conventional printer, such as a direct thermal printer, a thermal transfer printer, a laser printer, et cetera). Specifically, as the label 100 is passed through the printer, the topcoat 104 thereof may receive printed indicia whereas the dissolvable adhesive liner 110 may cover the face ply lower side 102L and preclude the label 100 from adhering to printer parts. When the face ply 102 is ready to be adhered to a substrate, the dissolvable liner coating 114 may be brought into contact with water or another fluid at step 516 to cause the dissolvable liner coating 114 to dispel and permeate the hydrophilic layer 112 and/or the substrate 50. The terms "water" and "moisture" may be used interchangeably herein.

Moisture may be introduced to the face ply 102 directly and/or indirectly. In an embodiment, the substrate 50 (e.g., the box, package, envelope, etc.) and/or a section thereof may be moistened with water and the label bottom side 100B may be placed on the moistened section of the substrate 50 so as to allow the dissolvable liner coating 114 to interact with the moisture on the substrate 50 (indirect moistening) and dissolve (e.g., dissolve into the substrate 50 and the hydrophilic coating 112). In another embodiment, instead of moistening the substrate 50 and then placing the face ply 102 on the moistened substrate 50, the face ply 102 (i.e., the dissolvable liner coating 114 thereof) itself may be moistened to cause the dissolvable liner coating 114 to dispel (direct moistening) and then the face ply 102 may be situated on the substrate 50. For example, if the moisture is applied directly to the dissolvable liner coating 114 on the face stock 102, the face stock 102 may then be adhered to the substrate 50 any time within the next 90 seconds or so. Alternately, if the substrate 50 is moistened instead of directly moistening the dissolvable liner coating 114, then the face ply 102 may have to be placed on the moistened section of the substrate 50 within 3-20 seconds or so (as the moisture may thereafter be absorbed by the substrate 50 and may not be able to serve to activate the dissolvable liner coating 114). In some embodiments, moisture may be introduced to the dissolvable liner coating 114 both directly and indirectly (i.e., the substrate 50 may be moistened and the dissolvable liner coating 114 may also be moistened before the face ply 102 contacts the moistened substrate 50).

In embodiments, water (or other fluid) may be added to the substrate 50 and/or the dissolvable liner 114 via a sprayer. Use of a sprayer may allow for a small volume of water to be disposed on the substrate 50 and/or the dissolvable liner 114 and may reduce the risk that too much water may be disposed on the substrate 50 and/or the label 100, causing damage thereto. For example, over saturating the label 100 with fluid may cause the label 100 to undesirably curl and/or disintegrate. In other embodiments, water may be added to the substrate 50 and/or the face ply 102 via other means (e.g., via a different water dispensing mechanism, via a moistened cloth or wipe, et cetera).

At step 518, the moisture introduced to the dissolvable liner coating 114 (e.g., directly and/or indirectly) may cause the dissolvable liner coating 114 to dispel and permeate the hydrophilic coating 112 and/or the substrate 50. At step 520, if the moisture was introduced to the dissolvable liner 114 directly, the label 100 may now be situated on the substrate 50, and the substrate 50 may absorb (e.g., partially) the dissolvable liner coating 114. Conversely, if the moisture was introduced to the dissolvable liner 114 indirectly (e.g., a section of the substrate 50 was moistened and the dissolvable liner 114 was placed in contact with the moistened section of the substrate 50), the moisture on the substrate 50 may cause the dissolvable liner coating 114 to dispel and the liner coating 114 may be absorbed (e.g., partially) by the substrate 50.

At step 522, the label 100 may bond to the substrate 50 by virtue of the now-drying activated dissolvable liner 114 which has infiltrated the substrate 50 and the hydrophilic layer 112. In this way, by needing water to activate the dissolvable liner 114, the dissolvable liner 114 may remain in the inert state until the label 100 is to be applied to the substrate 50. Furthermore, the requirement for a traditional liner ply may be negated, as well as the requirement for traditional adhesive. The amount of water used to dissolve the liner coating 114 may be negligible (e.g., relative to traditional remoistenable adhesives) and may not cause any appreciable damage to the substrate 50. Once the dissolvable liner 114 is wetted (directly and/or indirectly) and the face ply 102 is situated on the substrate 50, the dissolvable liner 114 may dissolve relatively quickly such that the label 100 can generally simultaneously be adhered to the substrate 50. That is, dissolving of the dissolvable liner coating 114 into the substrate 50 in step 518 and adherence of the face ply 102 to the substrate 50 in step 520 may occur generally at the same time.

The steps of the method 500 may be modified, added to, and/or omitted as desired, and that such considerations have been contemplated and are within the scope of the present disclosure. For example, the artisan may understand that the method 500 may be readily modified to construct, print, and apply the label 300 described below.

Thus, as has been described, the dissolvable liner 114 may, in effect, replace both traditional liner plies and the adhesive layers of prior art labels, and the label 100 may be used in any application where prior art labels were heretofore employed.

FIG. 3B is a flow chart illustrating a method 500" of making and using the displaceable liner 110", in an embodiment. At step 502", an enabler 222 (e.g., a remoistenable adhesive) may be placed in a container together with a facilitator 224 (e.g., ACC water). For example, 3 lbs. of PB121-H-Prisco® may be weighed and placed in a container together with 1 lb. of activated coconut carbon filtered water. Thereafter, at step 504", a stabilizer 226 may be added to the mixture. For example, about 0.18 lbs. of precipitated calcium carbonate may be placed in the container. The quantities of the various ingredients may be proportionally, or otherwise, different. At step 506", the ingredients 202 may be mixed together. For example, in an embodiment, a cutting blade spinning at about 2,000 rpm may be used to mix all the ingredients 202 until the resulting mixture becomes relatively smooth and homogenous. At step 508", a label face stock 102 with the lower side 102L thereof covered with a hydrophilic coating 112" (e.g., an inkjet or other suitable coating) may be provided. The hydrophilic coating 112" may be dried (e.g., by any suitable dryer now known or subsequently developed) after being applied to the face stock lower side 102L. At step 510", the dried hydrophilic coating 112" may be coated with a pattern 108P" (i.e., a pattern of crests 108C" and recesses 108R") of adhesive 108".

At step 512", the displaceable liner 110" mixture may be placed on the adhesive layer 108". Specifically, the displaceable liner 110" may be placed in a pattern 110P" over the adhesive pattern 108P". The displaceable liner pattern 110P" may match or substantially match the adhesive pattern 108P" such that the adhesive layer 108" is precluded from unduly adhering to a surface that the adhesive 108" comes into contact with.

At step 514", indicia may be printed on the upper side 102U of the face stock 102 (e.g., on the topcoat 104 thereof). The label 100 may be printed using any printer (including any conventional printer, such as a direct thermal printer, a thermal transfer printer, a laser printer, et cetera). Specifically, as the label 100 is passed through the printer, the topcoat 104 thereof may receive printed indicia whereas the displaceable liner 110" may cover the face ply lower side 102L and preclude the label 100 from adhering to printer parts. When the face ply 102 is ready to be adhered to a substrate, the displaceable liner 110" may be brought into contact with water or another fluid at step 516" to cause the displaceable liner 110" to dispel from the adhesive crests 108C" and move into the recesses 108R". The terms "water" and "moisture" may be used interchangeably herein.

Moisture may be introduced to the face ply 102 directly and/or indirectly. In an embodiment, the substrate 50 (e.g., the box, package, envelope, etc.) and/or a section thereof may be moistened with water and the label bottom side 100B may be placed on the moistened section of the substrate 50 so as to allow the displaceable liner 110" to interact with the moisture on the substrate 50 (indirect moistening) and dissolve (e.g., dissolve into the substrate 50 and the hydrophilic coating 112'). In another embodiment, instead of moistening the substrate 50 and then placing the face ply 102 on the moistened substrate 50, the face ply 102 (i.e., the displaceable liner 110" thereof) itself may be moistened to cause the displaceable liner 110" to dispel (direct moistening) and then the face ply 102 may be situated on the substrate 50. For example, if the moisture is applied directly to the displaceable liner 110" on the face stock 102, the face stock 102 may then be adhered to the substrate 50. Alternately, if the substrate 50 is moistened instead of directly moistening the displaceable liner 110", then the face ply 102 may have to be placed on the moistened section of the substrate 50 within a short period of time (e.g., within 3-20 seconds or so), as the moisture may thereafter be absorbed by the substrate 50 and may not be able to serve to activate the displaceable liner 110". In some embodiments, moisture may be introduced to the displaceable liner 110" both directly and indirectly (i.e., the substrate 50 may be moistened and the displaceable liner 110" may also be moistened before the face ply 102 contacts the moistened substrate 50).

In embodiments, water (or other fluid) may be added to the substrate 50 and/or the displaceable liner 110" via a sprayer. Use of a sprayer may allow for a small volume of water to be disposed on the substrate 50 and/or the displaceable liner 110" and may reduce the risk that too much water may be disposed on the substrate 50 and/or the label 100, causing damage thereto. For example, over saturating the label 100 with fluid may cause the label 100 to undesirably curl and/or disintegrate. In other embodiments, water may be added to the substrate 50 and/or the face ply 102 via other means (e.g., via a different water dispensing mechanism, via a moistened cloth or wipe, et cetera).

At step 518", the moisture introduced to the displaceable liner 110" (e.g., directly and/or indirectly) may cause the displaceable liner 110" to dispel and move into the recesses 108R". At step 520, the label 100 may now be situated on the substrate 50, and the substrate 50 may absorb (e.g., partially) the displaceable liner 110".

At step 522, the label 100 may bond to the substrate 50 by virtue of the now-exposed adhesive layer 108". In this way, by needing water to activate the displaceable liner 110", the displaceable liner 110" may remain in the inert state until the label 100 is to be applied to the substrate 50. Furthermore, the requirement for a traditional liner ply may be negated. The amount of water used to dissolve the displaceable liner 110" may be negligible (e.g., relative to traditional remoistenable adhesives) and may not cause any appreciable damage to the substrate 50. Once the displaceable liner 110" is wetted (directly and/or indirectly), the displaceable liner 110" may dissolve relatively quickly such that the label 100 can generally simultaneously be adhered to the substrate 50. That is, the displacing of the displaceable liner 110" into the recess 108R" in step 518" and adherence of the face ply 102 to the substrate 50 in step 520" may occur generally at the same time.

The steps of the method 500" may be modified, added to, and/or omitted as desired, and that such considerations have been contemplated and are within the scope of the present disclosure. For example, the artisan may understand that the method 500" may be readily modified to construct, print, and apply the label 300, and other labels, described below. As another example, a slip agent may be mixed into the displaceable liner 110" mixture.

Thus, as has been described, the displaceable liner 110" may, in effect, replace traditional liner plies of prior art labels, and the label 100 may be used in any application where prior art labels were heretofore employed.

Figure 4A:
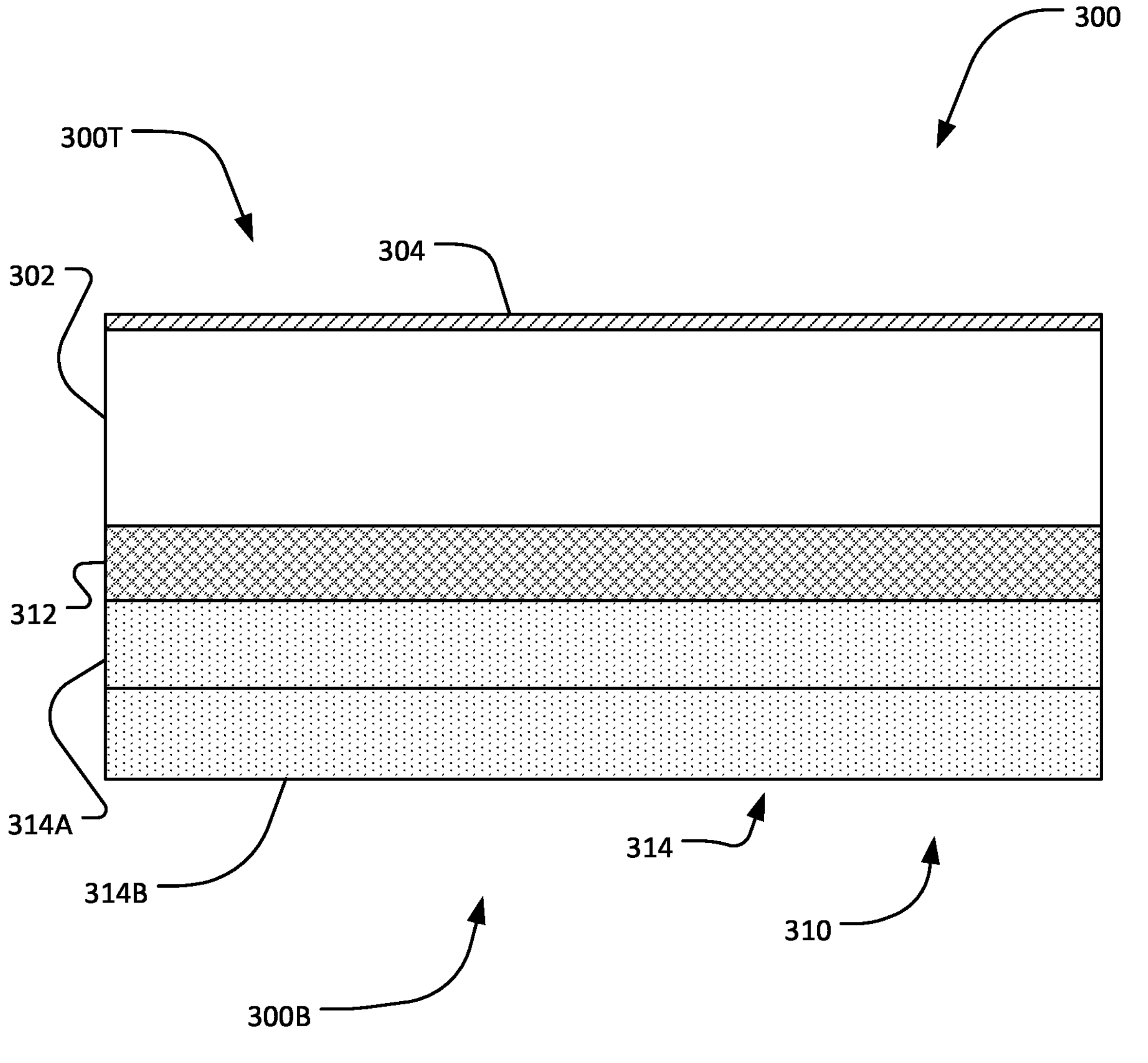
FIG. 4A is a schematic representation of a label employing a dissolvable adhesive liner for adhering to a substrate, according to another embodiment of the present disclosure.
Figure 4B:
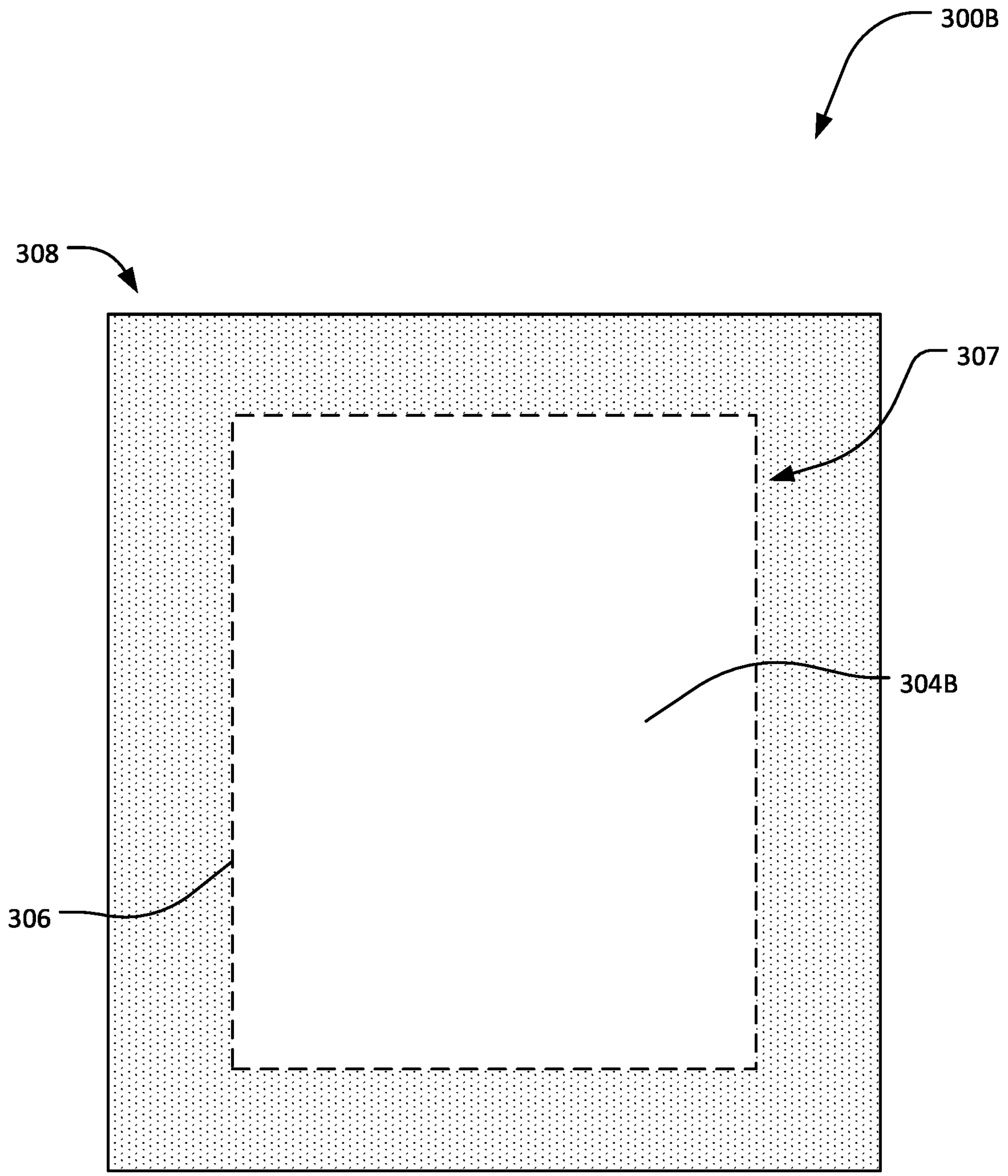
FIG. 4B is a bottom view of the label employing the dissolvable adhesive liner of FIG. 4A.

The illustrated simplex label 100, as discussed herein, may be configured for single-sided printing. Such, however, is merely exemplary, and the dissolvable adhesive liner and the displaceable liner concepts disclosed herein may likewise be used with labels that are printable on both sides. For example, FIGS. 4A-4B illustrate a label 300—employing a dissolvable adhesive liner 310—that includes a single ply and is printable on both sides. It is to be understood that the components of the embodiment 300 may be substantially similar or the same as the components of the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, like the displaceable liner 110", for example.

The label 300 may have a face ply 302 top side 300T (FIG. 4A) and a back side 300B. The top side 300T may include a topcoat 304 having a printable coating. The topcoat 304 may allow the top side 300T to receive monochrome and/or color printing via any printing means now known or subsequently developed.

FIG. 4B shows the back side 300B of the label 300. The label 300 may, in an embodiment, include a perforation (or a line of weakness) 306. The perforation 306 may demarcate a central portion 307 circumscribed by a border portion 308. In embodiments, the central portion 307 may be separated from the border portion 308 along the perforation 306. On the top side 300T, in embodiments, each of the central portion 307 and the border portion 308 may include the printable coating 304.

The central portion 307 may include a printable coating 304B opposing the topcoat 304, which may enable the central portion 307 to be printed by any printer. The backside border portion 308 may include a dissolvable adhesive liner 310. Specifically, a hydrophilic layer 312 may be defined by the border portion 308B. As shown in FIG. 4A, this hydrophilic coating 312 may be further coated by a dissolvable liner coating 314 (e.g., a dissolvable liner 314 having a first layer 314A and a second layer 314B)—the coating 314 and the coating 114 discussed above may be made in the same way (e.g., via the method 500)—and thus may exhibit the same or similar properties. The dissolvable liner coating 314 may temporarily cover the hydrophilic layer 312 and preclude the face ply 302 from unintentionally adhering with an object (e.g., a printer roller) until the label 300 is ready to be applied to the substrate 50. The label 300 may thus be printed on both sides (e.g., in a double-sided printer or otherwise), using any printing technology. When it is time to adhere the label 300 to the substrate 50 (e.g., a package), the substrate 50 may be moistened (e.g., a small quantity of water may be sprayed on the portion of the substrate to which the label 300 is to be applied). The label 300 may then be brought into contact with the substrate 50 such that the back side 300B, and specifically the dissolvable liner 314 coating disposed thereon, contacts the moistened substrate 50. The moisture may cause the dissolvable liner 314 to dissolve into the substrate 50 and the hydrophilic coating 312. The dissolvable liner 314, now permeating the substrate 50 and the hydrophilic coating 312, may dry and cause the label back side 300B to adhere to the substrate 50. In embodiments, the previously described displaceable liner 110" and adhesive layer 108" may be used in place of the dissolvable adhesive liner 310. When the recipient receives the package 50, he may disassociate the central portion 307 from the border portion 308 via the perforations 306, and access the indicia printed on the back side 300B of the label 300. In this way, thus, the dissolvable adhesive liner concept disclosed herein may be used to do away with conventional adhesives and wasteful conventional liners of both single-sided and double-sided labels. In embodiments, the dissolvable liner 110", along with a hydrophilic coating 112" and a pattern 108P" of adhesive 108" may be used in place of the dissolvable adhesive liner 314 and the hydrophilic coating 312.

The illustrated simplex label 100 and 300, as discussed herein, may each include only a single face ply for printing thereon. Such, however, is merely exemplary, and the dissolvable adhesive liner and/or the displaceable liner concept disclosed herein may likewise be used with labels that include two or more face plies (e.g., a duplex label). For example, FIGS. 5A-5C illustrate an embodiment 400 of a duplex label with the dissolvable adhesive liner. Embodiment 400 is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example.

The label 400 may have a top side 400T and a back side 400B. Starting from the top side of the label 400 in FIG. 5A, a first face ply 402 is shown. A first face ply upper face 402U may include a first topcoat 404 having a printable coating. The first topcoat 404 may allow the upper face 402U to receive monochrome and/or color printing via any printing means now known or subsequently developed. The dimensions of the first topcoat 404 may be substantially equal to that of the first face ply 402, such that the entirety of the first face ply upper face 402U may be configured for printing. Alternatively, only a portion of the first face ply upper face 402U may be configured for printing.

Continuing from the first face ply 402 downward, a first dissolvable liner layer 413 may be located between the first face ply 402 and a second face ply 403 (i.e., the first dissolvable liner 413 may be in contact with a first ply lower face 402L and a second face ply upper face 403U). The first dissolvable liner layer 413 may be substantially similar to the dissolvable liner 114 (i.e., both dissolvable liners 413 and 114 may be constructed using the steps from the method 500). In operation, the first dissolvable liner layer 413 may serve to secure the first face ply 402 and the second face ply 403 together. That is, the first dissolvable liner layer 413 may be activated (e.g., by water) and may then be absorbed by the first face ply 402 and the second face ply 403 to create a bond therebetween. In embodiments, the length and/or the width of the area of the face ply 402 on which the first dissolvable liner 413 is disposed may be disparate from the length and/or the width of the first face ply 402. For example, as shown in FIG. 5A, the first dissolvable liner 413 may fit within the perimeter of the first face ply 402 such that there may be a non-zero distance between each edge of the first dissolvable liner 413 and the edges of the first face ply 402.

The second ply lower face 403L may be entirely covered with a second topcoat 405 (FIG. 5B) having a printable coating. The second topcoat 405 may allow for the second ply lower face 403L to receive monochrome and/or color printing via any printing means now know or subsequently developed. In embodiments, the length and/or the width of the second face ply 403 may be disparate from the length and/or the width of the first face ply 402. For example, the second face ply 403 may fit within the perimeter of the first face ply 402 such that there may be a non-zero distance between one or more edges of the second face ply 403 and the edges of the first face ply 402 (see FIG. 5C). As another example, the dimensions of the second face ply 403 may generally match the dimensions of the first dissolvable liner 413.

Dissolvable adhesive liner 410, comprising, e.g., two (or more) layers 414A and 414B of the dissolvable liner 414 and a hydrophilic layer 412, may be disposed such that at least a portion of the dissolvable adhesive liner 410 is adjacent and in contact with the first ply lower face 402L (see FIG. 5C). While some embodiments of the label 400 may have the second face ply 403, the topcoat 405, and the dissolvable adhesive liner 410 arranged in an overlapping manner, other embodiments of the label 400 may have second topcoat 405 boundaries that are defined by a border portion 408 where the dissolvable adhesive liner 410 may be arranged (i.e., there may be little to no overlap between the second topcoat 405 and the dissolvable adhesive liner 410 layers in the border portion 408). The border portion 408 may be provided on a part of the first ply lower side 402L adjacent the outer boundaries of the first ply 402, and may, in embodiments, also overlap part of the second ply lower side 403L adjacent the outer boundaries thereof. Thus, the second ply lower face 403L may have a central region 407 that is devoid of the dissolvable adhesive liner 410 and is printable by virtue of the second topcoat 405. That is, the label 400 layers may be formed such that at least a part of the central region 407 and the topcoat 405 arranged thereon remains exposed (e.g., for printing) once the label 400 construction is complete. In this manner, the label 400 may be configured for double-sided printing (e.g., successive and/or simultaneous printing). The border portion 408 may include the space that is bound by both the perimeter of the central portion 407 and the perimeter of the largest label 400 layer (e.g., the first face ply 402 in FIG. 5A). Alternatively, the border portion 408 may include any amount of space along the label 400 as long as at least a portion of the central region 407 remains exposed. In embodiments, the border portion 408 does not encompass the entirety of the perimeter of the central region 407 (e.g., the border portion 408 may consist only of one or more strips located at opposing sides of the central region 407). In operation, non-uniform label 400 layer dimensions may allow some layers to contact other layers to increase label 400 structural integrity. For example, the hydrophilic layer 412 may be used to contact and secure together the second face ply 403 and the first face ply 402.

In some embodiments, the second face ply 403 may partially include the second topcoat 405 within the boundaries of the border portion 408, and thus a portion of the dissolvable adhesive liner 410 may be arranged in an overlapping manner with the second topcoat 405. In such areas, the second topcoat 405 may interact with the dissolvable adhesive liner 410, which may reduce the adhesive efficacy of the dissolvable adhesive liner 410 once it is activated by a fluid. As such, in some embodiments, the dissolvable adhesive liner 410 may only be located where there is no second topcoat 405 (e.g., the dissolvable adhesive liner 410 may be arranged in strips outwardly adjacent the second face ply 403). Alternatively, the second face ply 403 may include lines of weakness for removing one or more portions of the second face ply 403 (and the second topcoat 405 arranged thereon), such as those second face ply 403 portions that are coextensive with the dissolvable adhesive liner 410.

Some embodiments may include perforation and/or die cut lines (i.e., lines of weakness) 406 to facilitate access to the second ply lower side 403L after the label 400 has been adhered to the substrate 50. For example, the first face ply 402 and/or the second face ply 403 may contain perforations/die cuts 406 that generally demarcate the central region 407. These lines of weakness 406 may be exploited to separate a portion of the label 400 from the remainder, thus exposing the central portion 407 for viewing. Because any indicia printed onto the second ply lower side 403L may be hidden from view until a user tears the lines of weakness 406 of the label 400, private or personalized indicia may be arranged there. For instance, a private message, a packing slip detailing package contents, and/or advertisement materials may be located on the second face ply lower side 403L. Conversely, the first face ply upper face 402U may have public information indicia, such as a shipping/mailing address.

As noted, the second face ply lower side 403L may contact a dissolvable adhesive liner 410 in some embodiments. Specifically, a hydrophilic coating 412 may be arranged along the border portion 408. The hydrophilic coating 412 may be substantially like the hydrophilic coating 112 (i.e., the hydrophilic coatings 112 and 412 may have the same or similar properties). The outer edges of the hydrophilic coating 412 may generally correspond or be proximate to the outer edges of the first face ply 402 at the lower side 402L thereof, and when arranged on the first ply lower face 402L, the hydrophilic coating 412 may make contact with the outer edges of the second face ply lower side 403L. In this manner, the hydrophilic coating 412 may assist in securing the first face ply 402 and the second face ply 403 together (e.g., by absorbing at least a part of the activated dissolvable liner 413). In embodiments where there is a central printable region 407 located on the second face ply lower side 403L, the hydrophilic coating 412 may arranged such that the central region 407 remains at least partially exposed for printing. For example, the shape of the hydrophilic coating 412 may generally correspond to that of the border portion 408.

At the bottom side 400B of the label 400, there may be a second dissolvable liner 414. The second dissolvable liner 414 may be generally the same as or similar to the first dissolvable liner 413, though in embodiments the second dissolvable liner 414 may differ (e.g., by containing different amounts of ingredients 202). The second dissolvable liner 414 may be arranged along the border portion 408 such that dissolvable liner 414 may cover the hydrophilic coating 412. In operation, the second dissolvable liner 414 may be activated by a fluid (e.g., water), and placed against the substrate 50. Once dried, the second dissolvable liner 414 may fixedly couple the label 400 (e.g., the first face ply 402 and the second face ply 403) to the substrate 50.

The dissolvable liner coating 414 may temporarily cover the hydrophilic layer 412 and preclude the label 400 from unintentionally adhering with an object (e.g., a printer roller) until the label 400 is ready to be applied to the substrate 50. The label 400 may thus be printed on both sides (e.g., in a double-sided printer or otherwise). When it is time to adhere the label 400 to the substrate 50, the dissolvable adhesive liner 414 may be activated and dispersed, as described above in earlier embodiments. In this way, thus, the dissolvable adhesive liner concept disclosed herein may be used to do away with conventional adhesives and wasteful conventional liners of both single-sided and double-sided labels. In embodiments, it may be desirable to replace the dissolvable adhesive liner 410 with a displaceable liner 110". In such embodiments, the first face ply 402 and the second face ply 403 may be secured together using an adhesive layer 108" or the dissolvable liner 413. The hydrophilic layer 512 and the dissolvable adhesive liner layer 414 may be replaced with a hydrophilic coating 112", a pattern 108P" of adhesive 108", and a displaceable liner layer 110", in order to create a label 400 that does away with conventional label liners.

FIG. 6 is a flow chart illustrating a method 600 of making and using the dissolvable liner 413, 414, in an embodiment. At step 602, a non-toxic remoistenable adhesive 222 may be placed in a container together with activated coconut carbon filtered water 224. For example, 4 lbs. of PB121-H-Prisco® may be weighed and placed in a container together with 0.25 lbs. of activated coconut carbon filtered water. Thereafter, at step 604, about 1.2 lbs. (i.e., about 21 heaping teaspoons) of gypsum 226 may be placed in the container. At step 606, the ingredients 202 may be mixed together. For example, in an embodiment, a cutting blade spinning at about 2,000 rpm may be used to mix all the ingredients 202 until the resulting mixture becomes relatively smooth and homogenous. At step 608, a first label face stock 402 with an upper side 402U configured for printing, and a second face stock 403 with a lower side 403L (e.g., a central portion 407 thereof) configured for printing may be provided. Then, at step 610, a first dissolvable liner layer 413 may be used to adhere the first ply 402 and the second ply 403 together. The first dissolvable liner layer 413 may be activated (e.g., via an applied liquid), and may then be placed between the first ply 402 and the second ply 403. There, the first dissolvable liner layer 413 may infiltrate the plies 402 and 403, thus bonding the layers together. In an embodiment, the first dissolvable liner 413 may be applied in a single layer.

At step 612, the second face ply lower side 403L may be covered with a hydrophilic coating 112 (e.g., an inkjet or other suitable coating). The hydrophilic coating 112 may be dried (e.g., by any suitable dryer now known or subsequently developed) after being applied to the second face stock lower side 403L. In embodiments, the hydrophilic coating 412 may arranged on the border portion 408. In other words, the hydrophilic coating 412 may be arranged so the central printable region 407 remains exposed for printing. At step 614, the hydrophilic coating 412 may then be coated with a first layer 414A of the second dissolvable liner 414. Once the dissolvable liner first layer 414A is dried (e.g., by a dryer), then, at step 616, a second layer 414B of dissolvable liner 414 may be applied to the first layer 414A and dried. The benefits of having two or more layers of the dissolvable liner 414, as opposed to a solitary layer, are described above. However, a solitary layer of dissolvable liner 414 may be employed in certain applications.

At step 618, indicia may be printed on the face stock upper side 402U (e.g., on the topcoat 404 thereof) and the face stock lower side 403L (e.g., on the topcoat 405 thereof). The label 400 may be printed using any printer (including any conventional printer, such as a direct thermal printer, a thermal transfer printer, a laser printer, et cetera). Specifically, as the label 400 is passed through the printer, the topcoats 404 and 405 thereof may receive printed indicia whereas the dissolvable adhesive liner 410 may preclude the label 400 from adhering to printer parts.

When the label 400 is ready to be adhered to a substrate, the dissolvable liner coating 414 may be brought into contact with water at step 620 to cause the dissolvable liner coating 414 to dispel and permeate the hydrophilic layer 412 and the substrate 50. As discussed with other embodiments, moisture may be introduced to the label 400 directly and/or indirectly.

In embodiments, water (or other fluid) may be added to the substrate 50 and/or the dissolvable liner 414 via a sprayer. Use of a sprayer may allow for a small volume of water to be disposed on the substrate 50 and/or the dissolvable liner 414 and may reduce the risk that the amount of water disposed on the substrate 50 and/or the label 400 will cause any damage thereto. For example, over saturating the label 400 with fluid may cause the label 400 to undesirably curl and/or disintegrate. In other embodiments, water may be added to the substrate 50 and/or the label 400 via other means (e.g., via different water dispensing mechanism, via a moistened cloth or wipe, et cetera).

At step 622, the moisture introduced to the dissolvable liner coating 414 (e.g., directly and/or indirectly) may cause the dissolvable liner coating 414 to dispel and begin to permeate the hydrophilic coating 412 and/or the substrate 50. At step 624, if the moisture was introduced to the dissolvable liner 414 directly (e.g., if water was sprayed or otherwise placed directly onto the dissolvable liner 114), the label 400 may now be situated on the substrate 50, and the substrate 50 may absorb the dissolvable liner coating 414. Conversely, if the moisture was introduced to the dissolvable liner 114 indirectly (e.g., a section of the substrate 50 was moistened and the dissolvable liner 414 was placed in contact with the moistened section of the substrate 50), the moisture on the substrate 50 may cause the dissolvable liner coating 414 to dispel and the liner coating 414 may be absorbed (e.g., partially) by the substrate 50.

At step 626, the label 400 may now bond to the substrate 50 by virtue of the now-drying activated dissolvable liner 414 which has infiltrated both the substrate 50 and the hydrophilic coating 412. In this way, by needing water (or other fluids) to activate the dissolvable liner 414, the dissolvable liner 414 may remain in the inert state until the label 400 is to be applied to the substrate 50. Furthermore, the requirement for a traditional liner ply may be negated, as well as the requirement for traditional adhesive. The amount of water used to dissolve the liner coating 414 may be negligible (e.g., relative to traditional remoistenable adhesives) and may not cause any appreciable damage to the substrate 50. Once the dissolvable liner 414 is wetted (directly or indirectly) and the second face ply 403 is situated on the substrate 50, the dissolvable adhesive liner 414 may dissolve relatively quickly such that the label 400 can generally simultaneously be adhered to the substrate 50. That is, dissolving of the dissolvable liner coating 414 into the substrate 50 in step 624 and adherence of the second face ply 403 to the substrate 50 in step 626 may occur generally at the same time.

The steps of the method 600 may be modified, added to, and/or omitted as desired, and that such considerations have been contemplated and are within the scope of the present disclosure. For example, the steps of the method 600 may be modified to reflect similarly the steps of the method 500" to create and apply a label 400 that employs a displaceable liner 110" instead of, or in addition to, a dissolvable adhesive liner 400.

Thus, as has been described, the dissolvable adhesive liner disclosed herein may serve to do away with traditional liner and adhesive layers, and in so doing, provide a label that is relatively more environmentally friendly. Moreover, the labels using the dissolvable adhesive liners disclosed herein may significantly reduce the manufacturing costs of the labels. Indeed, according to some preliminary estimates, just circumventing the need for a disposable liner may reduce the cost of traditional labels (i.e., labels having silicone laden liner plies) by up to 50%.

In the embodiments discussed above, the dissolvable adhesive liner (e.g., the liner 110, 310, and/or 410) is displaced by the water and is absorbed by the substrate 50 to which the label is to be adhered. In some applications, however, the substrate 50 may be less able to dissolve water (or other liquids). For example, where the substrate 50 is glass, a plastic film, etc., it may be less able to absorb the dissolvable adhesive liner displaced from the label when compared to, for example, a porous substrate. In these embodiments, the displaced dissolvable adhesive liner may be caused to be dissolved by the label itself (e.g., by the hydrophilic coating disposed thereon, by the label itself, et cetera). The displaceable liner 110" may be advantageously used in embodiments where the substrate 50 is not readily able to absorb a dissolved liner, where the adhesive 108" may instead secure the label to the substrate 50.

While embodiments of the dissolvable adhesive liner may be incorporated with labels as described above, other embodiments of the dissolvable adhesive liner may be incorporated with tape, such as adhesive tape. Conventional adhesive tape may use a remoistenable adhesive. That is, conventional adhesive tapes may use a type of adhesive that must be moistened, often with water, before the adhesive is active for adhering to a substrate. The remoistenable adhesive of the conventional tape may require a relatively large amount of water to activate, and once the remoistenable adhesive has been activated, it may have reduced adhering strength in subsequent activations if left to dry without being applied to a substrate.

The dissolvable adhesive liner of label 100, and its embodiments (e.g., embodiments 300 and 400), may instead be used in an adhesive tape 100' (e.g., masking tape, painter's tape, duct tape, packaging tape, et cetera). The adhesive tape embodiments 100' may have many of the same, or similar, components as the label 100. For example, and as shown in FIG. 7, the adhesive tape 100' may have a face ply 102' (e.g., paper or film) corresponding to face ply 102 and a dissolvable adhesive liner 110' (e.g., a hydrophilic layer 112' and a dissolvable liner layer 114' having a first dissolvable liner layer 114A' and a second dissolvable liner layer 114B') corresponding to dissolvable adhesive liner 110. The dissolvable adhesive liner 110' may be made with ingredients 202 (e.g., remoistenable adhesive 222, activated coconut carbon filtered water 224, and powdered gypsum 226) as discussed above. A difference between the label 100 and the adhesive tape 100' may be that the adhesive tape 100' may have a relatively long length compared to the label 100 (e.g., while the label 100 may be around the size of a shipping label, the adhesive tape 100' may be a relatively long length of tape which may be wrapped around a cylinder). Indicia (e.g., icons, text, logos, graphics, colors, etc.) may still be printed or otherwise added to the face ply 102' (e.g., the top side 100T' of the face ply 102'). The adhesive tape 100' may have indicia printed thereon via thermal transfer methods (e.g., flexo printing, offset printing, et cetera) or other printing methods. In embodiments, the face ply 102' of the tape 100' may not be printable. Such may provide cost savings as compared to printable tape.

One advantage the adhesive tape 100' may have over conventional adhesive tape that has a remoistenable adhesive layer (e.g., gummed kraft paper) is that a total thickness of the dissolvable adhesive liner 110' layer of the adhesive tape 100' may be less than a total thickness of the adhesive layer of the conventional adhesive tape. For example, the conventional adhesive tape adhesive layer may have a typical thickness of around 2-4 mm, while the adhesive tape 100' dissolvable adhesive liner may be around 0.1-0.2 mm thick. This difference in adhesive layer thickness may allow for more adhesive tape 100' per roll than conventional adhesive tape might allow, for example, which may result in reduced costs for the adhesive tape 100'. Further, the artisan will understand that the reduced amount of adhesive necessary to create the workable tape 100' may yield significant cost savings.

Similarly, the tape 100' may require less water for application relative to conventional remoistenable adhesive tape. In embodiments, the adhesive tape 100' may require about 1/10th of the amount of water a conventional remoistenable adhesive tape would require to activate the adhesive layer. The tape 100' may alternately or additionally include a displaceable liner 110" where desired, similar to the other label embodiments described above.

In some embodiments, the adhesive tape 100' may be incorporated with a dispenser 700 (FIG. 8). The dispenser 700 may include a roller 750 (e.g., a cloth roller, also referred to herein as a moistener) configured to retain water for moistening the dissolvable adhesive liner 110' of the adhesive tape 100'. The adhesive tape 100' may pass over the moistened roller 750 to apply the water necessary to dispel the dissolvable adhesive liner 110'. One advantage of the adhesive tape 100' compared to conventional remoistenable tape may be that the relatively reduced thickness of the tape 100' may allow for a greater quantity thereof to be retained for use in the dispenser 700. In embodiments, the adhesive tape 100' may require about $1/10^{th}$ of the amount of water a conventional remoistenable adhesive tape would require activating the adhesive layer.

A method 800 of making and using the adhesive tape 100' is illustrated in FIG. 9. First, at step 802, the non-toxic remoistenable adhesive 222 may be placed in a container with the activated coconut carbon water 224, as described above. Then, at step 804, gypsum 226 may be added to the mixture (e.g., 0.0057 pounds to 0.20 pounds of gypsum). Then, at step 806, the ingredients 202 are mixed until the resulting mixture is relatively smooth and homogenous. The resulting mixture may form the dissolvable liner 114'. At step 808, the lower side 102L' of the face ply 102' of the tape 100' may be covered with a hydrophilic coating 112'. In some embodiments, the hydrophilic coating 112' may cover only some of the lower side 102L'. Then, at step 810, the lower side 102L' may be coated with the dissolvable liner 114'. For example, a dissolvable liner first layer 114A' may first be placed on the hydrophilic coating 112' and dried, followed by the application and drying of a second layer 114B'. The dissolvable liner 114' may be applied in a manner that covers or selectively covers the hydrophilic coating 112'.

To begin to apply the tape 100' with the dissolvable adhesive liner 110', at step 812, the dissolvable adhesive liner 110' may be caused to come into contact with water. For example, the dissolvable adhesive liner 110' may be sprayed and/or rolled across a moist roller (e.g., roller 750 of tape dispenser 700). Then, at step 814, the applied water may cause the dissolvable adhesive liner 110' to dispel. Next, at step 816, the dissolvable adhesive liner 110' may dissolve into the substrate 50. For example, the dissolvable adhesive liner 110' may begin to dispel and become absorbed by the substrate 50 to which the tape 100' is applied. Then, at step 818, the lower side 102L' of the face ply 102' may adhere to the substrate. For example, the face ply 102' may be bonded to the substrate by virtue of the infiltrating dissolvable adhesive liner 110'.

The steps of the method 800 may be modified, added to, and/or omitted as desired, and such considerations have been contemplated and are within the scope of the present disclosure. For example, the method 800 may be modified to reflect the steps of the method 500" such that the tape 100' may make use of a displaceable liner 110".

Figure 10A:
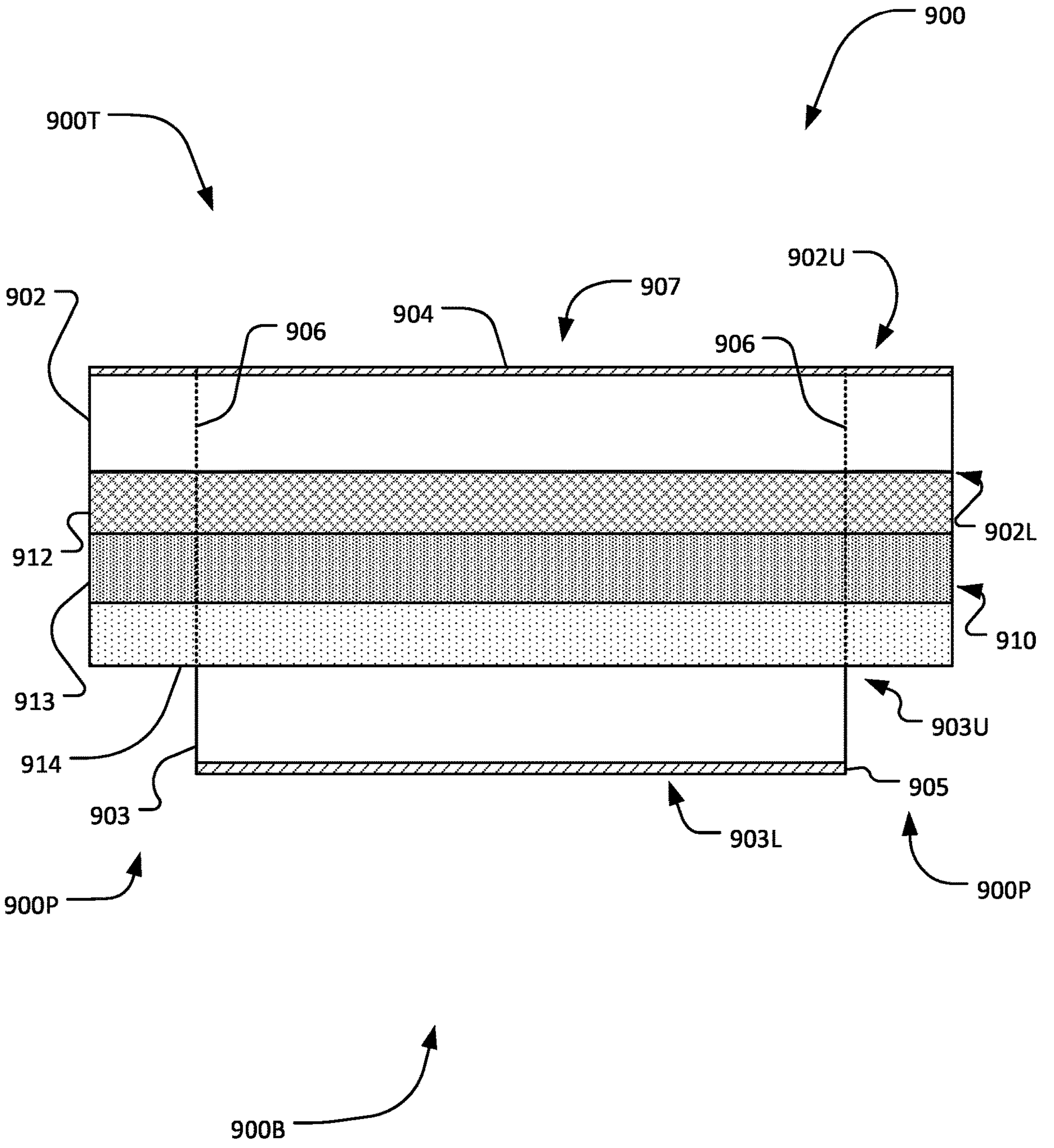
FIG. 10A is a schematic representation of a duplex label employing a displaceable liner for adhering to a substrate, according to yet another embodiment of the present disclosure.
Figure 10B:
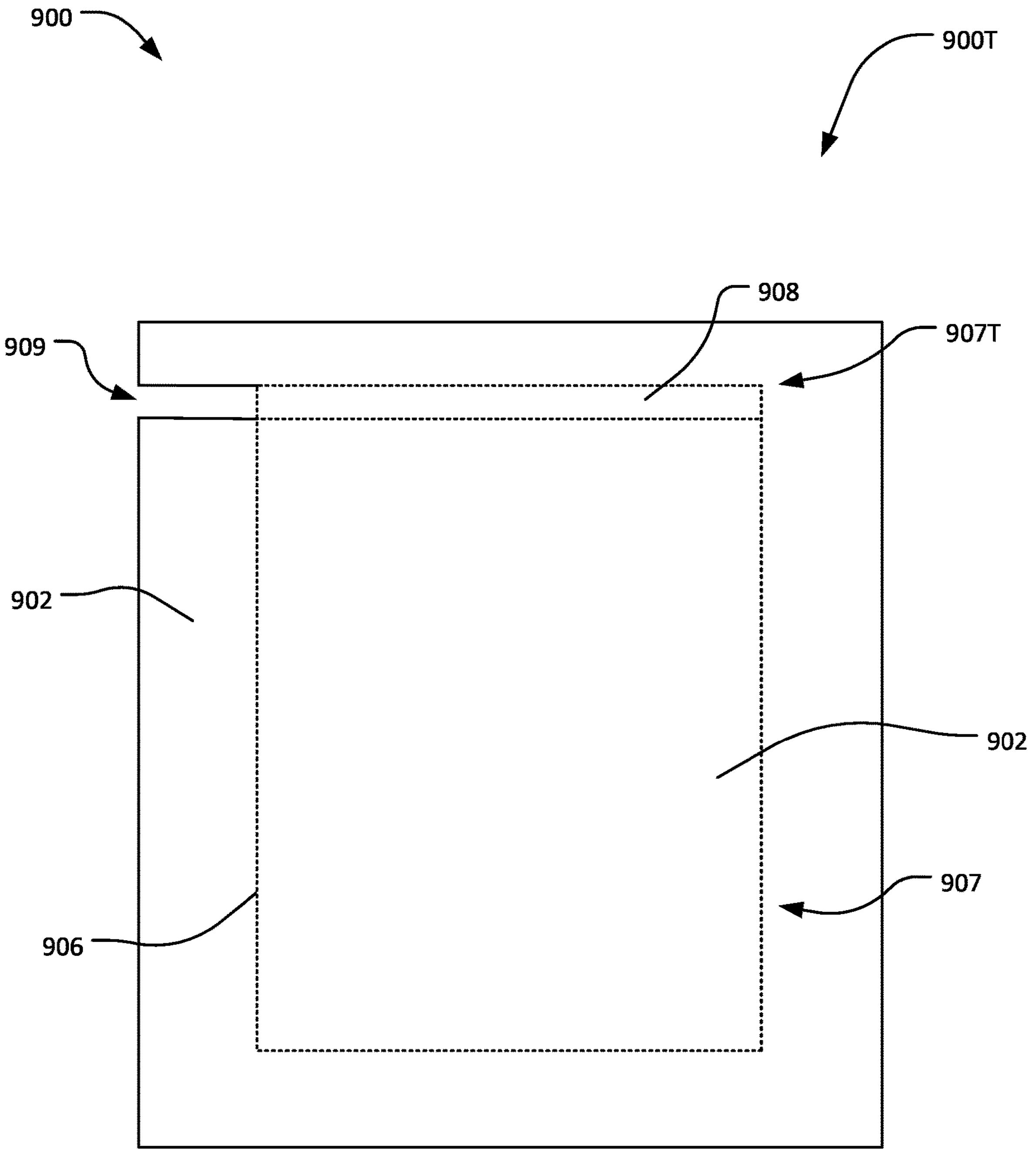
FIG. 10B is a top view of the duplex label employing the displaceable liner of FIG. 10A.
Figure 10C:
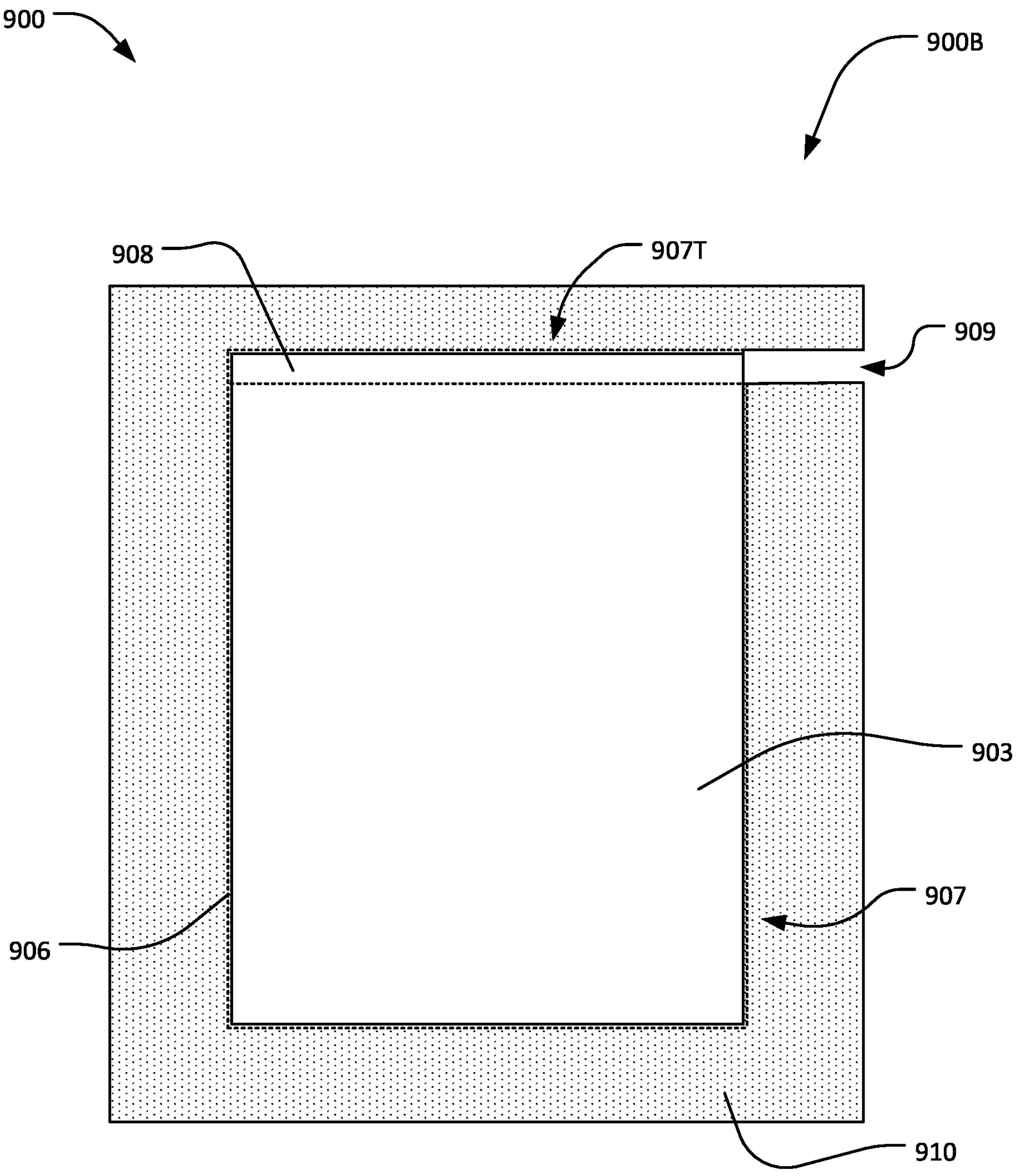
FIG. 10C is a bottom view of the duplex label employing the displaceable liner of 10A.
Figure 10D:
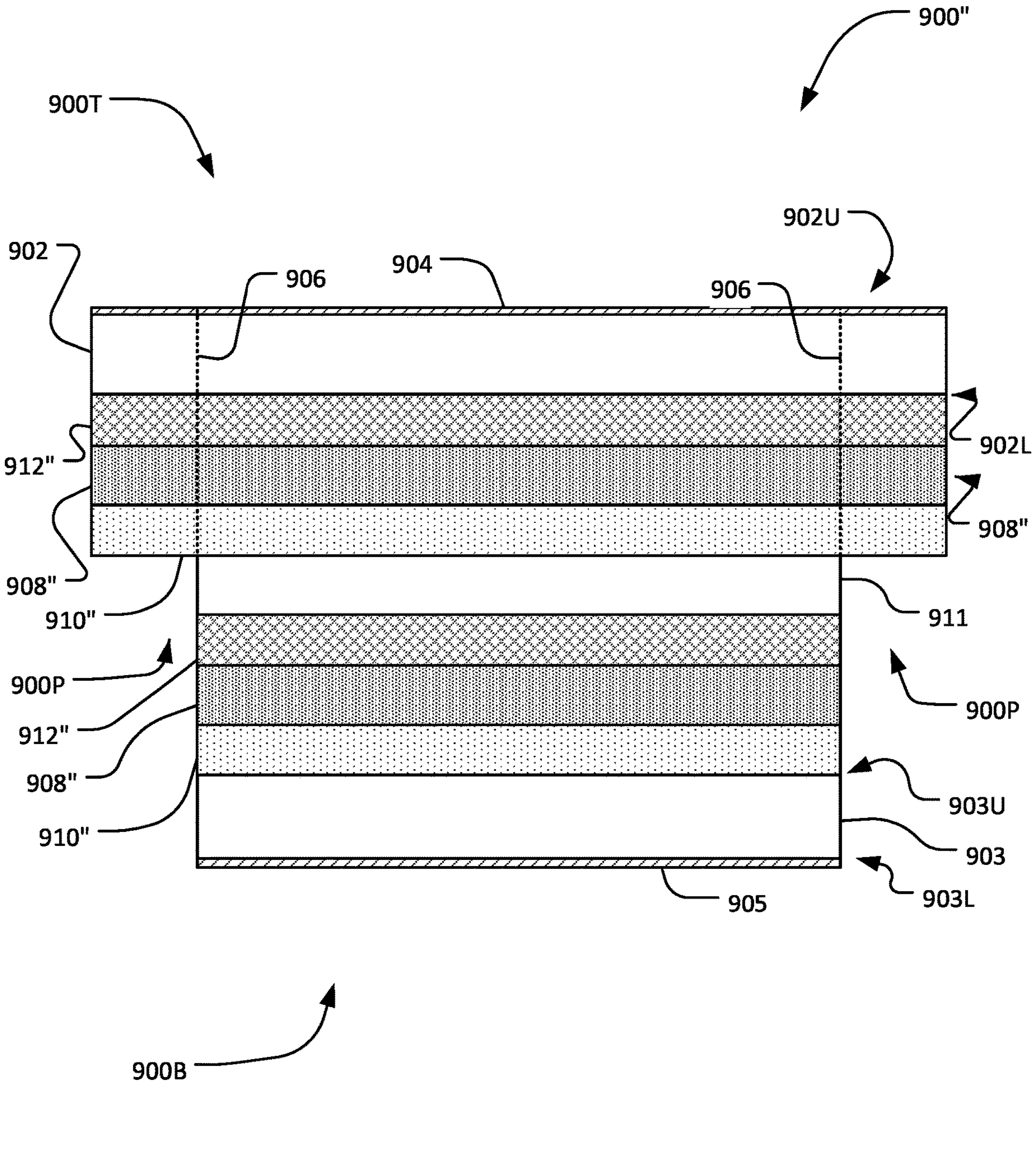
FIG. 10D is a schematic representation of a duplex label employing the displaceable liner of FIG. 10A, according to another embodiment.
Figure 11:
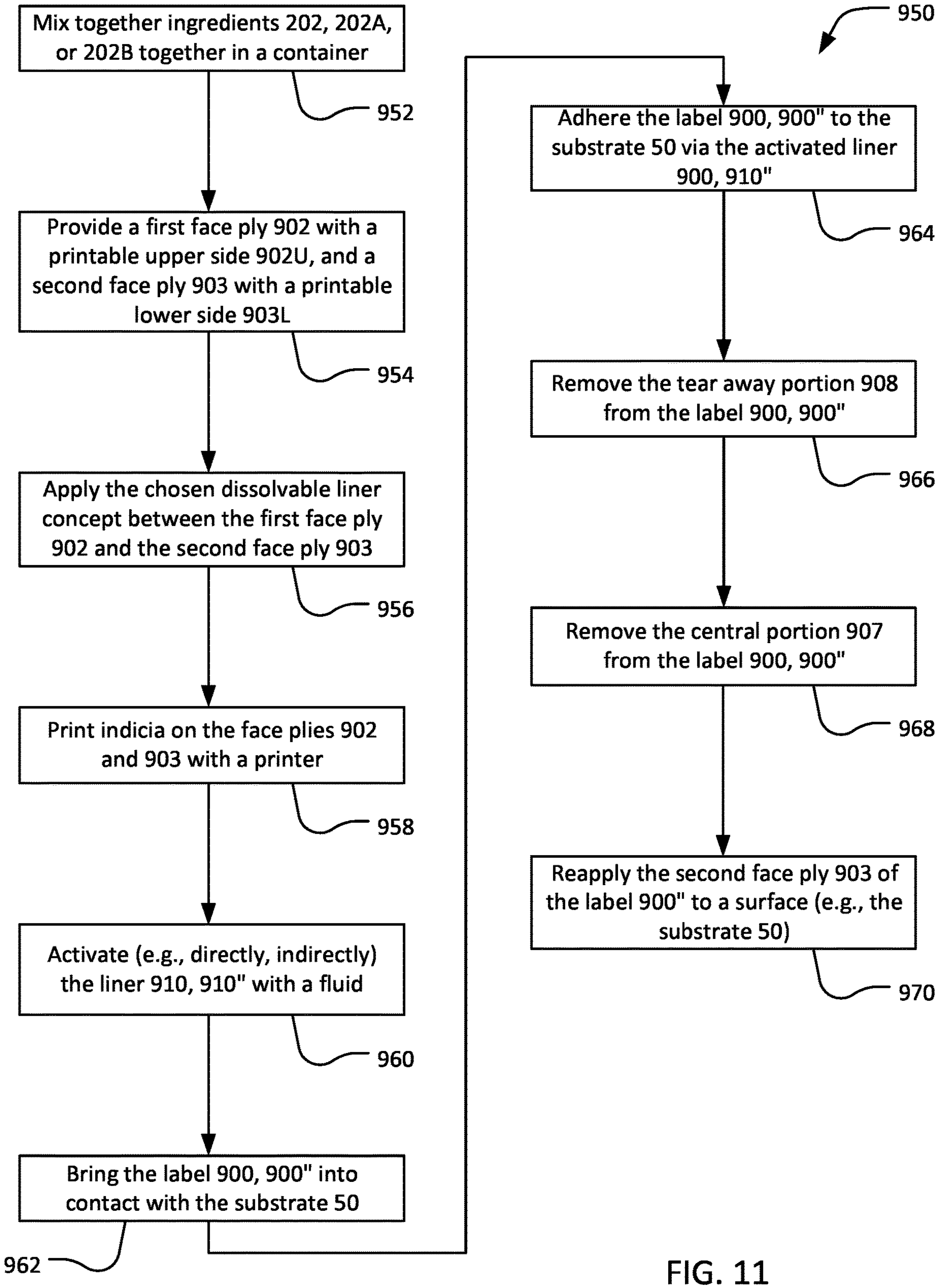
FIG. 11 is a flow chart illustrating a method of making and using the label employing the displaceable liner of FIG. 10A.

FIGS. 10A-10C illustrate an embodiment 900 of a duplex label employing the displaceable liner concept disclosed herein. FIG. 10D illustrate a variation 900" of the duplex label 900, where an additional displaceable liner and a traditional liner ply is used. The labels 900 and 900" may have components similar in utility to the label 100 (i.e., the printable coating 904 may be similar to the printable coating 104, the face ply 902 may be similar to the face ply 102, the displaceable liner 910" may be similar to the displaceable liner 110", et cetera). In operation, the labels 900 and 900" may provide for a label having at least two sides configured to receive indicia. When adhered to a substrate 50, one of these sides may be obscured, thus preventing the indicia thereon from being viewed. A user may tear away a central portion 907 of the labels 900, 900" to reveal the obscured indicia. In embodiments, the central portion 907 of the label 900, 900" may be re-adherable to a surface.

Looking now at FIG. 10A, the various layers of the label 900 may be seen. Starting from the label top side 900T and moving towards the label bottom side 900B, there is a first printable coating 904, a first face ply 902, a hydrophilic coating 912", an adhesive layer 908", a displaceable liner 910", a second face ply 903, and a second printable coating 905. The label 900 may have one or more lines of weakness 906 (e.g., perforations, die cuts, etc.) defining a central portion 907 (see FIG. 10B-C) in both the first face ply 902 and the second face ply 903. The central portion 907 may be where indicia is located on both the first face ply 902 and the second face ply 903. The central portion 907 may be removed from the rest of the label 900 using the lines of weakness 906, thus leaving one or more perimeter sections 900P behind. In other words, portions of the label 900 may be left adhered to the substrate 50 after the central portion 907 is removed).

The first printable coating 904 may be located at a first face ply upper side 902U, and, like the printable coating 104, may be any suitable coating configured for the reception of printed indicia, such as a direct thermal coating configured for the reception of printed indicia. The first printable coating 904 may (but need not) be located over the entirety of the upper side 902U of the first face ply 902. For example, in embodiments, the first printable coating 904 may be located only within the central portion 907. The hydrophilic coating 912", which may be substantially similar to the hydrophilic coating 112", may be located at a first face ply lower side 902L. Similar to the adhesive layer 108", a pattern of adhesive 908" may be located on the hydrophilic coating 912". Alternate embodiments of the label 900 may employ the dissolvable adhesive liner 110 instead of the displaceable liner 910".

The second face ply upper side 903U may be adhered to the first face ply lower side 902L. The second face ply 903 may be adhered to the first face ply 902 via the adhesive 908" (e.g., hot melt) and/or via the displaceable liner 910" itself. For example, the displaceable liner 910" that is located within the central region 907 may be activated by wetting the liner with a fluid, causing the displaceable liner 910" to recede within the pattern of adhesive 908" as described above with the embodiment 110", and then the second face ply 903 may be brought into contact with the activated liner 910". The perimeter portion 900P may be left unactivated so that the perimeter portion 900P may be later activated and adhered to the substrate 50. The second face ply 903 may be sized to fit within the central portion 907. In embodiments, the second face ply 903 is instead substantially the same size as the first face ply 902, and the border portion 900P of the second face ply 903 is removed (e.g., via lines of weakness 906) to prepare the label 900 for adherence to the substrate 50.

A second printable coating 905 may be disposed on the second face ply lower side 903L. The second printable coating 905 may be substantially the same as the first printable coating 904, though in embodiments the second printable coating is a different type of printable coating. Each of the printable coatings 904, 905 may receive indicia from any suitable printer now known or subsequently developed, and the printable coatings 904, 905 may be printed on simultaneously or with multiple passes through the printer. Generally, indicia printed on the first face ply 902 may be public indicia (e.g., shipping information, warning labels, etc.) and indicia printed on the second face ply 903 may be private indicia (e.g., packing lists, return labels, promotional offers, et cetera). In operation, the indicia on the first face ply 902 may be viewed by anyone who views the package to which the label 900 is adhered to. The recipient of the package may use the lines of weakness 906 to remove the central portion 907 from the perimeter portion of the label 900 and may then view the indicia printed on the second face ply 903. In embodiments, the bottom 900B of the central portion 907 (e.g., the second face ply 903 thereof) may have no appreciable adhesion, and the label 900 is secured to the substrate 50 only by way of the adhesive 908" and the displaceable liner 910" that is exposed along the perimeter portion 900P. In this way, the central portion 907 itself may not be secured to the substrate 50, and may be readily removed from the label 900 and the substrate 50 once the lines of weakness 906 are broken.

Moving now to FIG. 10B, the top side 900T of the label 900 is shown. The central portion 907 may be delineated by the lines of weakness 906 in the first face ply 902 (or where the second face ply 903 is of the same size as the first face ply 902, perforations that extend through both the first face ply 902 and the second face ply 903). The lines of weakness 906 may also delineate a tear away portion 908 located at a top area 907T of the central portion 907. In some embodiments, the tear away portion 908 may be coextensive with the central portion 907 (i.e., a width of the tear way portion 908 may be the same as a width of the central portion 907). The tear away portion 908 may be configured to be removed from the first face ply 902 to facilitate the removal of the central portion 907 from the perimeter portion 900P, after the label 900 is secured to the substrate 50. That is to say, removing the tear away portion 908 may allow a user to slip a finger or other tool underneath the central portion 907 and remove it from the rest of the label 900 via the lines of weakness 906.

Some embodiments, such as the one shown in FIG. 10B, have a gap 909 that corresponds to the tear away portion 908. The gap 909 may be an absence of one or more layers (e.g., all layers) of the label 900 that leaves at least a portion of a side of the tear away portion 908 exposed, as opposed to the tear away portion 908 being bound on all sides by the label 900. In operation, the combined tear away portion 908 and gap 909 may provide an alternative way for the user to remove the central portion 907 from the label 900 when the label 900 is adhered to the substrate 50. The gap 909 may be on any suitable side (e.g., top, left, right) of the tear away portion 908 that facilitates access to the tear away portion 908 by the user.

FIG. 10C shows a bottom side 900B view of the label 900. Here, the lines of weakness 906 in the displaceable liner 910" may be seen bounding the second face ply 903, and the tear away portion 908 as shown resides at a top part 907T of the central portion 907.

In embodiments, one or more (e.g., all) of the corners of the label 900 and/or the central portion 907 may be rounded or filleted. For example, the corners of the label 900 that are in the vicinity of the gap 909 may be rounded to facilitate user access thereto.

In use, a user may activate the displaceable liner 910" surrounding the central portion 907 at the first ply lower side 902L, e.g., by spraying water or another fluid on the perimeter portion 900P. Alternately, the user may wet the substrate 50 and cause the label 900 to contact the wet substrate 50, thereby activating the displaceable liner 910." The label 900 may thus be secured to the substrate 50 such that the top side 902U of the first ply 902 is visible and the second ply 903 is shielded from view. When desired, the user may tear the tear away portion 908 and remove the central portion 907 from the remainder of the label 900 (which may remain adhered to the substrate 50), and in this way, access the indicia on the second ply 903.

FIG. 10D shows the various layers of the label 900 in an embodiment 900" that utilizes a second displaceable liner and a traditional liner ply disposed between the first and the second displaceable liners. The first printable coating 904, first face ply 902, second face ply 903, second printable coating 905, central portion 907, lines of weakness 906, perimeter portion 900P, and the first displaceable liner 910" may be the same as described above. However, a second displaceable liner 910A" may be used as well as a paper liner 911. Like the displaceable liner 910", the displaceable liner 910A" may utilize a hydrophilic coating 912A" that is covered by a pattern of adhesive 908A". The multiple displaceable liners 910", 910A" may be used in conjunction with a liner 911 that has releasable properties (e.g., contains silicone).

In embodiments, the liner 911 may be secured to the first face ply 902 (e.g., via the displaceable liner 910" and the adhesive 908"). The second displaceable liner 910A" may be activated (e.g., at the central portion 907) and the second face ply 903 may be temporarily secured to the liner ply 911 as well. Alternatively, in other embodiments, the second displaceable liner 910A" may remain unactivated and the second face ply 903 may be loosely attached (e.g., via the weak adhesion of the unactivated displaceable liner 910A") or entirely unattached from the from the liner ply 911. In still other embodiments, the second face ply 903 may be unattached from the liner ply 911, as described above, and the first face ply 902 may also be unattached from the liner ply 911. In such embodiments, the first displaceable liner 910" may be unactivated at the central portion 907 such that the liner 911 is unsecured or only weakly secured to the first face ply 902, and the perimeter portion 900P of the displaceable liner 910" may be activated. The liner ply 911 may thusly be sandwiched between the first face ply 902 and the second face ply 903 when the label 900" is secured to the substrate 50 via the perimeter portion 900P of the displaceable liner 910".

In use, the label 900" may provide for a label that may be printed on both a front and a back side. When applied to the substrate 50, the indicia printed on the second face ply 903 may be obscured. The user may use the gap 909 and the tear away portion 908 to remove the central portion 907 of the label 900", leaving behind the perimeter portion 900P of the label 900". Once removed, the indicia that was previously obscured may now be viewed by the user. In embodiments, the bottom 900B of the central portion 907 (e.g., the second face ply 903 thereof) may have no appreciable adhesion, and the label 900" is secured to the substrate 50 only by way of the displaceable liner 910" that is exposed along the perimeter portion 900P. In this way, the central portion 907 itself may not be secured to the substrate 50, and may be readily removed from the label 900" and the substrate 50 once the lines of weakness 906 are broken.

In embodiments, the liner 911 may prevent the displaceable liner 910A" from unduly adhering to a surface. Once removed, the second face ply 903 may then use the adhesive layer 908A" attached thereto to adhere to another surface. As an example, the indicia on the second face ply 903 may be return shipping information. After the central portion 907 is removed from the rest of the label 900", thus leaving behind the perimeter portion 900P on the substrate 50, the user may peel away the liner 911 and then secure the second face ply 903 to a substrate (e.g., the same substrate or another substrate). The previously obscured indicia on the second face ply 903 may then be viewable. In embodiments, there may be no hydrophilic layer 912A" in contact with the liner 911, which may facilitate adhesion of the second face ply 903 to substrates.

FIG. 11 is a flow chart illustrating a method 950 of making and using the labels 900 and 900", in an embodiment. At step 952, the ingredients 202, 202A, or 202B may be placed in a container together and mixed. The ingredients used may be determined by whichever type of liner concept (e.g., the dissolvable adhesive liner, the displaceable liner) is desirable for the application. Thereafter, at step 954, a first label face stock 902 with an upper side 902U configured for printing, and a second face stock 903 with a lower side 903L (e.g., a central portion 907 thereof) configured for printing may be provided. Then, at step 956, the dissolvable liner concept is selected and applied between the face plies 902, 903. For instance, the user may apply a hydrophilic coating 912", adhesive 908", and a displaceable liner 910" to the first face ply 902. In other embodiments, a liner 911, a hydrophilic coating 912A", an adhesive 908A", and a displaceable liner 910" may be additionally used to create the label 900". In either case, the perimeter portion 900P along the bottom side 900B of the labels 900, 900" may be either removed prior to adhesion the substrate 50 or removed at this step in construction.

Then, at step 958, the label 900 or 900" may receive indicia. The label 900, 900" may receive indicia by printing on the face plies 902, 903 with a printer. The indicia may be printed simultaneously (e.g., both sides of the label 900, 900" receive indicia with a single pass through a printer) or the label 900, 900" may use multiple passes through a printer to print the indicia on both face plies 902, 903. At step 960, the displaceable liner 910" or the displaceable liner 910A" is activated. The liners 910", 910A" may be activated by applying a fluid (e.g., water thereto). As discussed previously, the liners 910", 910A" may be directly activated by applying a fluid directly to the liner 910", 910A", or may be indirectly activated by contacting the liner 910", 910A" to a wetted surface, such as a wetted substrate 50. Then, at step 962, the label 900, 900" is applied to the substrate 50 for adhesion thereto. In cases where the label 900, 900" was indirectly activated in step 960, steps 960 and 962 may occur simultaneously.

At step 964, the label 900, 900" is adhered to the substrate 50. For instance, the liner 910" may dispel and recede and expose the adhesive layer 908", as discussed above with previous embodiments, and the adhesive 908" may then secure the label 900" to the substrate 50. In this way, by needing water (or other fluids) to activate the liners 910", 910A", the liners 910", 910A" may remain in the inert state until the label 900, 900" is to be applied to the substrate 50, as discussed with previous embodiments. Once the liner 910", 910A" is wetted (directly or indirectly) and the second face ply 903 is situated on the substrate 50, the liner 910", 910A" may dispel relatively quickly such that the label 900, 900" can generally simultaneously be adhered to the substrate 50. That is, activating the liner 910", 910A" in step 960 and adherence of the second face ply 903 to the substrate 50 in step 964 may occur generally at the same time.

The receiver of the substrate (or another user) may then, at step 966, remove the tear away portion 908 from the label 900, 900". The tear away portion 908 may be removed by using the gap 909 and the lines of weakness 906. Then, at step 968, the central portion 907 of the label 900, 900" may be removed from the rest of the label 900, 900". The perimeter portion 900P of the label 900, 900" may be left adhered to the substrate 50 as a result.

In embodiments where the label 900" is used, along with multiple displaceable liners 910", 910A" and the liner 911, the user may then reapply the second face ply 903 at step 970. For instance, the adhesive 908A" associated with the second face ply 903 may be activated (e.g., reactivated) and brought into contact with a substrate, such as the same substrate 50 or another suitable substrate. In other cases, the previously exposed adhesive 908A" remains exposed (i.e., not covered by the displaceable liner 910A") at this point in time, and is made adherable to a surface by the removal of the liner 911.

The steps of the method 950 may be modified, added to, and/or omitted as desired, and that such considerations have been contemplated and are within the scope of the present disclosure.

Thus, as has been described, the dissolvable adhesive liner and displaceable liner concepts disclosed herein may serve to minimize traditional liners, and in so doing, provide a duplex label that is relatively more environmentally friendly. Moreover, the labels using the liner concepts disclosed herein may significantly reduce the manufacturing costs of the labels, as described above in other embodiments.

Focus is directed now to FIGS. 12-18, 18A, and 19-21 to illustrate how application of labels employing the dissolvable liner (e.g., label 100, 300, 400, 900, et cetera) may be automated in full or in part. Label applicators for applying labels (e.g., shipping labels, return labels, product labels, etc.) to substrates are known in the art. A traditional label applicator apparatus comprises a printer for printing indicia on the label and a tamp head which in its original position is situated upwardly adjacent the printed label. The tamp head working surface extends generally horizontally and may have vacuum nozzles or other means for holding the label to the tamp head during the application process. The printer prints indicia on the label and the label is pushed laterally underneath the tamp head. The tamp head remains stationary until the printing of the label is complete and the label is brought in registry with the tamp head above the label. Once the label printing is complete and the entire label is below and in registry with the tamp head, the tamp head moves vertically downward towards a substrate and, due to the vacuum, causes the printed label to travel with the tamp head. The tamp head eventually sandwiches the printed label between itself and the substrate (e.g., the package to which the label is to be adhered, which may be brought underneath the tamp head via a conveyer belt for instance). The adhesive on the underside of the label (e.g., on the face stock thereof) causes the label to adhere to the substrate. The tamp head then moves vertically back up to its original position, and the next label is subsequently printed and situated underneath the tamp head so that the tamp head can apply the next label to the next substrate (e.g., another box on the moving conveyer belt). This process is repeated for each label that is printed and applied to a substrate.

One issue with the traditional label applicator is that the next label cannot be prepared for application (e.g., printed) until the tamp head returns to its original position after applying the preceding label. This is because if the next label were to be printed (and all or part thereof were to exit the printer), the tamp head would not be able to move vertically upwards to its original position without interacting with the next label. Such interaction between the tamp head and the fully or partially printed label may be problematic because the conventional label, because of its exposed adhesive, may undesirably stick to the tamp head as the tamp head moves upward from its lowermost position (upon applying the label) toward its original position. To preclude such contact, the printer of the prior art labeling apparatus typically waits to print the next label until after the tamp head has applied the preceding label to the substrate and has returned to its original position thereafter. Once the preceding label has been applied and the tamp head has returned to its original position, the printer then prints the next label. As before, the next label is brought into registry with the tamp head, and once the printing is complete, the tamp head moves downward and sandwiches the next label between the tamp head and the next substrate to cause the next label to adhere to the next substrate.

It may be inefficient to have to wait to start printing the next label until after the tamp head has returned to its original position after applying the preceding label to a substrate (which may be referred to herein, as a "wait time" or a "waiting time requirement"). The wait time is downtime which may reduce the number of labels that may be printed and applied to substrates in a period of time (e.g., every minute). Such downtime may be particularly undesirable because the process of printing and applying labels to substrates may be repeated a multitude (e.g., many thousands) of times every day. Elimination of this waiting time requirement may allow for additional labels to be printed and applied in a time period (e.g., each minute), and consequently, improve the efficiencies of the label printing and application process and reduce the costs associated therewith. Embodiments of the present disclosure may relate to a label making and applying apparatus that eliminates the waiting time requirement.

FIGS. 12 through 15 show a label making and applying system embodiment 1000 (also referred to herein as the "labeling apparatus"). The labeling apparatus 1000 may be used to print one or more labels 15 (e.g., labels 100, labels 300, labels 400, tape 100', labels 900, labels 900", etc.) and may, in embodiments, include a staging area 1100, an automated or semi-automated arm 1200, and a tamp head 1300. The labeling apparatus 1000 may also have associated therewith means (e.g., a conveyer belt) to allow for one or more substrates 50 (e.g., a cardboard or other box, a surface, a ply, clothing, packaging, etc.) to be successively placed at a location where a label may be adhered thereto by the apparatus 1000. In embodiments, the labeling apparatus 1000 may make use of a computing system 1600 (FIG. 21) to perform the functions described herein.

Figure 13:
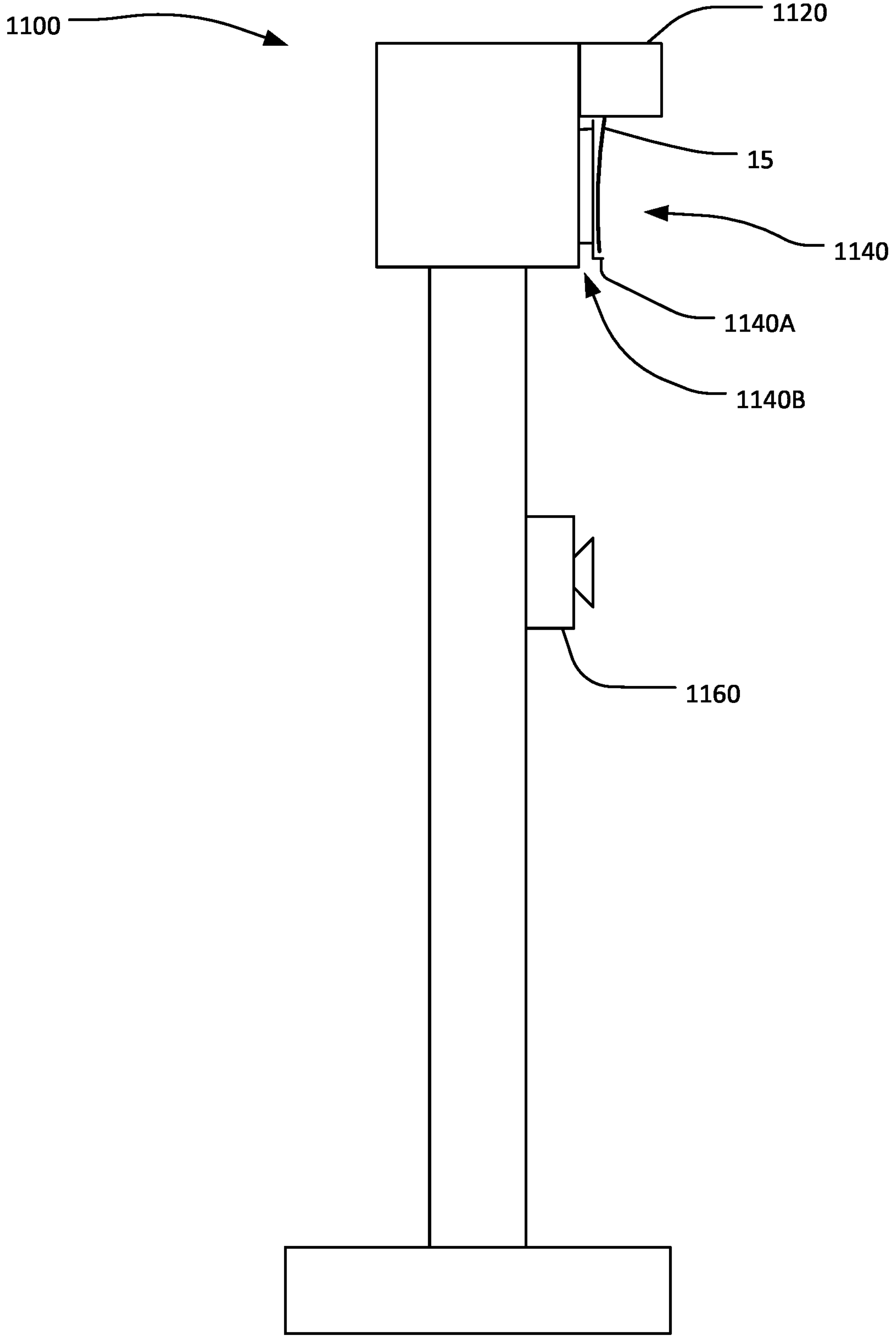
FIG. 13 is a side view of a staging area of the label printing and applying system of FIG. 12.

As seen in FIG. 13, the staging area 1100 may in embodiments comprise a printer 1120 and a holding tray 1140. The printer 1120 may be any printer now known or subsequently developed (e.g., a laser printer, an inkjet printer, a direct thermal printer, a thermal transfer printer, a commercial printer, a handheld printer, etc.) for suitably printing the label, and may be configured to print indicia (e.g., personalized and/or generic indicia, color and/or black and white indicia, etc.) thereon. The holding tray 1140 may be configured to hold labels (e.g., a label 100) during the printing process and/or after the label has been printed by the printer 1120 (e.g., until the tamp head 1300 returns to its original position after applying the preceding label, as discussed herein). The printer 1120 may print relevant indicia (e.g., packaging information, shipping information, marketing materials, etc.) on the label, and deposit the label in the holding tray 1140. In an embodiment, the printer 1120 may begin the printing of an additional label as soon as the preceding label is removed from the holding tray 1140. In another embodiment, the printer 1120 may begin printing the next label within 1, 2, 3, or 4 seconds of the removal of the preceding label from the tray 1140.

The holding tray 1140 may be a receptacle (e.g., a plate, bin, tub, tray, etc.) configured to receive and hold the labels processed by the printer 1120 for the tamp head 1300. The holding tray 1140 may, in embodiments, extend generally vertically. In embodiments, the holding tray 1140 may have a lip or one or more protruding edges 1140A (which may extend generally laterally or otherwise be perpendicular to the vertically extending portion of the holding tray 1140) to aid in holding the label within the holding tray 1140 after the label has been printed by the printer 1120. In other embodiments, the holding tray 1140 may have a textured plasma or other coating configured to inhibit the labels from undesirably adhering to the holding tray 1140.

Alternately or additionally to the lip 1140A, the holding tray 1140 may, in embodiments, be charged with a vacuum to hold the label within it. For example, the holding tray 1140 may include a vacuum plate 1140B configured to selectively retain the label with an applied vacuum. The vacuum plate 1140B may, for example, apply the vacuum constantly, intermittently (e.g., at timed intervals that are in synchronization with a printing cycle of the printer 1120), manually, and/or automatically. The vacuum plate 1140B may automatically apply the vacuum in response to, for example, a sensor (e.g., a sensor 1280) detection of the printed label. As another example, the vacuum plate 1140B may automatically apply the vacuum in response to a signal from the printer 1120 indicating that that the printing of the label is (or is about) complete and the label will be deposited within the holding tray 1140.

To allow the label to be collected by the automated arm 1200, the vacuum plate 1140B may cease operation and release the label from the vacuum plate 1140B vacuum. Similar to the methods of applying the vacuum described above, the label may be released from the vacuum plate 1140B intermittently (e.g., at timed intervals that are in synchronization with a collection cycle of the automated arm 1200), manually, and/or automatically. The vacuum plate 1140B may automatically release the label in response to, for example, a sensor (e.g., a sensor 1280) detection that the automated arm 1200 is ready, or is about ready, to collect the label. As another example, the vacuum plate 1140B may automatically release the label in response to a signal from the automated arm 1200 indicating that the automated arm is prepared to collect the label. In some embodiments, the vacuum plate 1140B may apply a vacuum charge that is configured to be overpowered or otherwise replaced by another vacuum charge (e.g., by a vacuum charge of the tamp head 1300, as will be discussed in greater detail below). That is to say, the vacuum plate 1140B vacuum may be overridden by a vacuum from another source, and thus the other source may collect the label form the holding tray 1140.

As discussed above, a label having a displaceable liner or a displaceable adhesive liner may transition to the activated state (and thus be made ready for adherence to a surface) once said liner is brought into contact with a fluid. As such, the staging area 1100 may, in embodiments, comprise a sprayer or other fluid dispensing means 1160 downstream the printer 1120, as shown in FIG. 13. In embodiments, the sprayer 1160 may be downstream the holding tray 1140. The sprayer 1160 may be fluidly coupled to a tank for retaining fluid (e.g., water or other fluid for dispelling the displaceable liner to expose the adhesive in case of the displaceable liner label or for otherwise activating the displaceable liner in case of the displaceable adhesive liner label).

In embodiments, the sprayer 1160 may spray the fluid onto the label, e.g., on the underside thereof, before the label is adhered to the surface or substrate 50. Alternately or in addition, the sprayer 1160 may be used to spray fluid onto the substrate 50 itself before the label is brought in contact therewith. The fluid dispensing means 1160 may, in embodiments, include a pump, a spray nozzle, valves, delivery tubes, etc., to allow for the fluid to be dispersed as desired (e.g., onto the underside of the printed label as the printed label travels from the holding tray 1140 and comes adjacent the sprayer 1160, onto the substrate 50 prior to the application of the label thereto, et cetera). The artisan will understand from the disclosure herein that liners other than the displaceable liners may also, in embodiments, be employed with the label. Alternately, the label may employ no liner (i.e., the label may have an exposed adhesive layer) and the holding tray 1140 may include a non-stick or other adhesion-resistant coating to preclude undue interaction between the exposed adhesive layer and the holding tray 1140.

One example of a sprayer 1160 usable with the labeling apparatus 1000 is a pulse width modulation (PWM) flow control sprayer. PWM flow control sprayers, like Spraying Systems Co.'s Pulsajet® spray nozzle, may spray at several thousand cycles a minute (e.g., 10,000 cycles a minute) to allow for continual use on an assembly line. PWM flow control may allow a great control over the spraying function of the sprayer 1160, and thus wastage of sprayed fluids may be mitigated while coverage of the sprayed object (e.g., the labels) may remain consistent. Some sprayer 1160 embodiments may employ multiple sprayer nozzles. For example, a sprayer 1160 may include two or nozzles that are spaced apart. These nozzles may be movable such that the sprayer 1160 may be adjusted to complete various spraying tasks. As an example, the nozzles of the sprayer 1160 may be moved (e.g., translated, rotated) inward and/or outward to narrow or widen the spray pattern, respectively. Further, the sprayer 1160 may be mounted at any suitable location. For instance, it may be desirable to mount the sprayer 1160 at the tamp head 1300.

Figure 14:
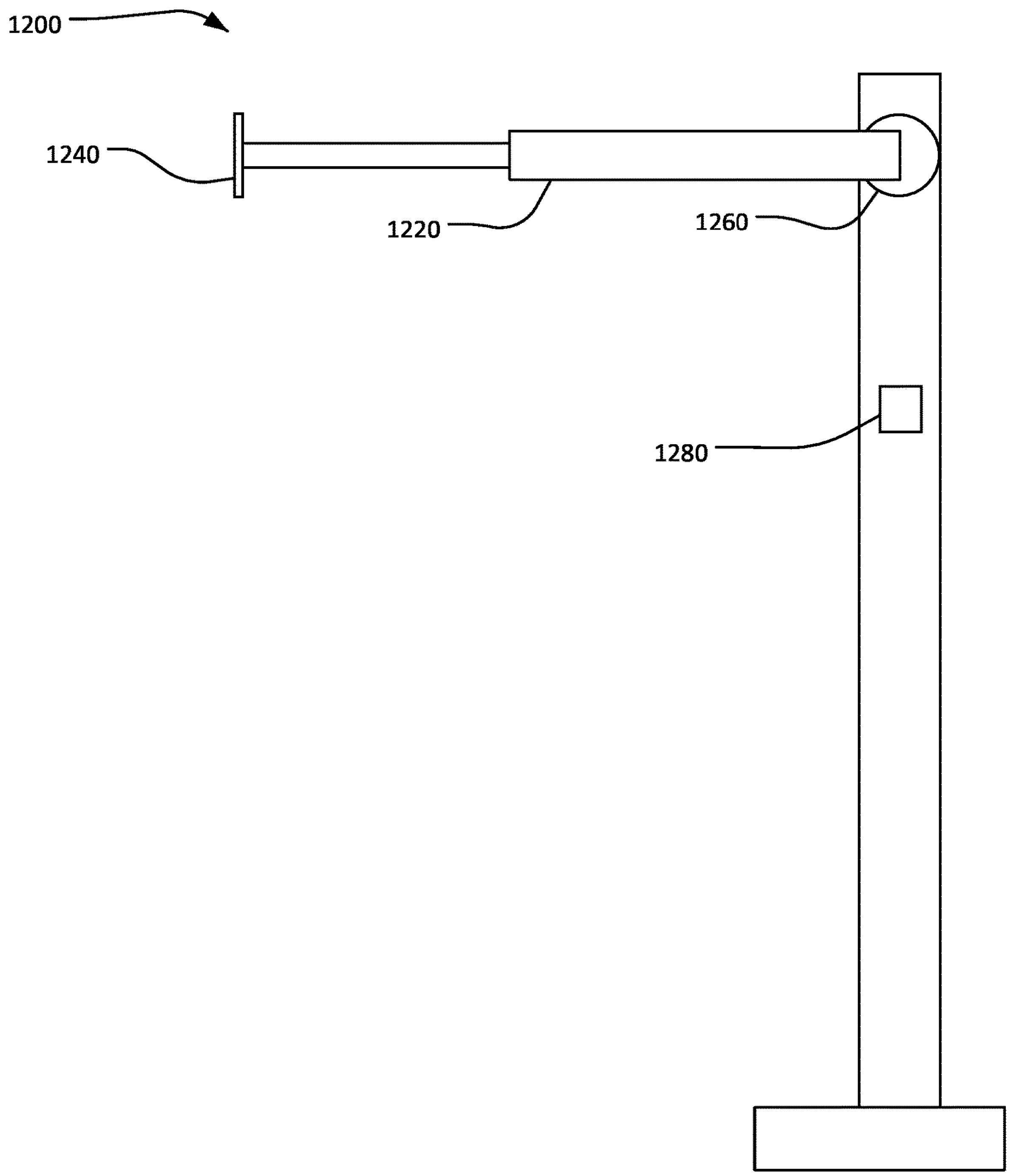
FIG. 14 is a side view of an automated arm of the label printing and applying system of FIG. 12.

The arm 1200, as seen in FIG. 14, may comprise a plunger 1220, a plate 1240, a rotation device 1260, and one or more sensors 1280. The plunger 1220 may be configured to be telescoping (or may otherwise be configured to selectively retract, extend, and/or otherwise adjust position), and may have a plate 1240 attached to a distal end thereof. The plate 1240 may be configured to hold the tamp head 1300 (see FIG. 12), and may, in embodiments, comprise vacuum nozzles to charge the tamp head 1300 with a vacuum. The rotation device 1260 may be operably coupled to a proximal end of the plunger 1220 and may be configured to cause the arm 1200 to rotate (or otherwise move) such that the tamp head 1300 pulls the printed label from the tray 1140 and eventually brings the label in proximity with the substrate 50 for adhesion of the label thereto. In embodiments, before the label is applied to the substrate, the arm 1200 may cause the label to be brought proximate the sprayer 1160 so that the sprayer may spray fluid on an underside of the label to activate the displaceable liner or the displaceable adhesive liner. In other embodiments, the sprayer 1160 may directly moisten the substrate 50 before the label is brought into contact therewith by the arm 1200. In such cases, the liner may activate when the liner is brought into contact with the wetted substrate 50.

One or more sensors 1280 (e.g., LiDAR, infrared, etc.) may be used to detect the presence of the substrate 50, and aid in the process of applying a label to the surface 50. That is, the arm 1200 may move the tamp head 1300 to the tray 1140 for collection of a label, and then, using the sensors 1280, move the tamp head 1300 together with the label to cause the tamp head 1300 to adhere the label to the substrate 50. Importantly, printing of the next label may advantageously begin as soon as the tamp head 1300 removes the preceding label from the tray 1140, resulting in valuable time savings. That is, and as will become clear from the disclosure herein, the waiting time requirement of prior art label applicators may be eliminated or otherwise mitigated.

Figure 15:
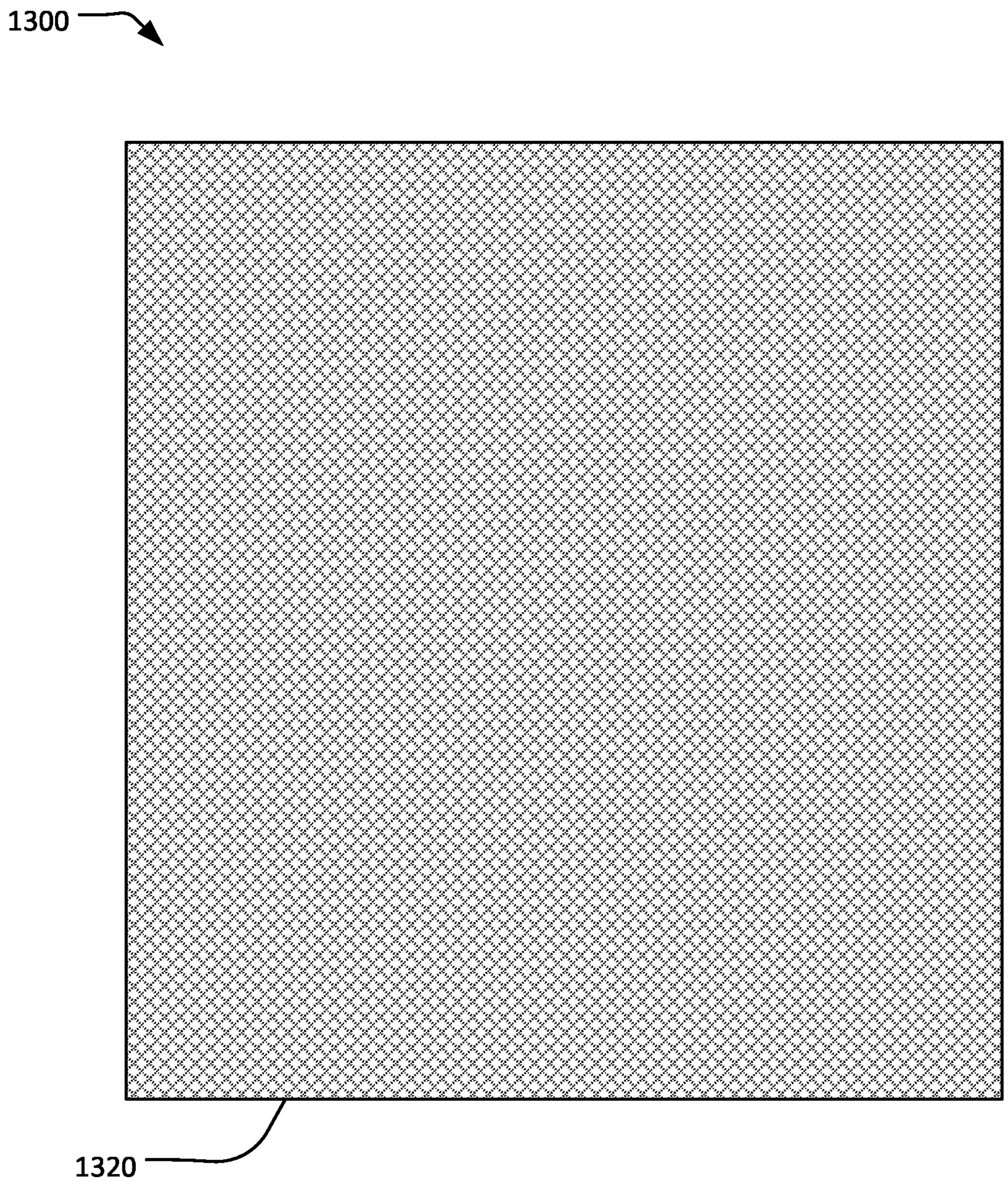
FIG. 15 is a close-up bottom view of a tamp head of the label applicator system of FIG. 12.

The tamp head 1300, as seen in FIG. 15, may in embodiments comprise filter media 1320 made of a compressible material which may be charged with a vacuum. For example, the filter media 1320 may comprise a foam block about two inches thick, which easily allows air to pass through the block. The filter media 1320 may be attached to the arm 1200 via the plate 1240. In operation, the vacuum charged filter media 1320 may be used for the collection of a label from the holding tray 1140 and for the subsequent application of the label to the substrate 50.

In embodiments, multiple apparatuses 1000 may be provided, e.g., in line, to allow for various labels and associated documents to be printed and applied to the substrate 50 as the substrate 50 travels to the various apparatuses 1000 on a conveyer belt. For instance, in embodiments, one labeling apparatus 1000 may be used to print and apply to the substrate 50 the label, another downstream label applicator 1000 may be used to print and apply to the substrate 50 a packing list (which may, e.g., be secured above the label), yet another downstream apparatus 1000 may be used to adhere a coupon above the packing list, etc.

Figure 16:
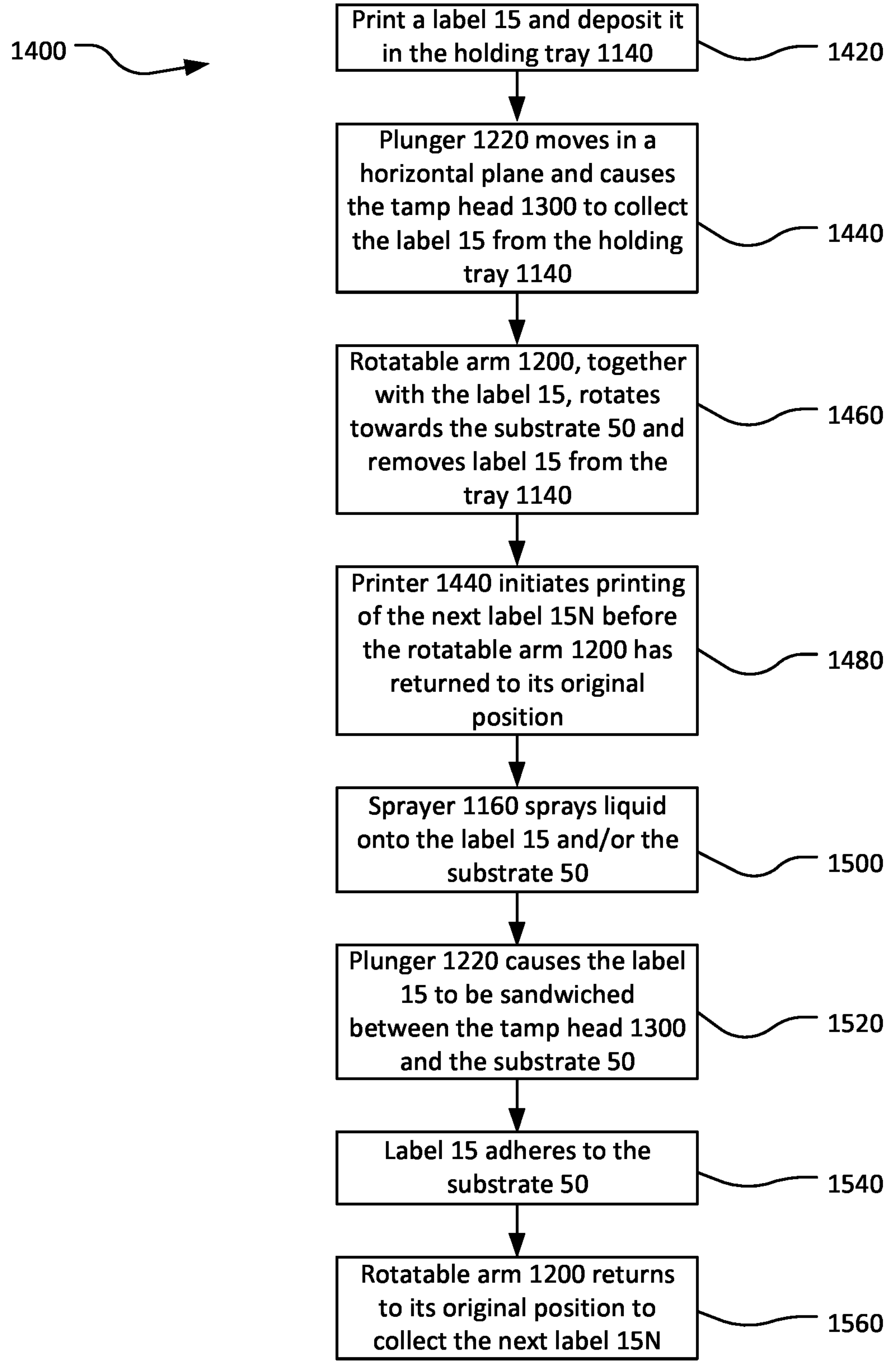
FIG. 16 is a flow chart illustrating a method for operating the label printing and applying system of FIG. 12, in an embodiment.
Figure 17:
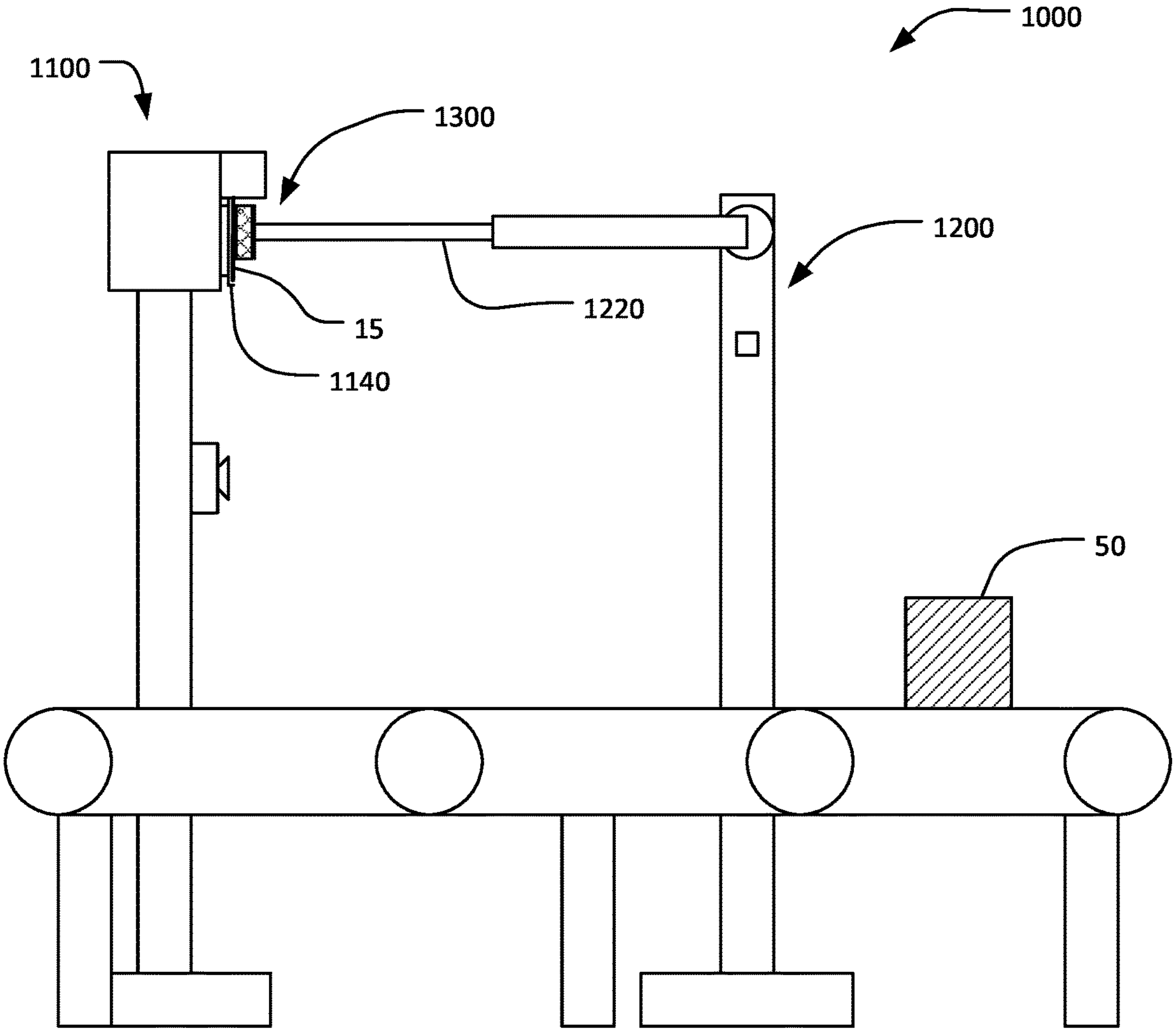
FIGS. 17-20 illustrate example operation of the label printing and applying system of FIG. 12, in an embodiment.

FIG. 16 is a flowchart depicting a method 1400 of printing labels and applying these labels to substrates, in an example embodiment. First, at step 1420, a label 15 may be printed using the printer 1120 and deposited within the holding tray 1140. For example, as discussed above, the label 15 may be held within the holding tray 1140 using a laterally extending edge 1140A, a vacuum, et cetera.

Figure 12:
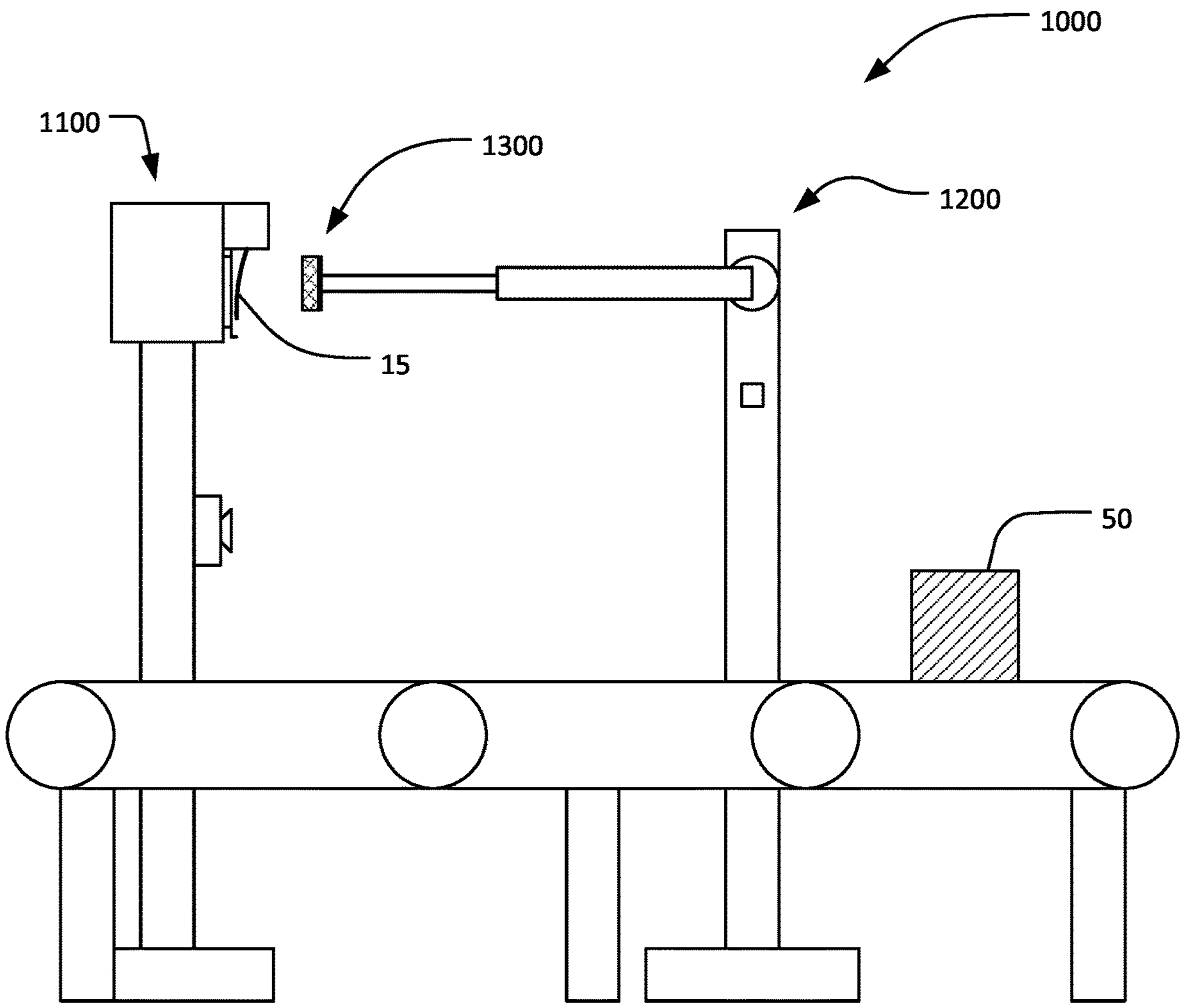
FIG. 12 is a side view of a label printing and applying system, according to an embodiment of the disclosure.

FIG. 12 shows the automated arm 1200 in its initial or original position. At step 1440, once the label 15 is printed and held in the holding tray 1140 as shown in FIGS. 12 and 13, the automated arm 1200 and/or a portion thereof may extend (e.g., horizontally) to an intermediate position. For example, the telescoping plunger 1220 may telescope and/or otherwise extend in the horizontal plane to a first position such that the tamp head 1300 contacts the label 15 being held in the holding tray 1140 (see FIG. 17) for collection. Alternately, the plunger 1220 may be brought proximate the label 15 in the holding tray 1140 so that the label adheres to the tamp head 1300 by virtue of a vacuum.

At step 1460, once the tamp head 1300 has collected the label 100 from the holding tray 1140, the rotatable arm 1200 may rotate (towards the substrate 50 to another intermediate position) while the label 100 is secured to the tamp head 1300 (e.g., via a vacuum), and resultantly, remove the label 15 from the tray 1140. At step 1480, as soon as the label 15 is removed from the tray 1140, printing of the next label 15N by the printer 1120 may be initiated.

Figure 18:
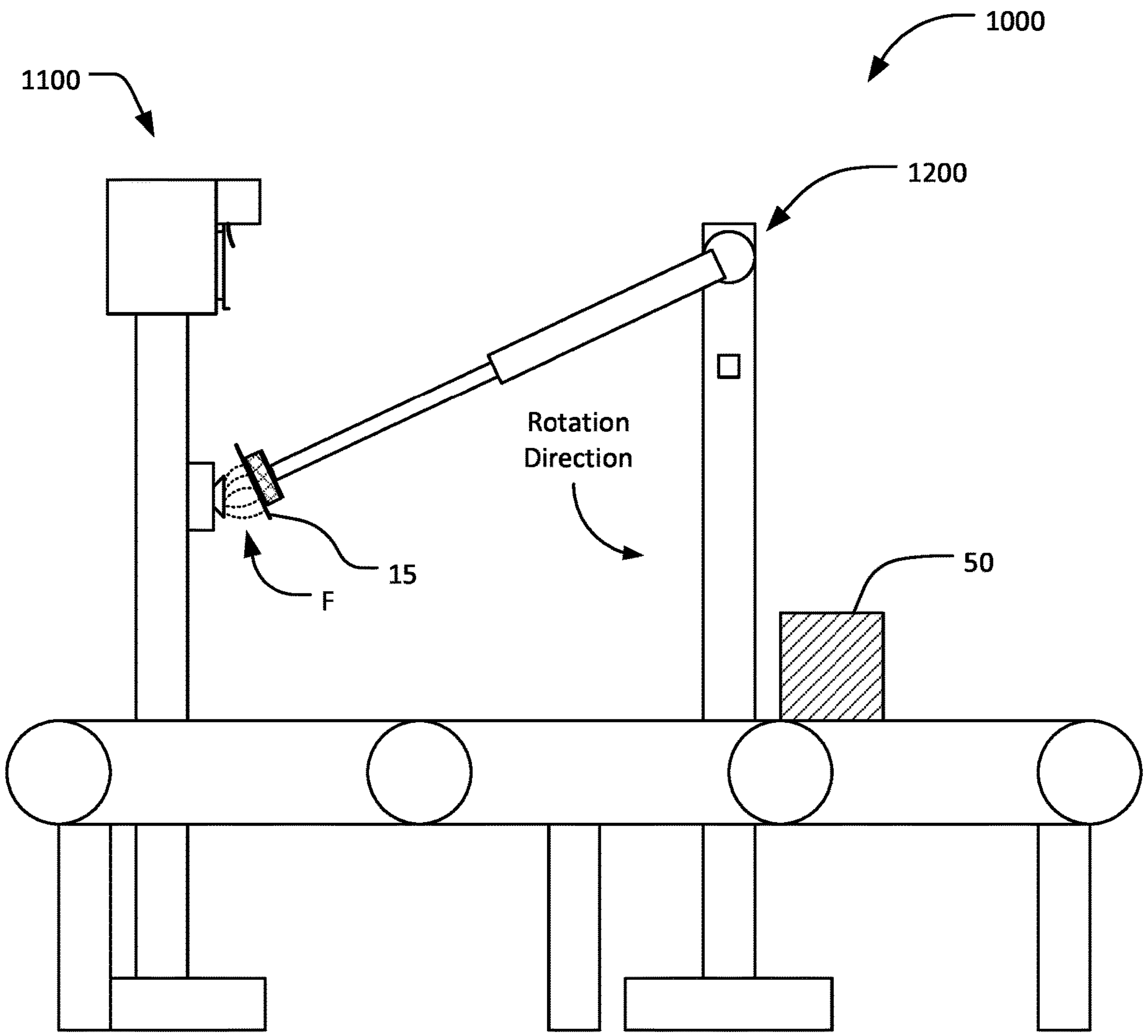
Figure 18A:
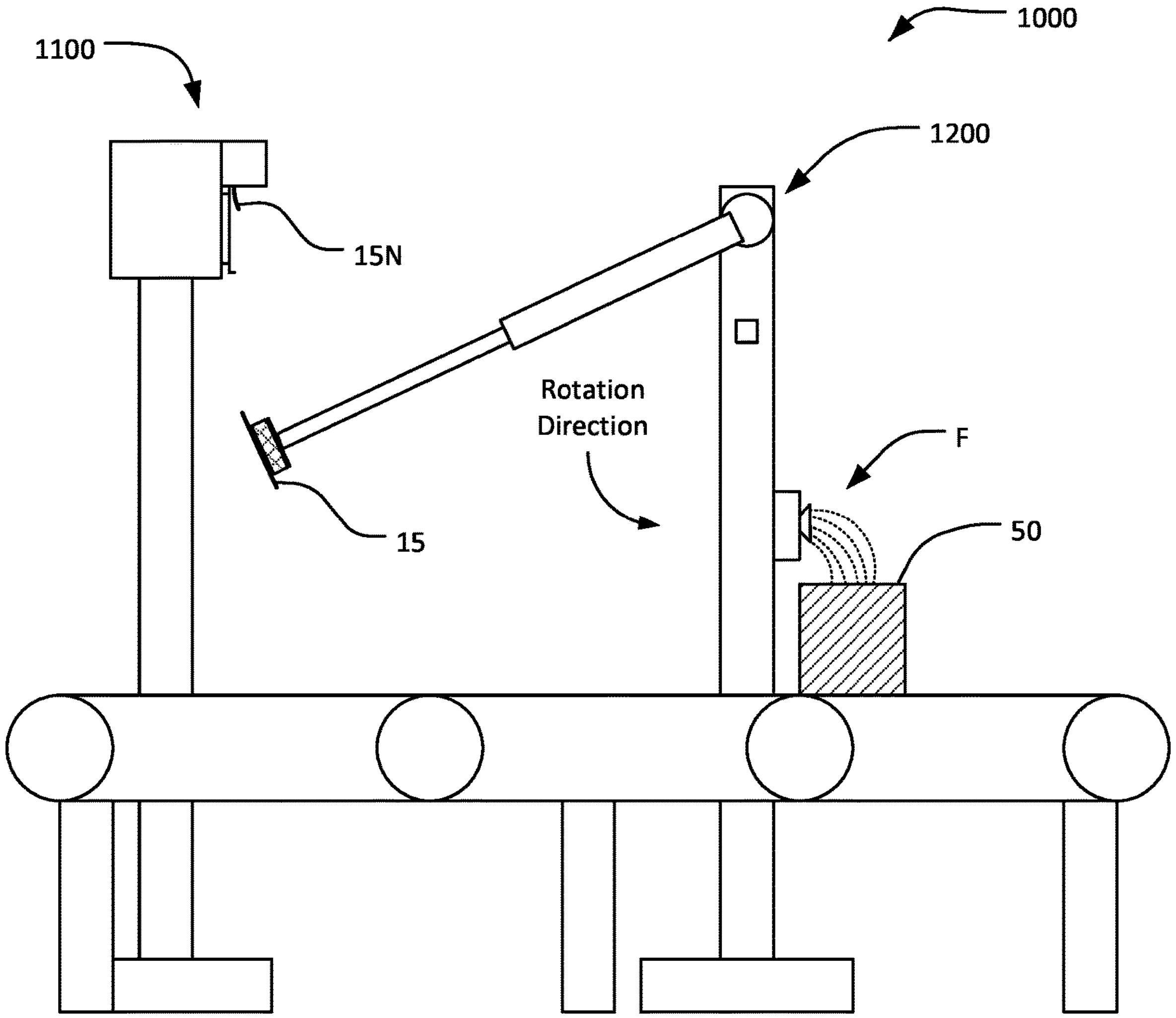
FIG. 18A illustrates example operation of another label printing and applying system, in an embodiment.

At step 1500, fluid may be sprayed onto the label 15 and/or on the substrate 50 (which substrate 50 may be moving on the conveyer belt) by the sprayer 1160 to allow for the displaceable liner at the underside of the label to be activated. For example, the rotatable arm 1200 may continue to rotate towards the substrate 50 while the label 15 is adhered to the tamp head 1300 and resultantly bring the label 15 proximate the sprayer 1160 (see FIG. 18) in another intermediate position. The sprayer 1160 may spray fluid F (e.g., water) on the label 15 to dispel the displaceable liner thereon. Alternately or additionally, the sprayer 1160 may spray the fluid F onto the substrate 50 itself so that the moistened substrate 50 may dispel the displaceable liner on the label 15 when the label 15 is brought in contact therewith, as shown in FIG. 18A.

Figure 19:
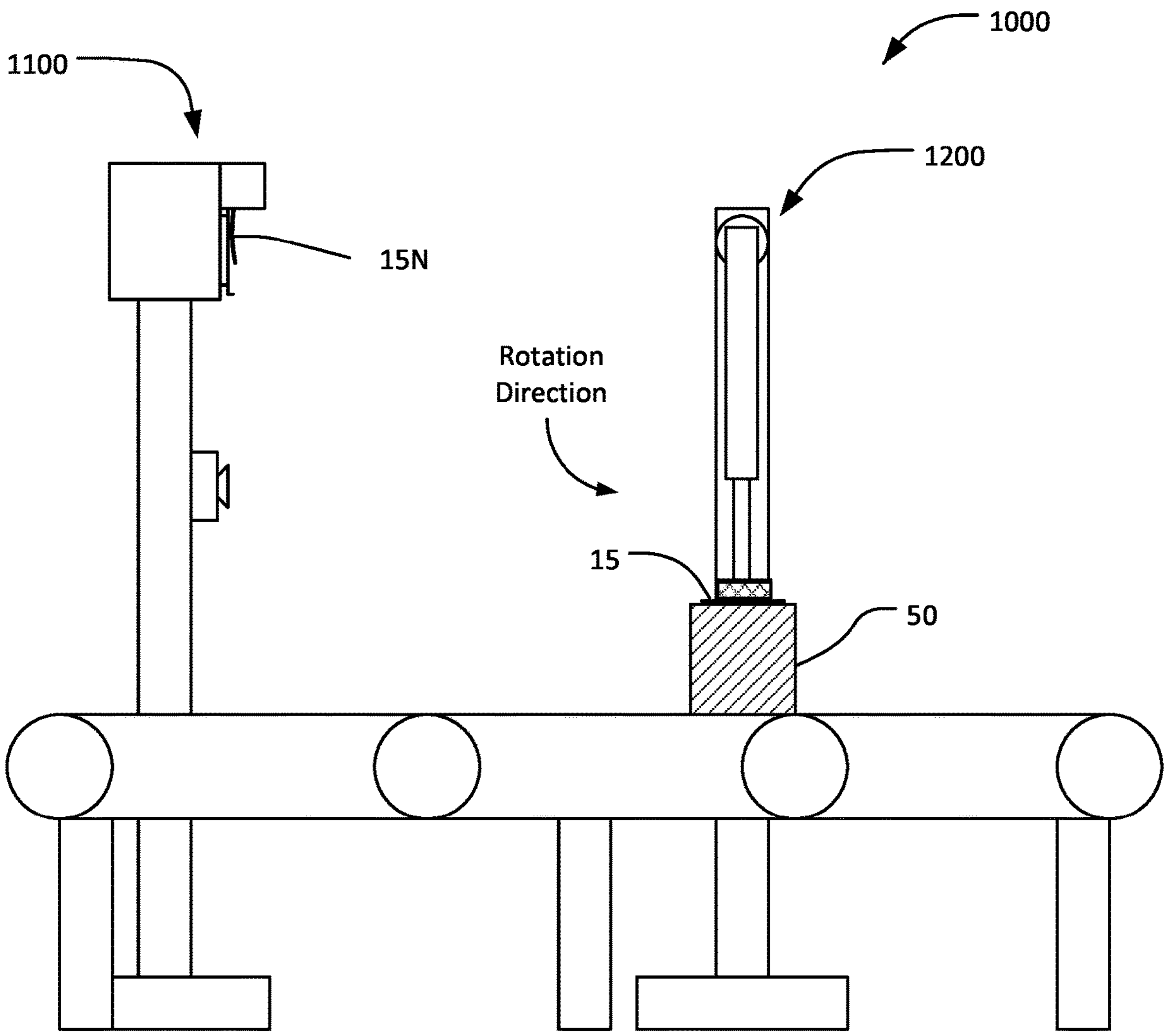

At step 1520, the rotatable arm 1200 may continue to rotate towards the substrate 50, and eventually, the movable plunger 1220 may cause the tamp head 1300 to sandwich the label 15 between the substrate 50 and the tamp head 1300 (see FIG. 19). This position of the arm 1200 may be referred to as the second position. When the underside of the label 15 contacts the substrate 50, the moisture on the underside of the label 15 and/or on the substrate 50 may cause the displaceable liner coating disposed on the label 15 to dissolve into the substrate 50 to adhere thereto (e.g., by nature of the label 15 exposed adhesive, by nature of the label 15 displaceable liner infiltrating the substrate 50 and drying therein, et cetera), at step 1540.

Figure 20:
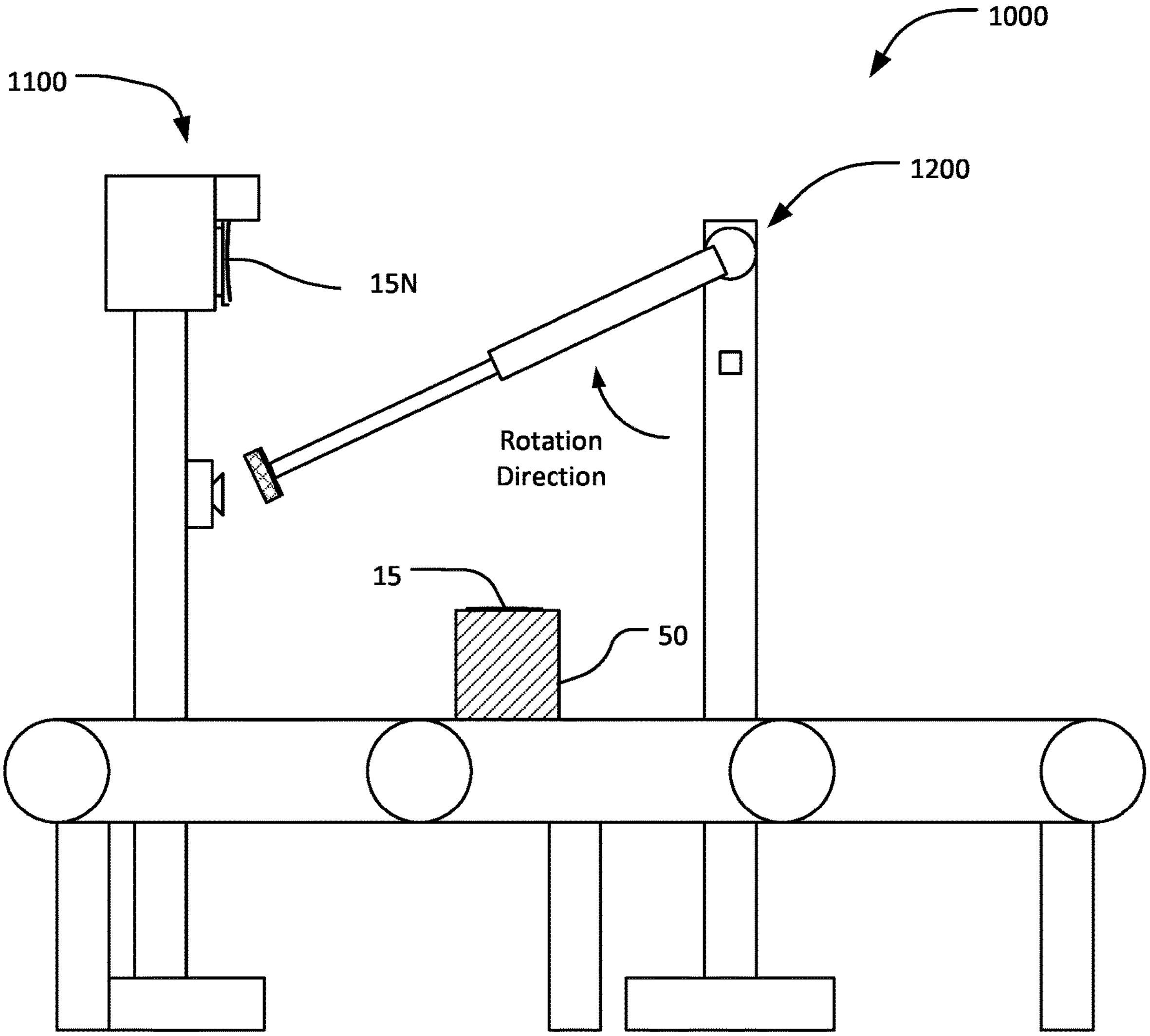

At step 1560, once the label 15 is adhered, the rotatable arm 1200 may return to its original position (see FIG. 20 showing the arm 1200 returning to its original position). By this time, the printer 1120 may already have printed the next label 15N in its entirety and deposited same into the tray 1140. Alternately, the printer 1120 may have printed at least part of the next label 15N. The rotatable arm 1200 may therefore collect the next label 15N from the tray 1140, and apply the next label 15N to the next substrate 50 as discussed above. In this way, the waiting time requirement may be eliminated or at least greatly reduced, allowing for a greater number of labels to be printed and applied to substrates in a given time period compared to the prior art, yielding significant cost savings.

The artisan would understand that the steps of the method 1400 need not be carried out in the exact order as described, that some steps may occur simultaneously with other steps, and that some steps may be optional, and that each of these combinations of carrying out the method 1400 are within the scope of the present disclosure. For example, spraying of the fluid F by the sprayer 1160 at step 1500 may be unnecessary where a traditional paper liner is being used as opposed to a displaceable liner.

Figure 21:
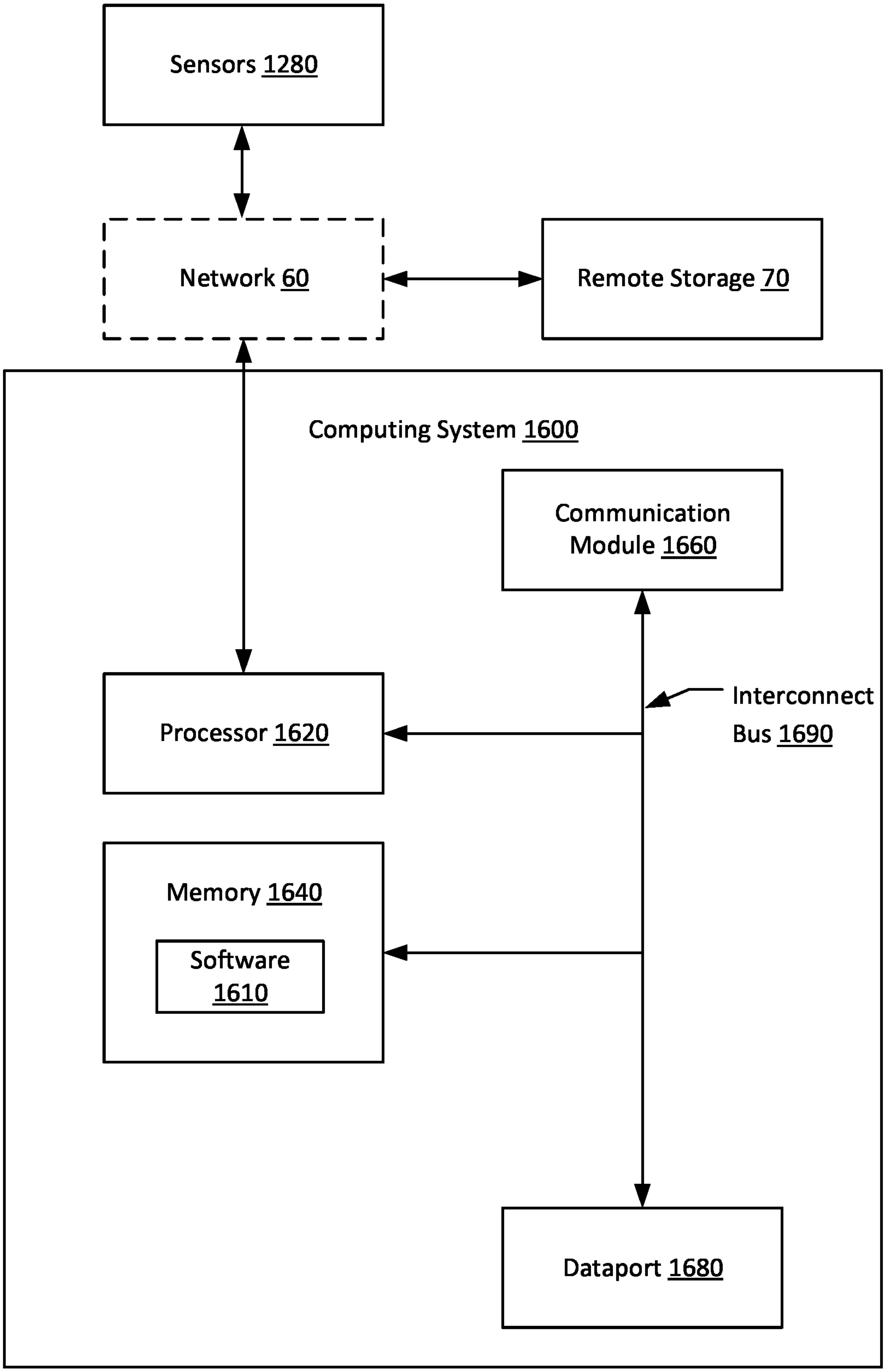
FIG. 21 is a block diagram illustrating a computing system of the label printing and applying system of FIG. 12.

FIG. 21 is a functional block diagram of the computing system 1600 which may be used to implement the various labeling apparatus embodiments according to the different aspects of the present disclosure. The computing system 1600 may be, for example, a smartphone, a laptop computer, a desktop computer, a flexible circuit board, or other computing device whether now known or subsequently developed. The computing system 1600 comprises a processor 1620, the memory 1640, a communication module 1660, and a dataport 1680. These components may be communicatively coupled together by an interconnect bus 1690. The processor 1620 may include any processor used in smartphones and/or other computing devices, including an analog processor (e.g., a Nano carbon-based processor). In certain embodiments, the processor 1620 may include one or more other processors, such as one or more microprocessors, and/or one or more supplementary co-processors, such as math co-processors.

The memory 1640 may include both operating memory, such as random access memory (RAM), as well as data storage, such as read-only memory (ROM), hard drives, optical, flash memory, or any other suitable memory/storage element. The memory 1640 may include removable memory elements, such as a CompactFlash card, a MultiMediaCard (MMC), and/or a Secure Digital (SD) card. In certain embodiments, the memory 1640 includes a combination of magnetic, optical, and/or semiconductor memory, and may include, for example, RAM, ROM, flash drive, and/or a hard disk or drive. The processor 1620 and the memory 1640 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1620 may be connected to the memory 1640 via the dataport 1680.

The communication module 1660 may be configured to handle communication links between the computing system 1600 and other external devices or receivers, and to route incoming/outgoing data appropriately. For example, inbound data from the dataport 1680 may be routed through the communication module 1660 before being directed to the processor 1620, and outbound data from the processor 1620 may be routed through the communication module 1660 before being directed to the dataport 1680. The communication module 1660 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology.

The dataport 1680 may be any type of connector used for physically interfacing with a smartphone, computer, and/or other devices, such as a mini-USB port or an IPHONE/IPOD® 30-pin connector or LIGHTNING® connector. In other embodiments, the dataport 1680 may include multiple communication channels for simultaneous communication with, for example, other processors, servers, and/or client terminals.

The memory 1640 may store instructions for communicating with other systems, such as a computer. The memory 1640 may store, for example, a program (e.g., computer program code) adapted to direct the processor 1620 in accordance with the embodiments described herein. The instructions also may include program elements, such as an operating system. While execution of sequences of instructions in the program causes the processor 1620 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 1640 includes software 1610. The software 1610 may contain machine-readable instructions configured to be executed by the processor 1620. The software 1610 may, for example, process data obtained from the sensor 1280. In embodiments, the software 1610 may cause the computing system 1600 to dynamically respond to a reading obtained by the sensor 1280. For example, the software 1610 may direct the automated arm 1200 to collect a label in response to a sensor 1280 determination that the label has been deposited in the holding tray 1140. As another example, the software 1610 may direct the automated arm 1200 to bring the label into contact with the substrate 50 in response to a sensor 1280 determination that the substrate 50 is ready to receive the label (i.e., the substrate 50 is within reach of the automate arm 1200).

The computing system 1600 may be in data communication with a remote storage 70 over a network 60. The network 60 may be a wired network, a wireless network, or comprise elements of both. In embodiments, the network 60 may communicatively link one or more components of the labeling apparatus 1000. For example, the sensor 1280 may be communicatively linked to the computing system 1600 via the network 60 for the exchange of information therebetween. The remote storage 70 may be, for example, the "cloud" or other remote storage in communication with other computing systems. In embodiments, data (e.g., readings obtained by the sensor 1280 and the dynamic responses of the computing system 1600 thereto) may be stored in the remote storage 70 for analytics.

As noted, one advantage of the labeling system 1000 may be that it may allow a printer to continuously print labels while the tamp head is moving between the printer and a desired surface for label application. Conversely, printers on existing label applicator systems may only be able to print off the next label for application once the tamp head has returned to the printer. Because the next label in an automatic label applicator system 1000 may be ready and waiting for pick up by the tamp head as soon as the tamp head completes its cycle, there may be a significant reduction in the time it takes to apply a large number (e.g., thousands) of labels, relative to existing label application systems.

FIGS. 22-23 and 25-29 depict an embodiment 2000 of the label printing and application system. The system 2000 may be substantially the same or similar to the system 1000, except where explicitly noted or would be inherently implied. The system 2000 may comprise a staging area or printer 2100, an automated arm 2200, and a tamp head 2300. One difference between the system 1000 and the system 2000 is that the automated arm 2200 may be configured for both rotational and linear displacement, whereas the automated arm 1200 may be configured primarily for rotational movement. As such, the printer 2100 may make use of an angled (e.g., extending both vertically and horizontally) holding tray 2140 tray to receive the printed labels. This angled holding tray 2140 may, in embodiments, selectively retain the printed labels therein without the use of a vacuum charge (i.e., by holding the label with a lip or edge).

Figure 23:
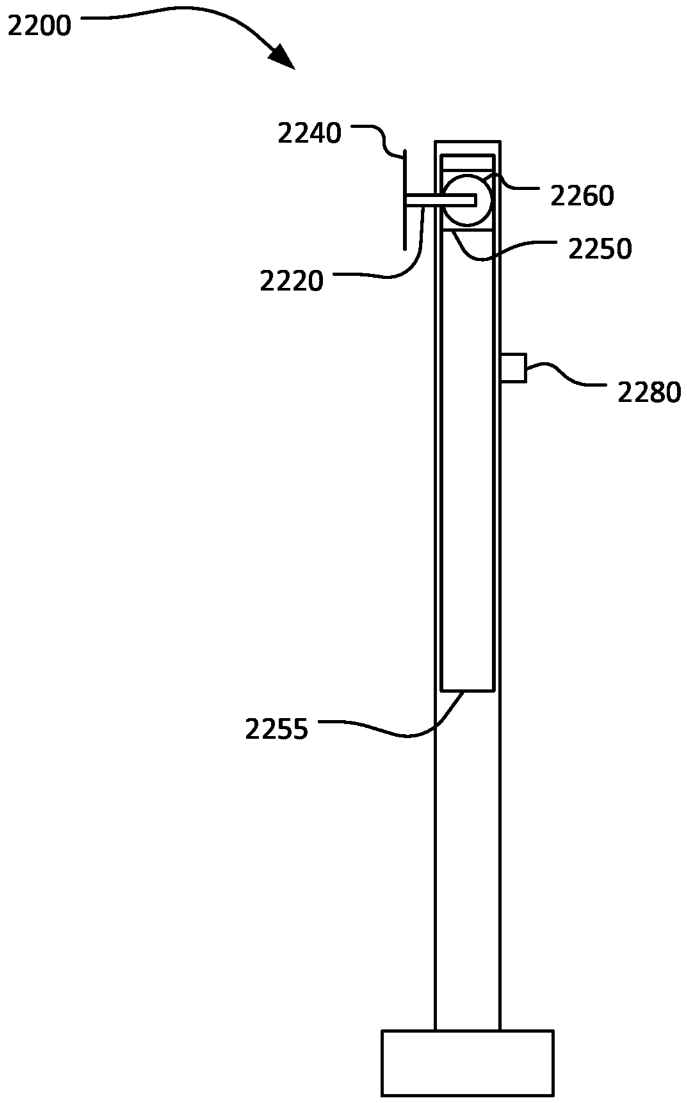
FIG. 23 is a side view of an automated arm of the label printing and applying system of FIG. 22.

The arm 2200, as seen in FIG. 23, may comprise an appendage 2220, a plate 2240 at a distal end thereof, a displacement mechanism 2250, a track 2255, a rotation device 2260, and one or more sensors 2280. The appendage 2220, similar to the plunger 1220, may be configured to be telescoping (or may otherwise be configured to selectively retract, extend, and/or otherwise adjust position), and may have a plate 2240 attached to a distal end thereof. In alternate embodiments, the appendage 2220 may instead be static or otherwise unchanging in dimensions. The plate 2240 may be configured to hold the tamp head 2300, and may, in embodiments, comprise vacuum nozzles to charge the tamp head 2300 with a vacuum. The rotation device 2260 may be, for example, a motor or servo motor operably coupled to a proximal end of the appendage 2220. The rotations device 2260 may be configured to cause the arm 2200 to rotate (or otherwise move) such that the tamp head 2300 pulls the printed label from the tray 2140.

The displacement mechanism 2250 may be, for example, a servo or other motor which may displace the rotational device 2260, the appendage 2220, and the plate 2240 (as well as any label 15 attached thereto) along the track 2255. The track 2255 may be any suitable track for allowing movement in a linear direction now known or subsequently developed, such as a rack a n pinion, system, an internally geared track, an externally geared track, et cetera. The displacement mechanism 2255 may move the arm 2200 in a linear or longitudinal direction (i.e., along a height of the arm 2200) to eventually bring the label 15 in proximity with the substrate 50 for adhesion of the label 15 thereto. In operation, the rotational and linear movement of the arm 2200, as provided by the combination of the displacement mechanism 2250 and the rotational device 2260, may allow the plate 2240 and the tamp head 2300 to collect a label 15 from the printer 2100 while clearing the holding tray 1140 thereof, as will be discussed in greater detail below.

In embodiments, before the label is applied to the substrate, the arm 2200 may cause the label to be brought proximate a sprayer (e.g., sprayer 1160) so that the sprayer may spray fluid on an underside of the label to activate the displaceable liner or the displaceable adhesive liner. In other embodiments, the sprayer may directly moisten the substrate 50 before the label is brought into contact therewith by the arm 2200. In such cases, the liner may activate when the liner is brought into contact with the wetted substrate 50.

Figure 24:
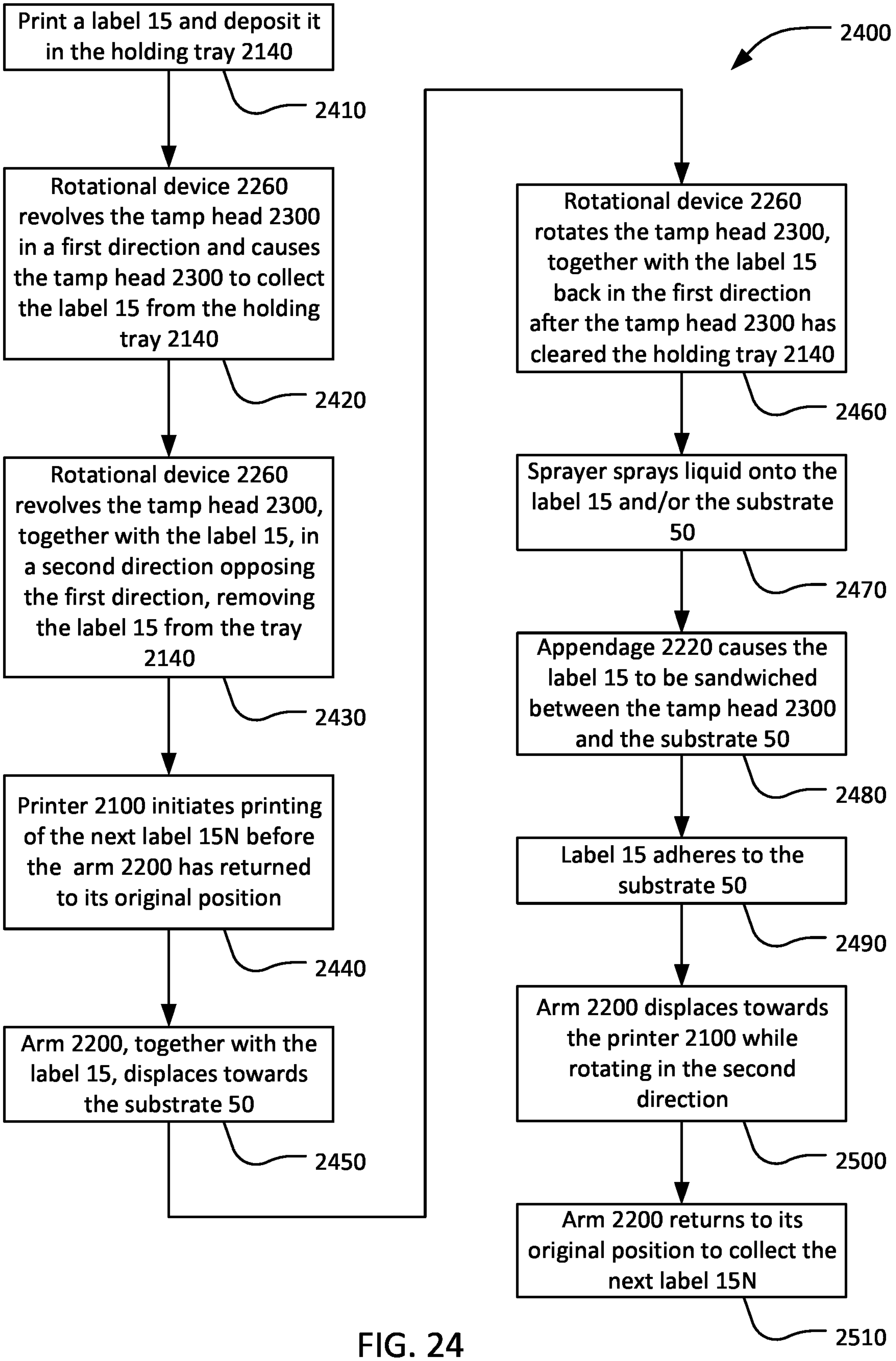
FIG. 24 is a flow chart illustrating a method for operating the label printing and applying system of FIG. 22, in an embodiment.
Figure 25:
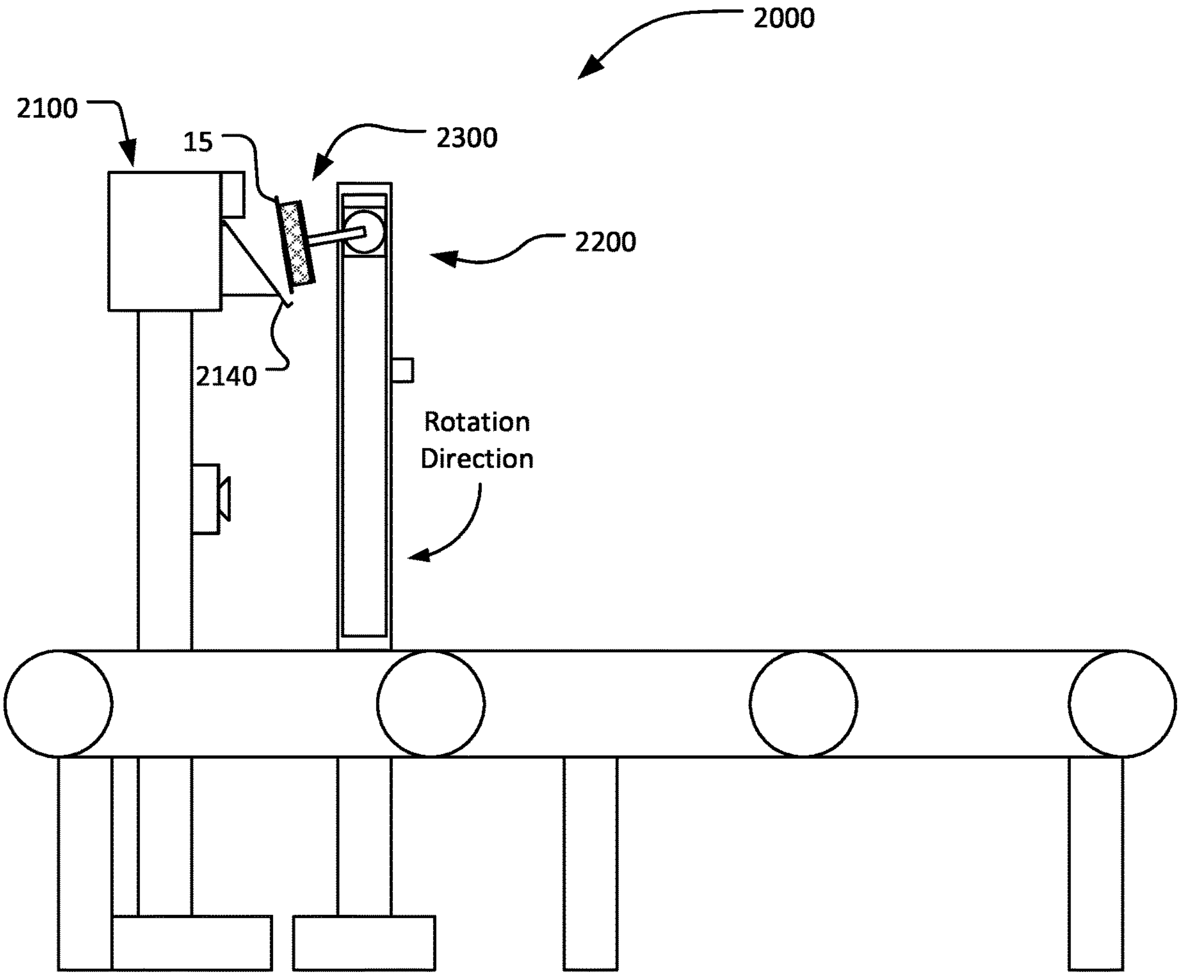
FIGS. 25-29 illustrate example operation of the label printing and applying system of FIG. 22, in an embodiment.

FIG. 24 is a flowchart depicting a method 2400 of printing labels and applying these labels to substrates using the system 2000, in an example embodiment. First, at step 2410, a label 15 may be printed using the printer 2100 and deposited within the holding tray 2140. For example, as discussed above, the label 15 may be held within the holding tray 2140 using a laterally extending edge, a vacuum, et cetera. The label 15 printed may be, for example, one of the label embodiments described herein (i.e., label embodiment 100, 100', 300, 400, 900, 900"), or any other suitable label now known or subsequently developed.

Figure 22:
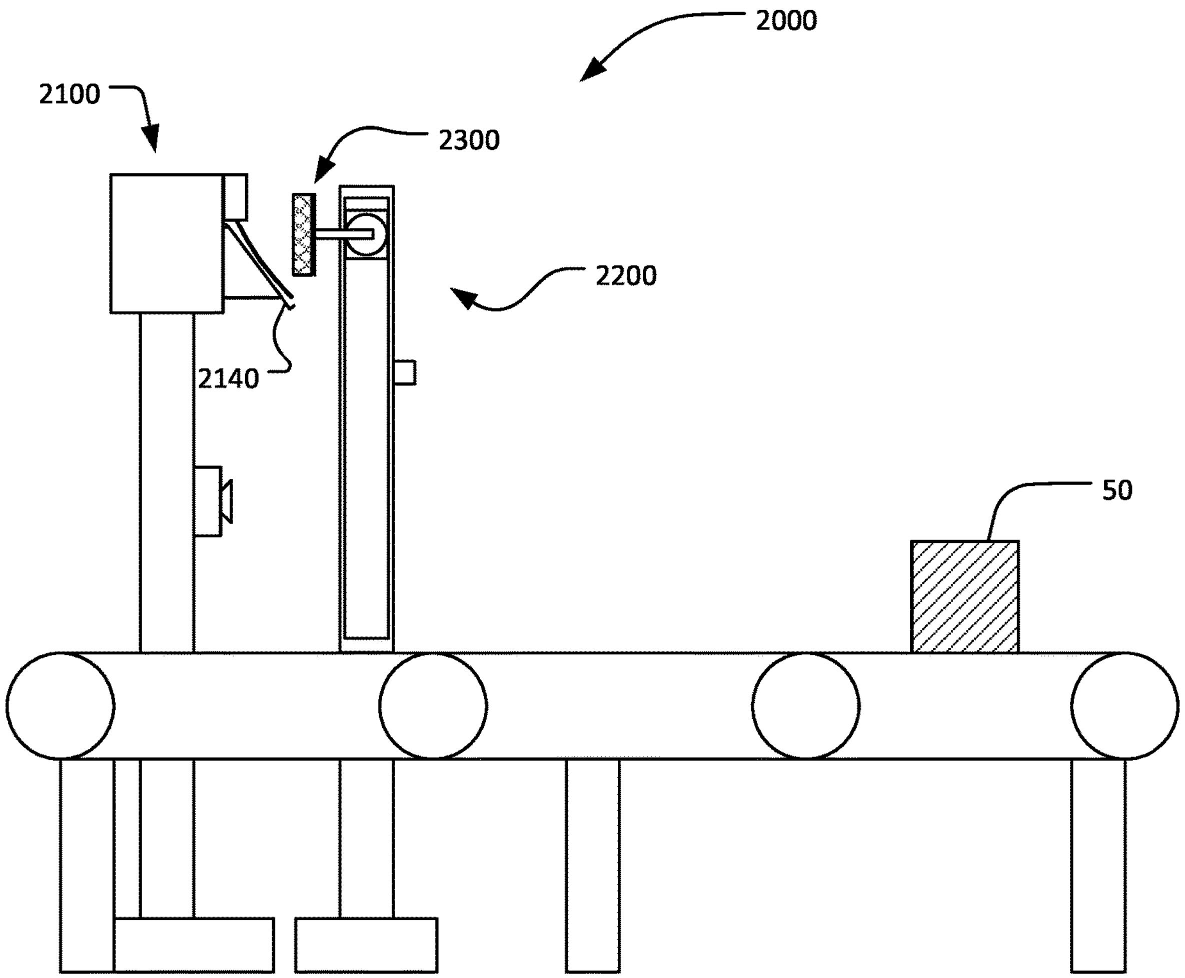
FIG. 22 is a side view of a label printing and applying system, according to another embodiment of the disclosure.

FIG. 22 shows the automated arm 1200 in its initial or original position. At step 2420, once the label 15 is printed and held in the holding tray 2140, the automated arm 2200 may collect the label 15 therefrom. For example, in some embodiments, the appendage 2220 and the rotational device 2260 may rotate the tamp head 2300 in a first direction (FIG. 25) such that the tamp head 2300 contacts the label 15. Alternately, the appendage 2220 may extend or otherwise translate to bring the tamp head 2300 proximate the label 15 in the holding tray 2140 so that the label 15 adheres to the tamp head 2300 by virtue of a vacuum.

Figure 26:
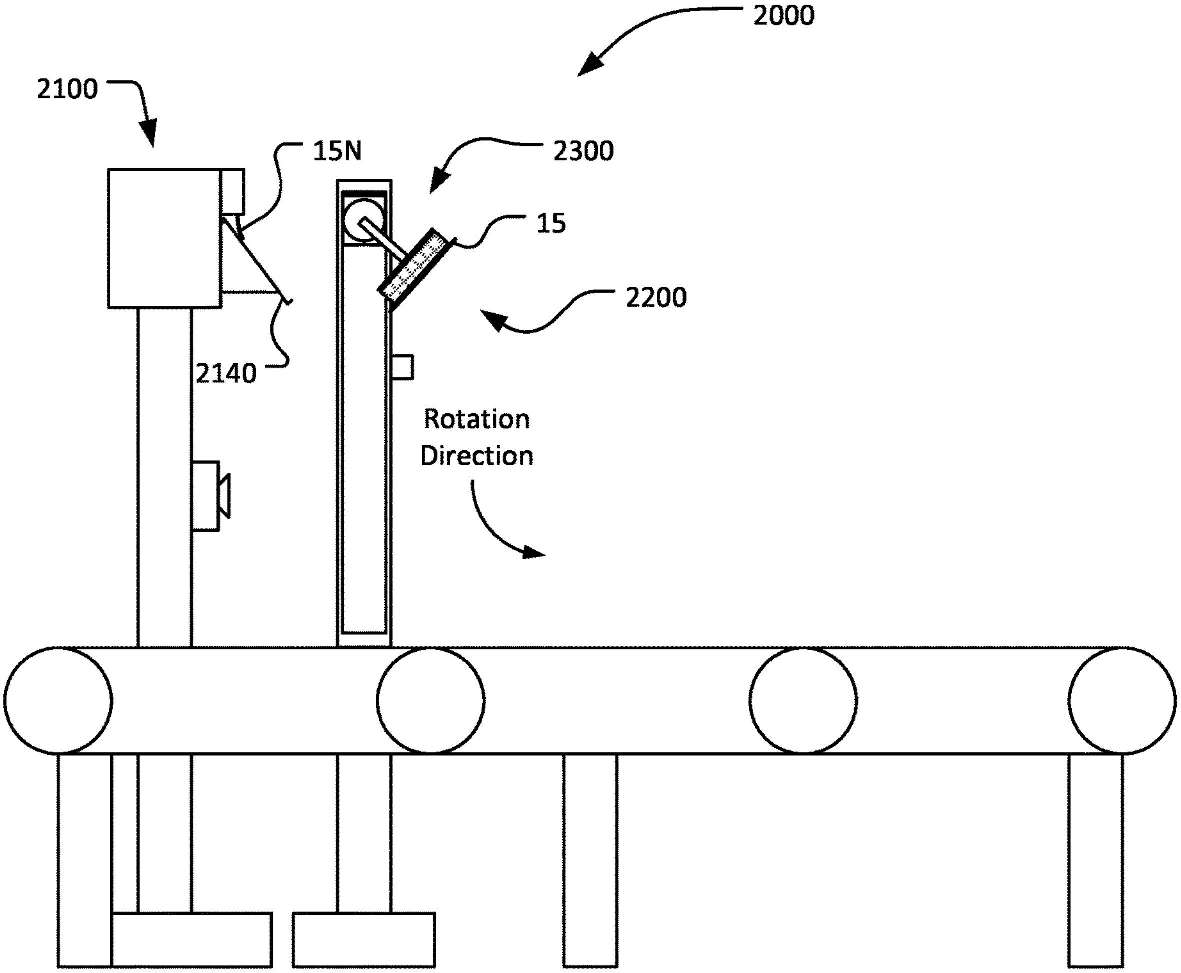

At step 2430, once the tamp head 2300 has collected the label 15 from the holding tray 2140, the arm 2220 may rotate in a second direction, opposing the first direction (FIG. 26). The label 15 is secured to the tamp head 2300 (e.g., via a vacuum), and resultantly, the label 15 is removed from the tray 2140. At step 2440, after the label 15 is removed from the tray 2140 (e.g., as soon as the label 15 is removed from the tray 2140), printing of the next label 15N by the printer 2100 may be initiated.

Figure 27:
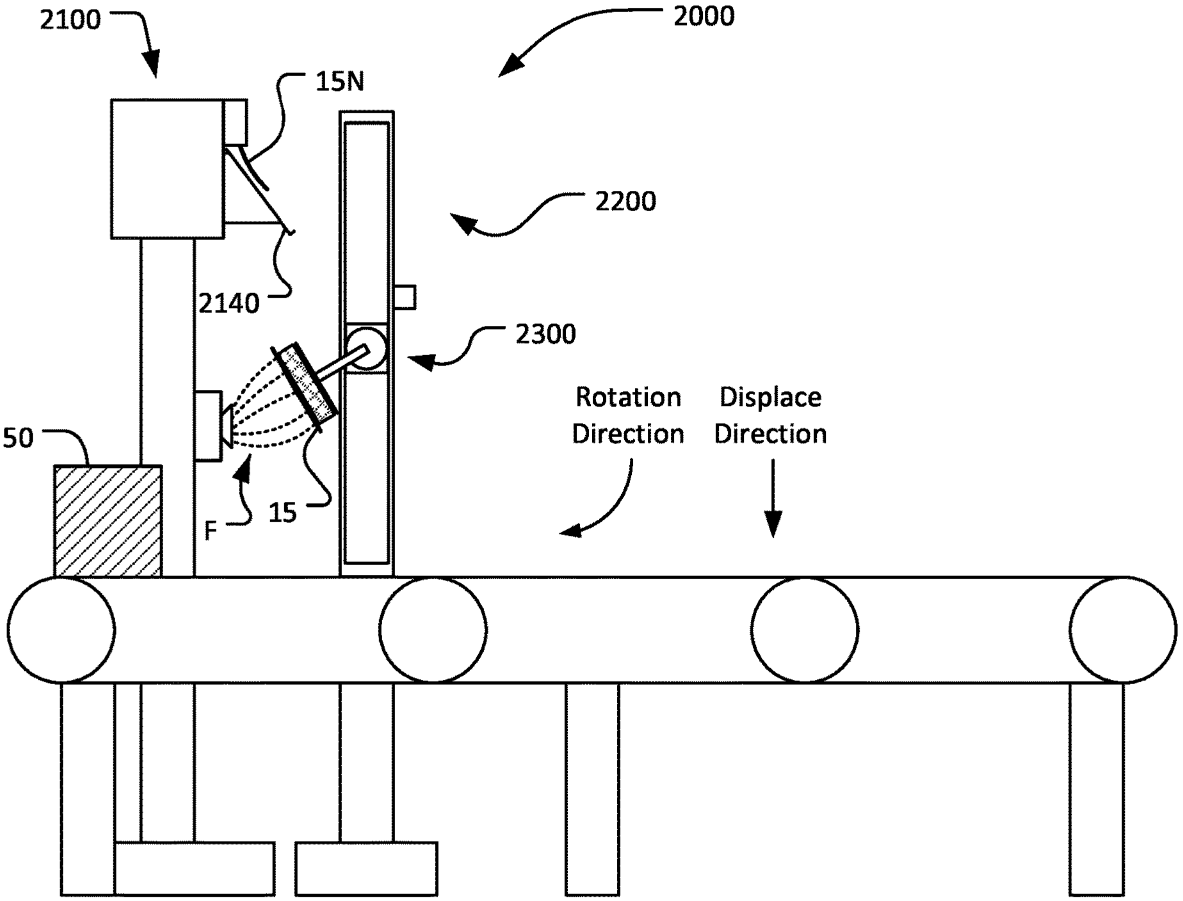

At step 2450, the arm 2200 may displace away from the printer 2100 (e.g., towards the substrate 50) (FIG. 27). For instance, the arm 2200 may use the displacement mechanism 2250 to move the arm 2200 and the label 15 along the track 2255 in a longitudinal direction or along the height of the automated arm 2200. At step 2460, the rotational device 2260 may rotate the tamp head 2300 back in the first direction. This rotational movement back in the first direction may only occur after the tamp head 2300 has displaced along the track 2255 far enough such that the holding tray 2140 is cleared.

Figure 27A:
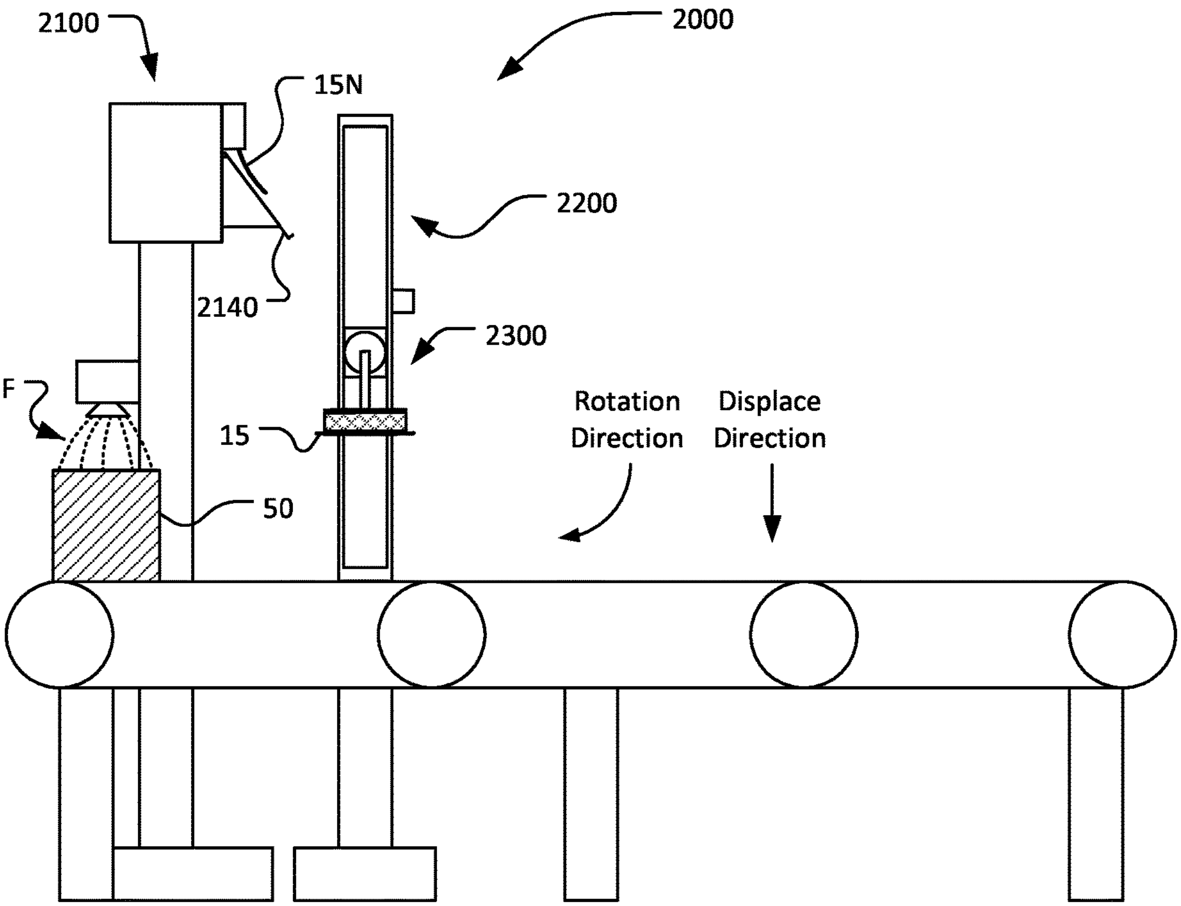
FIG. 27A illustrates example operation of another label printing and applying system, in an embodiment.

At step 2470, fluid may be sprayed onto the label 15 and/or on the substrate 50 (which substrate 50 may be moving on the conveyer belt) by the sprayer to allow for a displaceable liner at the underside of the label to be activated. For example, the rotatable arm 2200 may continue to displace towards the substrate 50 while the label 15 is adhered to the tamp head 2300 and resultantly bring the label 15 proximate the sprayer (see FIG. 27) in an intermediate position. The sprayer may spray fluid F (e.g., water) on the label 15 to dispel the displaceable liner thereon. Alternately or additionally, the sprayer may spray the fluid F onto the substrate 50 itself so that the moistened substrate 50 may dispel the displaceable liner on the label 15 when the label 15 is brought in contact therewith, as shown in FIG. 27A.

Figure 28:
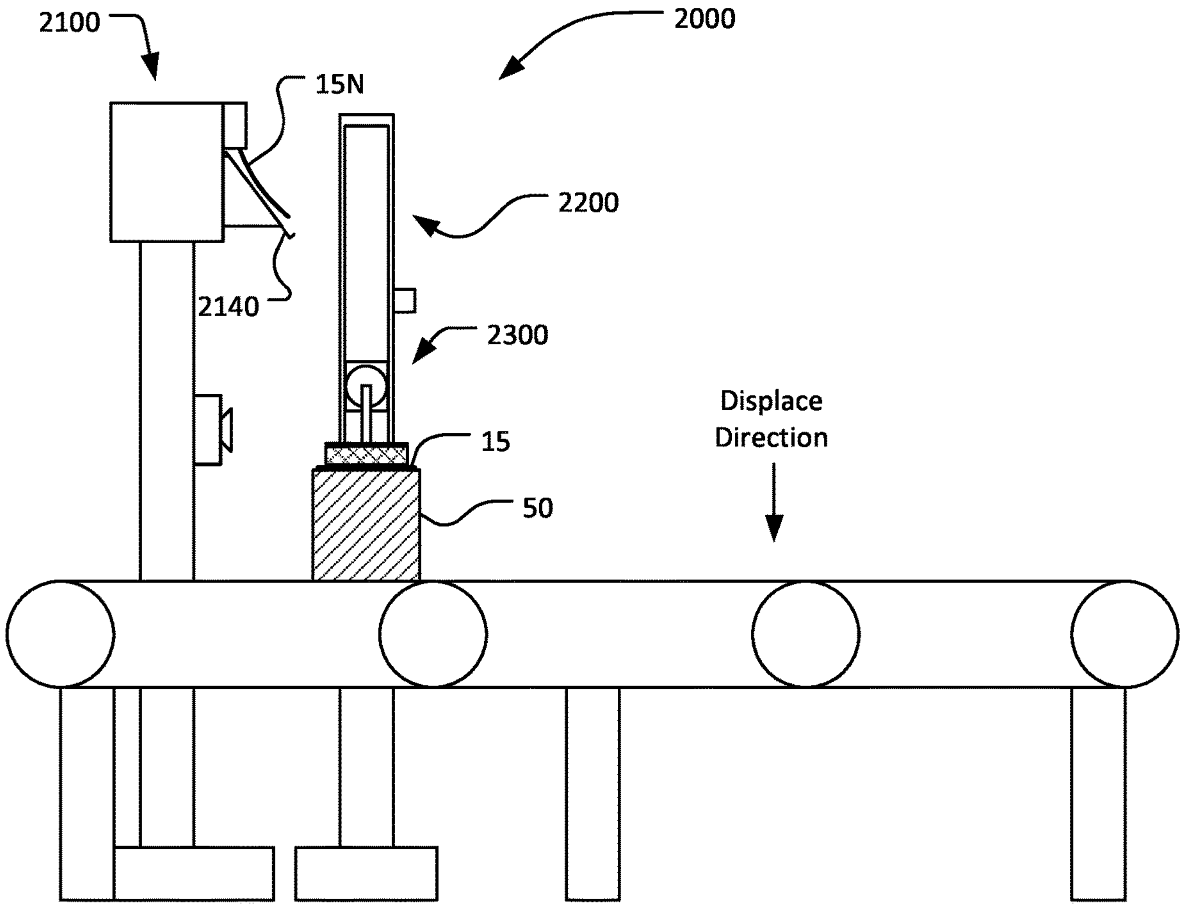

At step 2480, the automated arm 2200 may continue to displace towards the substrate 50, and eventually, the plate 2240 may cause the tamp head 2300 to sandwich the label 15 between the substrate 50 and the tamp head 2300 (see FIG. 28). This position of the arm 2200 may be referred to as the second position. When the underside of the label 15 contacts the substrate 50, the moisture on the underside of the label 15 and/or on the substrate 50 may cause the displaceable liner coating disposed on the label 15 to dissolve into the substrate 50 to adhere thereto (e.g., by nature of the label 15 exposed adhesive, by nature of the label 15 displaceable liner infiltrating the substrate 50 and drying therein, et cetera), at step 2490.

Figure 29:
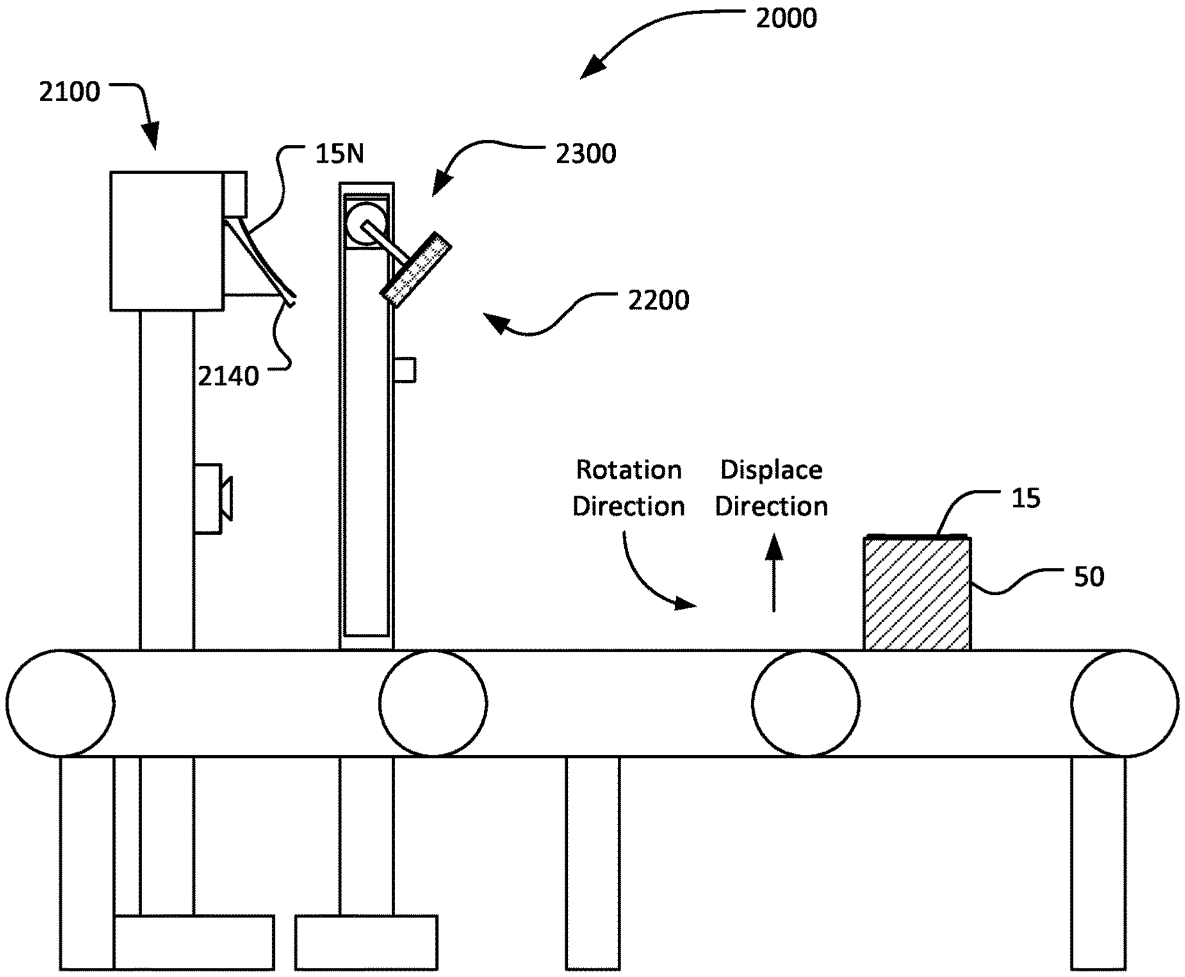

At step 2500, once the label 15 is adhered, the automated arm 2200 may begin displacing back towards the printer 2100, and away from the substrate 50. At this time, the arm 2200 may also rotate in the second direction to clear the holding tray 2140. Then, at step 2510, the arm 2200 may return to its original position (see FIG. 29 showing the arm 2200 returning to its original position). By this time, the printer 2100 may already have printed the next label 15N in its entirety and deposited same into the tray 2140. Alternately, the printer 2100 may have printed at least part of the next label 15N. The automated arm 2200 may therefore collect the next label 15N from the tray 2140, and apply the next label 15N to the next substrate 50 as discussed above. In this way, the waiting time requirement may be eliminated or at least greatly reduced, allowing for a greater number of labels to be printed and applied to substrates in a given time period compared to the prior art, yielding significant cost savings.

The artisan would understand that the steps of the method 2400 need not be carried out in the exact order as described, that some steps may occur simultaneously with other steps, and that some steps may be optional, and that each of these combinations of carrying out the method 2400 are within the scope of the present disclosure. For example, spraying of the fluid F by the sprayer at step 2540 may be unnecessary where a traditional paper liner or no liner at all is being used as opposed to a displaceable liner.

Whereas the labeling system 2000 may provide many of the same or similar benefits as the labeling system 1000, the labeling system 2000 may additionally benefit from the automated arm 2200. Embodiments of the arm 2200 that forego the use of a telescoping or otherwise dimension-changing appendage 2220 may reduce the complexity of the automated arm 2200 while still effectuating a label application process. The tamp head 2300 may circumvent the holding tray 2140 by rotating and translating the automated arm 2200 during the application process.

While example labels (e.g., shipping labels), are used to illustrate the workings of the systems 1000, 2000, the artisan will understand that the automatic label applicator systems 1000, 2000 disclosed herein may be adapted to other similar label application functions, and that such adaptions are within the scope of the present disclosure. Examples of other similar label application functions may include pharmaceutical packaging, food and beverage packaging, parts labeling, et cetera.

The artisan will understand that the labeling systems 1000, 2000 disclosed herein may include or have associated therewith electronics (e.g., the computing system 1600, the sensors 1280, 2280, et cetera). The electronics may be used to control and modify the operation of the labeling system (e.g., to change the timing of the systems 1000, 2000, to turn the systems 1000, 2000 on and off, to dynamically control the systems 1000, 2000 in response to a sensor 1280 or 2280 detection, et cetera). In some example embodiments, the processor or processors may be configured through particularly configured hardware, such as an application specific integrated circuit (ASIC), field-programmable gate array (FPGA), etc., and/or through execution of software to allow the labeling systems 2000 to function in accordance with the disclosure herein.

Figure 30:
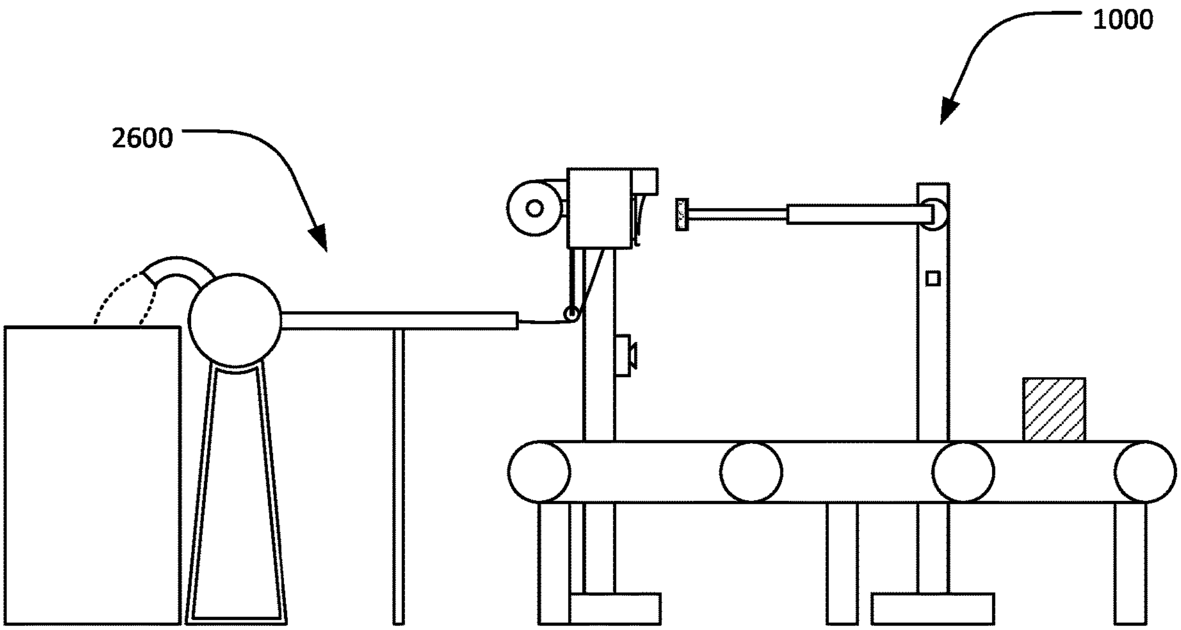
FIG. 30 is a side view of a matrix peel assist system, according to an embodiment of the disclosure.
Figure 31:
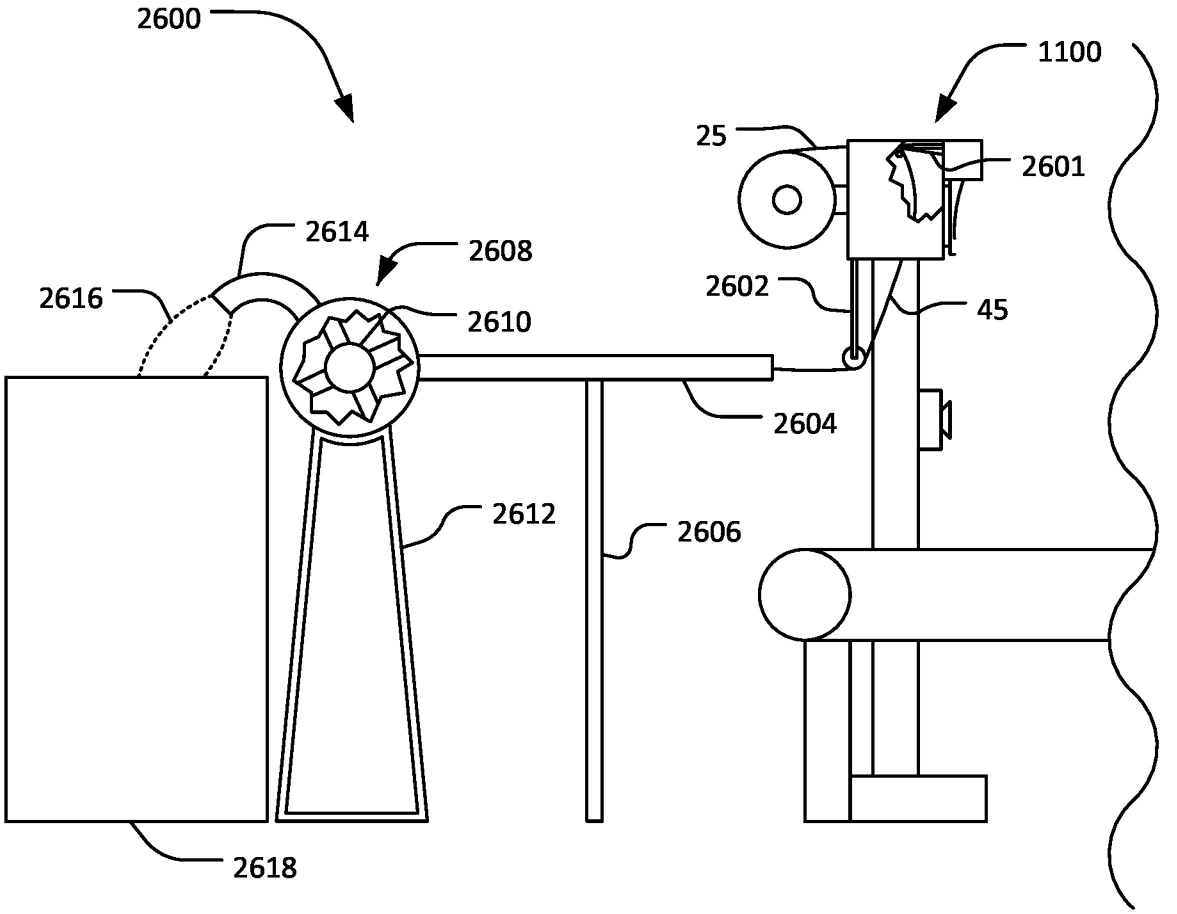
FIG. 31 is a detailed side view of the matrix peel assist system of FIG. 30.
Figure 32:
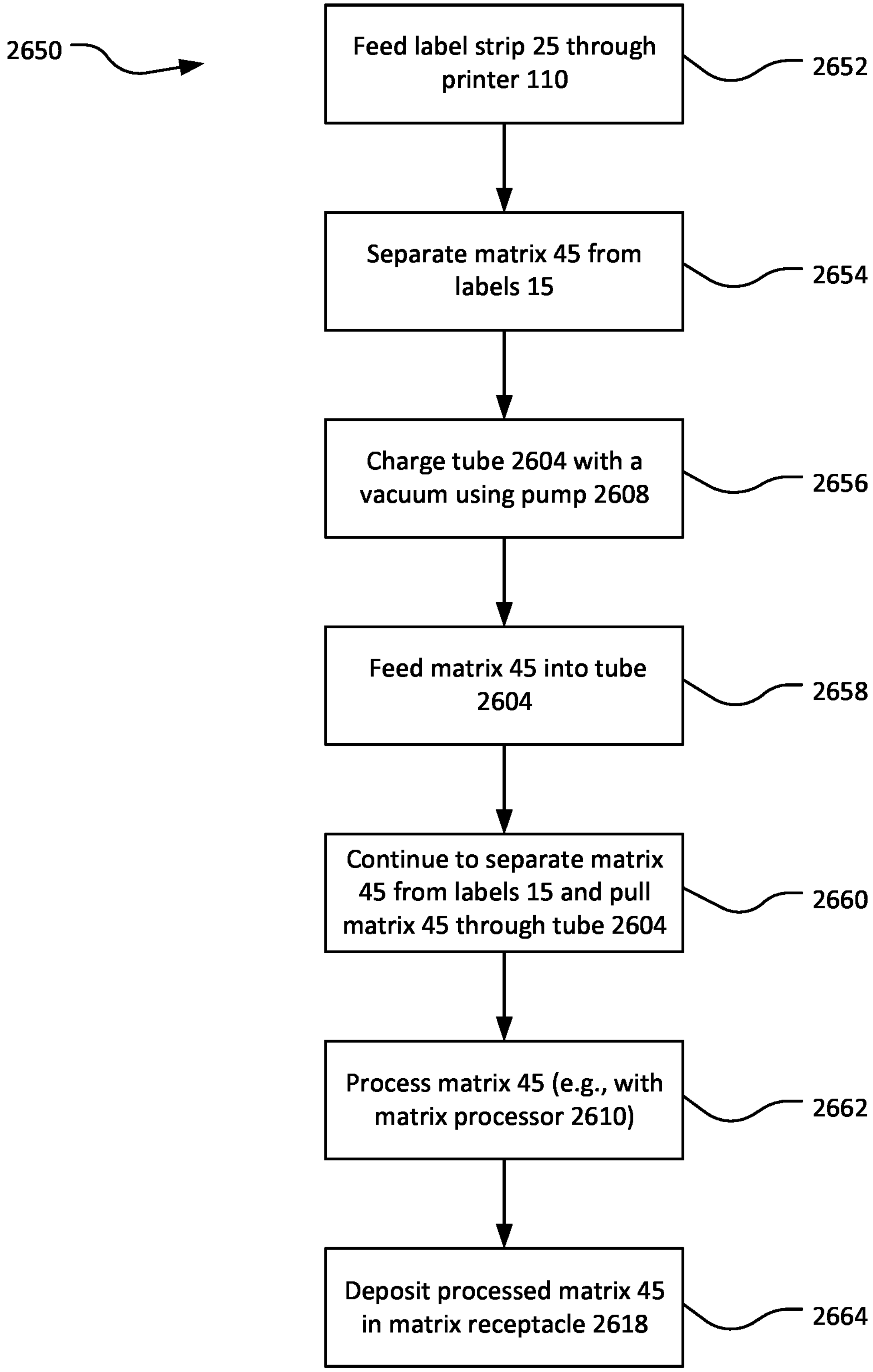
FIG. 32 is a flowchart illustrating a method of operating the matrix peel assist system of FIG. 30.

FIGS. 30-32 illustrate an embodiment 2600 of a matrix peel assist system (also referred to herein as a "matrix removal system") that may be used with, for example, the label applicator system 100. Typically, labels (e.g., conventional labels, labels 15, etc.) for feeding into a printer (e.g., printer 1100, 2100) are situated on a matrix of continuously connected material, such as paper. In embodiments, this label matrix may be included alternately or in addition to the usual liner, or dissolvable liner, of the labels. The label matrix provides a surface to which a plurality of these labels may be removably coupled to, prior to their use in print and apply machines (e.g., label applicator system 1000, 2000). The label matrix allows for the easy storage of these plurality of labels in a stack or roll prior to use.

Typically, the labels and their matrix are both fed into a printer, generally of a print and apply machine, where the labels are separated from the label matrix. This is often accomplished by exploiting lines of weakness (e.g., perforations) coupling the labels to the matrix. Another method of separating the labels from the matrix is via a peeler 2601 (FIG. 31) which contacts and separates the two as the labels and the matrix move through the staging area 1100, 2100. This peeler 2601 may be, for example, disposed upstream the printer 1100, 2100 (i.e., the label and the matrix may be separated prior to printing on the label). An example peeler of the type usable with the matrix removal system 2600 is shown in U.S. Pat. No. 10,086,599, incorporated herein by reference. The peeler 2601 may begin separation of the labels from the matrices manually (e.g., an operator may bring the first label and matrix in contact with the peeler 2601 for separation) in some embodiments, or automatically (e.g., the printer 1100, 2100 may bring the first label and matrix into contact with the peeler 2601 without having to rely on operator guidance) in others. Regardless of the method of separation, the matrix 45 is to be discarded once the labels are removed therefrom. Typical printers route the used matrices out of the printer and allow them to fall into a receptacle for later disposal. However, this gravity driven method is not free from issues.

The matrices do not weigh a significant amount because they are made from a paper or paper-like material, which decreases the gravitational force the matrices experience. This means that the matrices may easily stray from their intended path within the printer and are liable to jam or cause blockages. Another issue is that the receptacle for receiving the matrices generally takes up valuable space and is constrained to limited locations in order to receive the used matrices. For instance, the conventional receptacle must be positioned in a vicinity underneath the printer to receive the falling matrices. This may be an issue since this means that the matrix receptacle is forced to occupy areas where it may be otherwise more desirable to place critical components, such as a conveyor belt, a label application machine, et cetera. Conventional methods (e.g., a series of rollers) to route the used matrices further away may introduce too much of an increase to printer cost and complexity to be commercially viable. Finally, the used matrices are generally left as is before being placed into the receptacle, landing in a jumbled manner and taking up a lot of space. This results in receptacle that is not optimally filled. Because of this, the receptacle must be emptied many times over a given period and/or must be made quite large, both options being inefficient. Embodiments of the matrix removal system described herein may remedy at least some of these issues.

FIGS. 30 and 31 show an embodiment 2600 of a matrix peel assist system which may be used in conjunction with, for example the label making and applying system 1000, 2000. In some embodiments, the matrix removal system 2600 may be used with any suitable print and apply system now known or subsequently developed. In operation, the matrix removal system 2600 may accept material (e.g., used label matrices) ejected from an adjacent printer using a vacuum charged conduit. The conduit may be used to route the used matrices to a matrix receptacle, whereupon the matrices may later be recycled, disposed of, et cetera. The matrices may undergo further processing (e.g., shredding, cutting, etc.) on their way to the matrix receptacle. The vacuum charged nature of the conduit may serve a dual purpose of pulling the used label matrix to the matrix receptacle while providing tension to the rest of the label matrix which has yet to enter the conduit. In this manner, the matrix removal system 2600 may efficiently route the used matrix away from the printer while mitigating the matrix's tendency to jam or cause blockage within the printer. In some embodiments, the print and apply system, conventional or otherwise, may be retrofit with the matrix removal system 2600.

FIG. 31 details example components of the matrix removal system 2600, in an embodiment. The matrix removal system 2600 may receive used label matrices 45 from a printer, such as the printer 1100, 2100. The label matrices 45 may be whatever strip of material remains after the labels 15 are removed from the label strip 25 that feeds into the printer. The used matrix 45 may be fed into a pipe or conduit 2604 sized to fit the matrix 45, whereupon the matrix 45 may eventually travel through an exit 2614 and into a matrix receptacle 2618. The conduit 2604 may be charged with a vacuum using, for example, a pump 2608. With this vacuum charge, the conduit 2604 may both convey and guide the used matrix 045 away from the printer 1100, 2100 and into the receptacle 2618.

In some embodiments, the conduit 2604 may be shaped to receive the matrix 45 directly from staging area 1100, 2100 (e.g., the conduit 2604 may curve up to the point where the matrix 45 exits the staging area 1100, 2100). Alternately, the system 2600 may include a support with roller 2602 which the matrix 45 contacts upstream of an entrance of the conduit 2604. The support with roller 2602 may assist in orienting the matrix 45 as the matrix 45 exits the staging area 1100 and enters the conduit 2604. The support with roller 2602 may be mounted to any suitable surface (e.g., the ground, the conduit 2604, the staging area 1100, 2100, et cetera).

The conduit 2604 may be made from any suitable material or combination of materials now known or subsequently developed. For instance, the conduit 2604 may be made from a flexible material to allow the conduit 2604 to be arranged in various configurations to suit its environment. As another example, the conduit 2604 may be made from a rigid material to increase its durability and to withstand the vacuum forces produced by the pump 2608. The conduit 2604 may be sized to balance both facilitating matrix 45 travel and the vacuum charge applied to the conduit 2604. For instance, the conduit 2604 may be sufficiently large enough to mitigate matrix 45 blockage, since the matrix 45 tends to twist and/or tumble as it travels, while still maintaining a suitable vacuum charge. In embodiments, the conduit 2604 may include one or more supports 2606 attached to any suitable surface (e.g., other portions of the system 2600, portions of the system 1000, 200, the ground, an adjacent wall, et cetera).

The pump 2608 may be any suitable motor, fan, pump, or combination thereof for producing a vacuum, sufficient to adequately charge the conduit 2604, now known or subsequently developed. For example, in an embodiment, the pump 2608 may have a nominal inlet size 4", a wheel size and type of 10⅝"×2⅝", a fan RPM of 1750, and a motor operating at ⅓$^{rd}$ horsepower, 125/230V, and 260 Hz. The characteristics of operation of the pump 2608 (e.g., the volume of air moved, the force exerted by the vacuum, etc.) may be manually set (e.g., an operator sets the conditions of the vacuum in the pipe 2604) and/or automatically set (e.g., the system 2600 uses sensors and a computing system, such as the computing system 1600, to determine the pump 2608 operating conditions). The vacuum force within the pipe 2604 may be sufficient to pull the matrix 45 through the conduit and out into the receptacle 2618, but not so forceful as to unduly pull on the label strip 25 to which the matrix 45 is attached. In this manner, the matrix 45 may be routed to the receptacle 2618 while providing tension to the matrix 45 that has yet to enter the conduit 2604. It has been found this tension facilitates the printing of the labels 25 by dramatically reducing the jamming of the printer by these labels 25. That is, the tension minimizes any sag in the label assembly and thereby reduces printer jams.

The pump 2608 may be directly coupled to the conduit 2604 for the charging thereof. Alternately, in embodiments, the pump 2608 may be remote from the conduit 2604 (e.g., coupled by an intermediary pipe or other structure for conveying the vacuum charge to the conduit 2604). The pump 2608 may be, but need not be in every embodiment, situated near the exit 2614. Like the pipe 2604, the pump 2608 may have associated therewith one or more supports 2612. Embodiments of the system 2600 may forego one of the supports 2606 and 2612, alternately or in addition to one of the pump 2608 and the pipe 2604 sharing one of the support 2606 and 2612 with the other. In still more embodiments, the supports, 2602, 2606, and/or 2612 are adjustable, such that they be specifically configured for a given environment.

A matrix processor 2610 may be arranged at or near the exit 2614. The matrix processor 2610 may be, for example, a fan, a shredder, etc., configured to cut-up, shred, mince, or otherwise reduce the matrix 45 into smaller portions. The cut-up matrix 45 may then be propelled out of the exit 2614 into the receptacle 2618. By using the matrix processor 2610 to reduce the matrix 45 into smaller pieces, the system 2600 can increase the density of matrix 45 placed in the receptacle 2618 relative to conventional matrix disposal methods. In this manner, a relatively smaller receptacle 2618 may be used (i.e., for handling roughly the same volume of matrices 45) and/or the receptacle 2618 may not be filled as fast. In some embodiments, and as shown in FIG. 31, the matrix processor 2610 may be located within the pump 2608 and the exit 2614. In alternate embodiments, the matrix processor 2610 may be located elsewhere, such as external to and adjacent the exit 2614.

The exit 2614 may have attached thereto an enclosure 2616 configured to assist with directing the matrix 45 into the receptacle 2618 while precluding spillage, such as a funnel or a net. This may be especially advantageous in embodiments where the matrix 45 has been reduced to smaller pieces by the matrix processor 2610.

FIG. 32 is a flowchart depicting a method 2650 of operating the embodiments of the matrix removal system described herein. First, at step 2652, the label strip 25 may be fed into the printer (e.g., printer 1120). The labels 15 may be separated from the matrix 45, at step 2654, e.g., via the peeler 2601. The labels 15 may continue along their path, while the used matrix 45 is diverted away. The conduit or pipe 2604, at step 2656, may be charged with a vacuum via the pump 2608 manually and/or automatically, as described above.

At step 2658, an end of the matrix 45 may be fed into the vacuum charged conduit 2604, and the vacuum of the conduit 2604 may begin to provide tension to the matrix 45. This step may be accomplished, for example, via an operator manually placing the end of the matrix 45 in or near the entrance to the conduit 2604. At step 2660, the matrix inside the conduit 2604 is pulled towards the exit 2614 while the matrix 45 preceding the conduit 2604 is held taut by the vacuum. At step 2662, the matrix 45 may pass through the matrix processor 2610 to be reduced into smaller portions (e.g., through shredding, dicing, cutting, et cetera). Then, at step 2664, the processed matrix 45 may be placed in the matrix receptacle 2618 via the exit 2614.

It is to be understood that the steps of the method 2650 may be modified, added to, and/or omitted as desired, and that such considerations have been contemplated and are within the scope of the disclosure. For example, the artisan may understand that the method 2650 may be readily modified to add a step of further processing the used matrix 45, such as through recycling.

Figure 33:
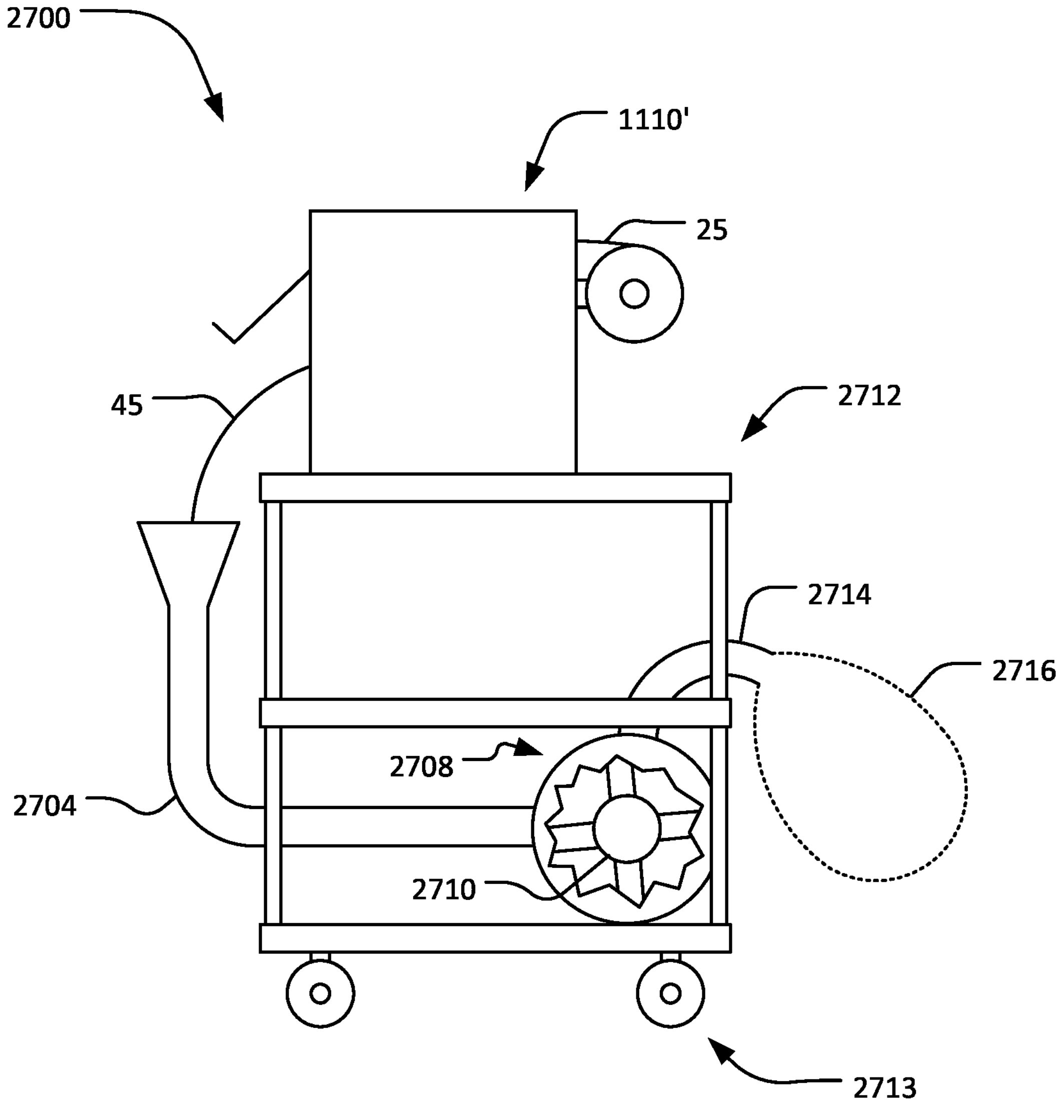
FIG. 33 is a side view of a label printing and apply system on a mobile cart, according to still another embodiment of the disclosure.

A mobile embodiment 2700 of the labeling apparatus is shown in FIG. 33. The labeling apparatus 2700 may be more mobile (e.g., moveable, relocatable, etc.) than the embodiment 2600. The labeling apparatus 2700 may include a printer 1100' that may be like the printer 1100, except that it may be specifically configured to be used with a mobile cart 2712. The cart 2712 may be any suitable cart, platform, container, etc., that is configured to house on and/or within some or all of the components of the embodiment 2700. The cart 2712 may be made mobile by a mobile system 2713, such as wheels, casters, tracks, treads, et cetera.

Like the printer 1100, the printer 1100' may have a holder/distributor where labels 15 for use with the printer 1100' are located. A matrix 45 of liners removed from the rest of the printed labels 15 may be fed (e.g., gravity fed) to a conduit 2704. The conduit 2704 may include any number and configuration of funnels, spacers, guides, aligners, etc. to facilitate the entry, feeding, and travel of the matrix 45 in the conduit 2704. The matrix 45 may be routed through the conduit 2704 to a pump 2708 and a matrix processor 2710. The pump 2708 and the matrix processor 2710 may be similar to the pump 2608 and the matrix processor 2610, respectively, as described above. To wit, the pump 2708 may apply a vacuum charge to the conduit 2704 that may facilitate the movement of the matrix 45 therethrough. The matrix processor 2710 may process (e.g., cut, tear, shred, dice, etc.) the matrix 45 traveling therethrough to facilitate the gathering and removal of the matrix 45. Once processed, the matrix 45 may travel through an exit 2714 (e.g., a spout, funnel, pipe, etc.) to an enclosure 2716. Like the enclosure 2616, the enclosure 2716 may be a garbage bag, a mesh bag, etc., configured to receive the processed matrices 45. In embodiments, the enclosure 2716 may be readily removable from the labeling apparatus 2700, such that a user may easily dispose of the matrices 45 disposed therein.

The mobile labeling apparatus 2700 may provide for a labeling apparatus that may be relatively easy to relocate while allowing for streamlined management and disposal of label matrices. The labeling apparatus 2700 may be a relatively compact system, which is desirable in applications where tight maneuvering is required and/or where space is otherwise limited.

Figure 34:
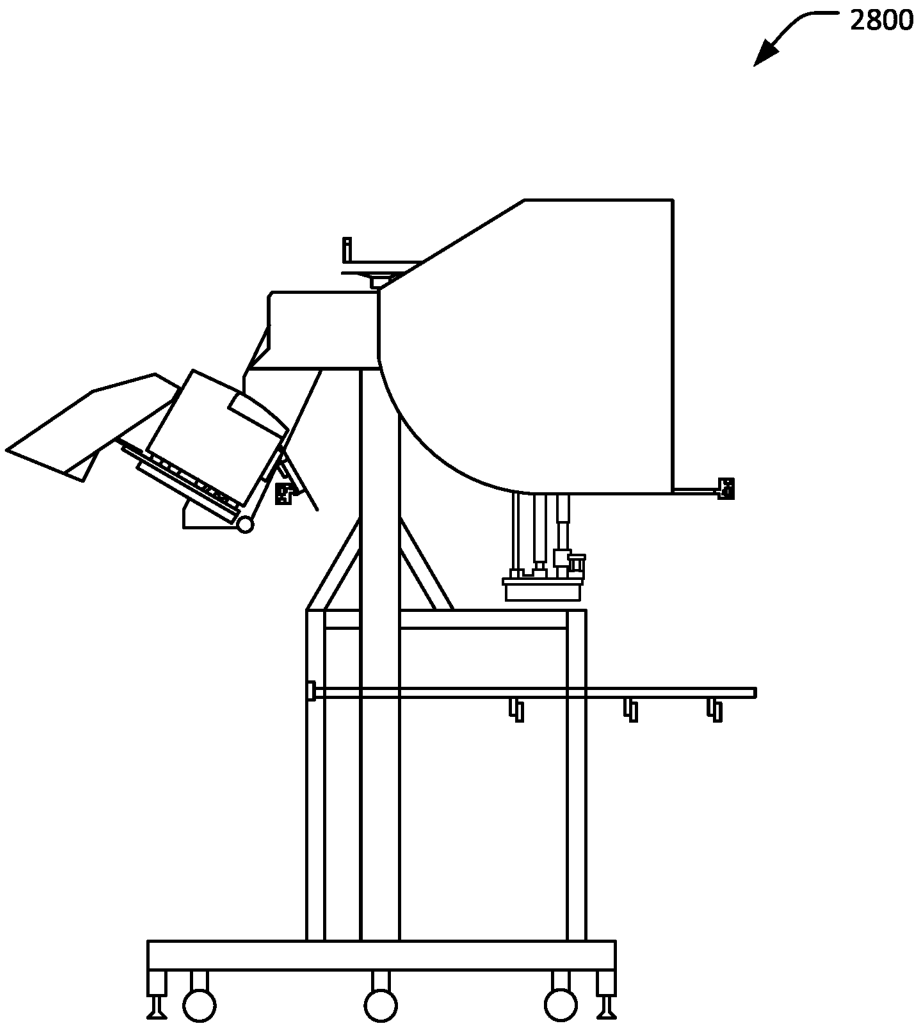
FIG. 34 is a side view of a label printing and apply system, according to yet another embodiment of the disclosure.

FIG. 34 depicts a labeling apparatus 2800, according to another embodiment of the present disclosure. Like the mobile labeling apparatus 2700, the labeling apparatus 2800 may be made mobile via wheels, casters, tracks, et cetera. Similar to the labeling apparatus 1000, 2000, the labeling apparatus 2800 may also include a printer and an automated arm that is configured to pick up printed labels from the printer with a tamp head (e.g., via a vacuum charge), move the label, and apply the printed label to a package or other substrate. In embodiments, the labeling apparatus 2800 may include a sprayer or other device secured to the tamp head for dispersing a fluid to wet/activate an adhesive (e.g., a displaceable/dissolvable liner and/or an activatable adhesive) on the collected label. Any suitable combination of sensors (e.g., height sensors, spray sensors, tamp head sensors, etc.) may be arranged on or around the labeling apparatus 2800 to facilitate operation of the labeling apparatus 2800. For example, the sensors may detect when a package comes within range of the apparatus 2800, and may then direct the apparatus 2800 to print and apply a label thereto. As another example, the sensors may detect if a label picked up by the tamp head is sufficiently wetted for activation.

One advantage of the matrix removal system embodiments described herein may be that the label matrix may be readily routed to a more advantageous location for disposal, rather than merely dropping the matrix from the printer. This makes available space adjacent the printer that would otherwise be taken up by conventional receptacles used to catch the discarded matrices. This space may then be used for more crucial components, such as a conveyor and/or a label application system. Another advantage of the matrix removal system embodiments may be that the matrices may be reduced in size prior to disposal within the matrix receptacle. This allows for a higher density of matrices to be disposed within said receptacle when compared to conventional systems that dispose the used matrices wholesale into the receptacle.

Yet another advantage of the matrix removal system described herein may be that the label matrix preceding the vacuum charged conduit may be made taut via the vacuum forces therein. This tautness may bias the matrix and the attached label strip to remain along a desired path through the printer, as well as overcoming hitches or catches they may experience along this path. This may serve to improve label strip throughput, improve label and label matrix separation within the printer, and/or mitigate printer jamming/blockage from the label strip and matrix. In other words, not only may the matrix removal system provide a better way to dispose of the used label matrices, but the matrix removal system embodiments described herein may improve the performance of the associated printer as well. For example, the matrix removal system embodiments may be retrofit to a preexisting printer or print and apply machine to improve the efficacy thereof.

While example labels (e.g., shipping labels), are used to illustrate the workings of the systems 100 and 2600, the artisan will understand that the systems 100 and 2600 disclosed herein may be adapted to other similar label application functions, and that such adaptions are within the scope of the present disclosure. Examples of other similar label application functions may include pharmaceutical packaging, food and beverage packaging, parts labeling, etc.

The artisan will understand that the labeling system 100 disclosed herein may include or have associated therewith electronics (e.g., the computing system 160, the sensors 128, etc.). The electronics may be used to control and modify the operation of the labeling system (e.g., to change the timing of the system 100, to turn the system 100 on and off, to dynamically control the system 100 in response to a sensor 128 detection, et cetera). In some example embodiments, the processor or processors may be configured through particularly configured hardware, such as an application specific integrated circuit (ASIC), field-programmable gate array (FPGA), etc., and/or through execution of software to allow the labeling system 100 to function in accordance with the disclosure herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The invention claimed is:

1. A method for printing and applying labels, comprising:

printing indicia on a first label using a printer to form a first printed label;

holding said first printed label in a holding tray;

rotating an arm in a first direction from an original position to a first position to collect said first printed label from said holding tray;

collecting said first printed label from said holding tray by extending a portion of the arm;

initiating printing indicia on a second label as soon as said first label is collected by said arm;

rotating said arm in a second direction opposing said first direction to clear said holding tray;

moving said arm in a third direction to move said first printed label towards a substrate;

using said arm to apply said first printed label to said substrate; and moving said arm in a fourth direction opposing said third direction while rotating said arm in said second direction;

wherein said third direction and said fourth direction are vertical directions.

2. The method of claim 1, further comprising using a sprayer to moisten said first printed label while said arm is moving in said third direction.

3. The method of claim 2, wherein said holding tray extends at an angle.

4. The method of claim 3, wherein said holding tray comprises a lip for holding labels.

5. The method of claim 1, wherein said arm includes a tamp head.

6. The method of claim 1, wherein said third and fourth directions are linear.

7. The method of claim 1, further comprising applying said second label to said substrate such that said second label overlaps said first printed label on said substrate.

8. The method of claim 7, wherein said first label is a packing slip and said second label is a shipping label.

9. A method for printing and applying labels, comprising:

covering an adhesive layer of a first label with a dissolvable liner, said dissolvable liner comprising each of a remoistenable adhesive, activated coconut carbon filtered water, and gypsum;

printing indicia on said first label using a printer to form a first printed label;

holding said first printed label in an angled holding tray;

rotating an arm in a first direction from an original position to a first position;

collecting said first printed label from said angled holding tray by extending a portion of the arm;

initiating printing indicia on a second label as soon as said first label is collected by said arm;

rotating said arm in a second direction opposing said first direction to clear the angled holding tray;

moving said arm in a third direction to move said first printed label towards a substrate;

moistening said first printed label before said label reaches said substrate;

using said arm to apply said first printed label to said substrate; and moving said arm in a fourth direction opposing said third direction while rotating said arm in said second direction.

10. The method of claim 9, further comprising using a computing system to control a timing of said arm.

11. The method of claim 9, wherein said angled holding tray comprises a lip for holding labels.

12. The method of claim 9, wherein said arm includes a tamp head.

13. The method of claim 9, wherein said first label comprises a hydrophilic layer.

14. The method of claim 9, further comprising applying said second label to said substrate such that said second label overlaps said first printed label on said substrate.

15. The method of claim 14, wherein said first label is a packing slip and said second label is a shipping label.

16. A method for printing and applying labels, comprising:

printing indicia on a first label using a printer to form a first printed label;

holding said first printed label in an angled holding tray;

rotating a first arm in a first rotational direction from an original position to a first position;

collecting said first printed label from said angled holding tray by extending a portion of the first arm;

initiating printing indicia on a second label as soon as said first label is collected by said first arm;

rotating said first arm in a second rotational direction opposing said first rotational direction; and using said first arm to apply said first printed label to a substrate;

wherein said first arm is movable in a first vertical direction and a second vertical direction using a vertical track operably coupled to said first arm.

17. The method of claim 16, further comprising using a second arm downstream of said first arm to stack a plurality of labels on said substrate.

18. The method of claim 16, wherein said first arm moves in said first rotational direction and said second rotational direction using a rotational device operably coupled to said vertical track.

19. The method of claim 18, wherein said first arm clears said angled holding tray by moving in said second rotational direction while traveling in said first vertical direction and said second vertical direction.

* * * * *